United States Patent [19]
Bilbrey et al.

[11] Patent Number: 6,020,931
[45] Date of Patent: Feb. 1, 2000

[54] VIDEO COMPOSITION AND POSITION SYSTEM AND MEDIA SIGNAL COMMUNICATION SYSTEM

[75] Inventors: Brett Bilbrey, Palatine; Lawrence A. Gust, Round Lake Park, both of Ill.

[73] Assignee: George S. Sheng, Winchester, Mass.

[21] Appl. No.: 08/840,014

[22] Filed: Apr. 24, 1997

Related U.S. Application Data

[60] Provisional application No. 60/016,222, Apr. 25, 1996.

[51] Int. Cl.$^7$ .................................................. H04N 9/74
[52] U.S. Cl. .......................... 348/584; 348/591; 348/592; 348/598
[58] Field of Search ...................................... 348/584, 585, 348/586, 587, 589, 590, 592, 593, 598, 599, 591; 382/284, 285; H04N 9/75, 9/74, 9/76

[56] References Cited

U.S. PATENT DOCUMENTS 4,811,084  3/1989  Belmares-Sarabia .
5,382,980  1/1995  Gehrmann ................................ 348/586

*Primary Examiner*—Sherrie Hsia
*Attorney, Agent, or Firm*—Foley & Lardner

[57] ABSTRACT

A video signal compositing system uses advanced communication techniques to make compositing with virtual studio, blue screen, multi-color compositing, dynamic blue screen, add insertion, synthetic transfiguration, or panoramic displays more economical. A data communication system comprises a number of shared communications channels for transmitting data streams in a bi-directional manner. Multiple interface subsystems are coupled to the communications channels. The interface subsystems have a time slot controller that allocates time slots between the communication channels. A router is used in conjunction with the interface subsystems to define the time slots in which data on the shared communications channels are valid. Processing elements connected via the interface subsystem allow reconfiguration, via the shared communications channels, of processing operations performed. Shared communications channels solve problems in video timing and routing of video signals, including but limited to video compositing and spatial positioning. Multiple mask, dynamic tracking, 3-D depth imaging, image processing and stereoscopic imaging enhance image compositing on systems ranging from NTSC video, to HDTV, to panoramic display systems.

52 Claims, 26 Drawing Sheets

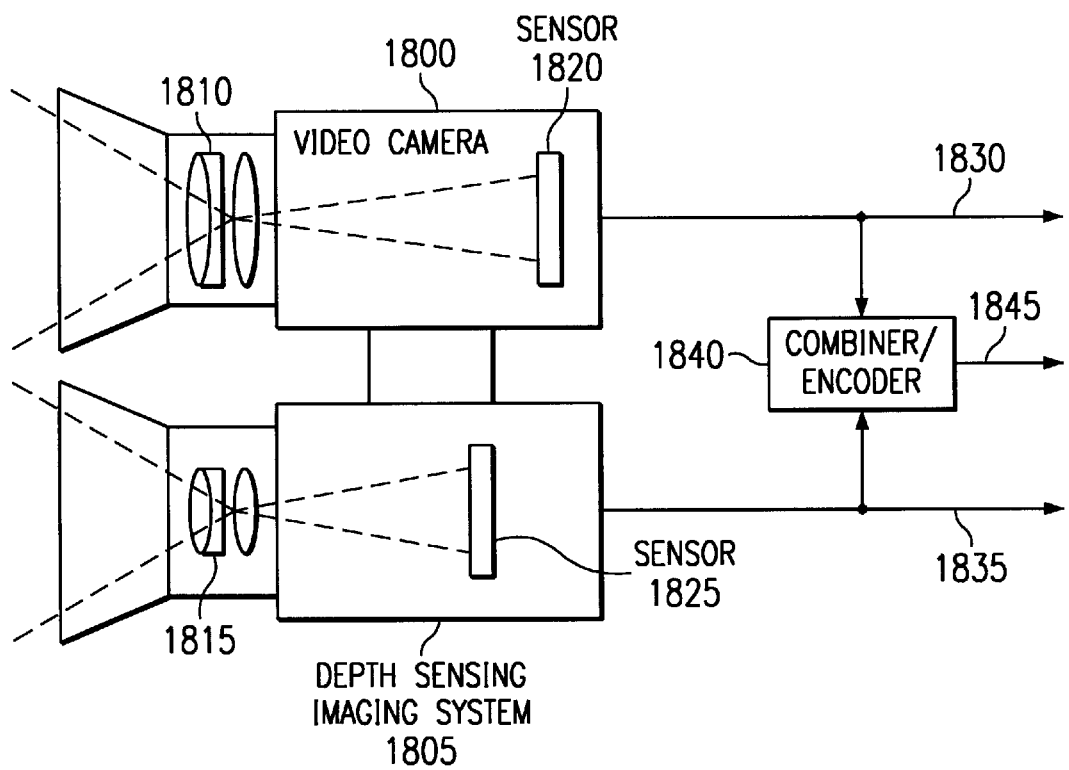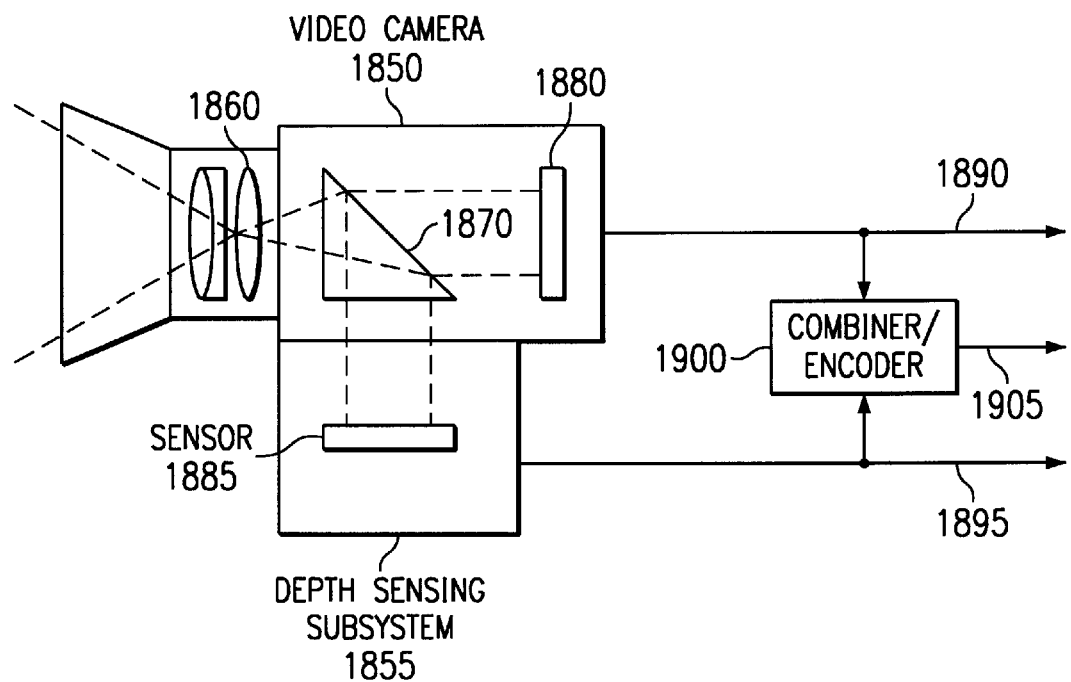
FIG. 38

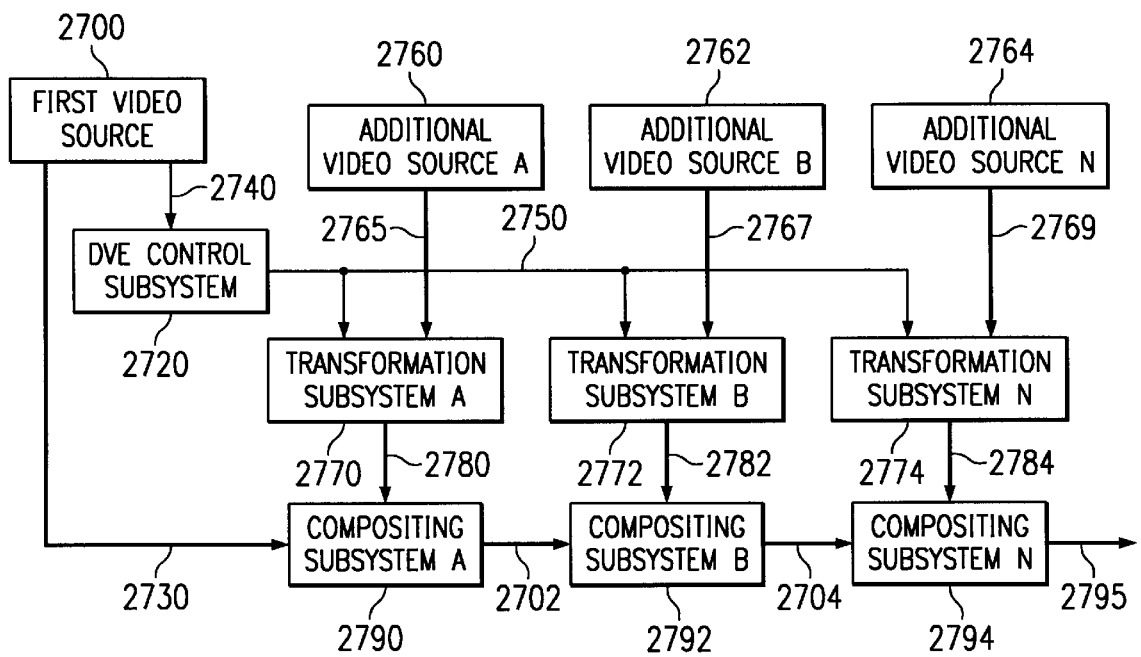
FIG. 47
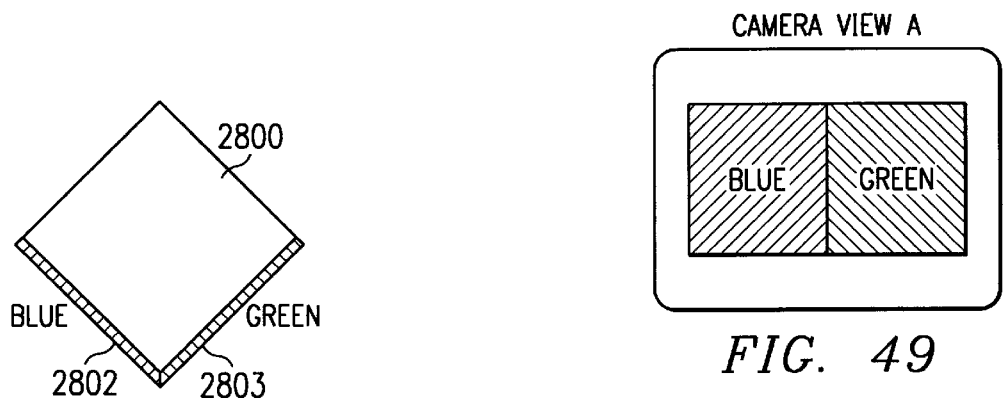
FIG. 49
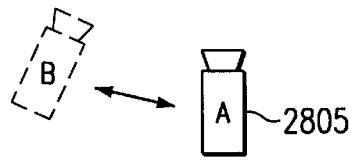
FIG. 48
FIG. 50

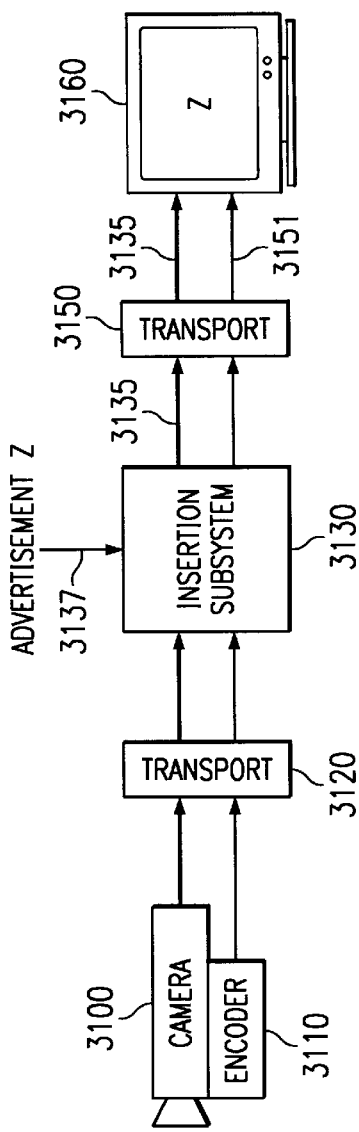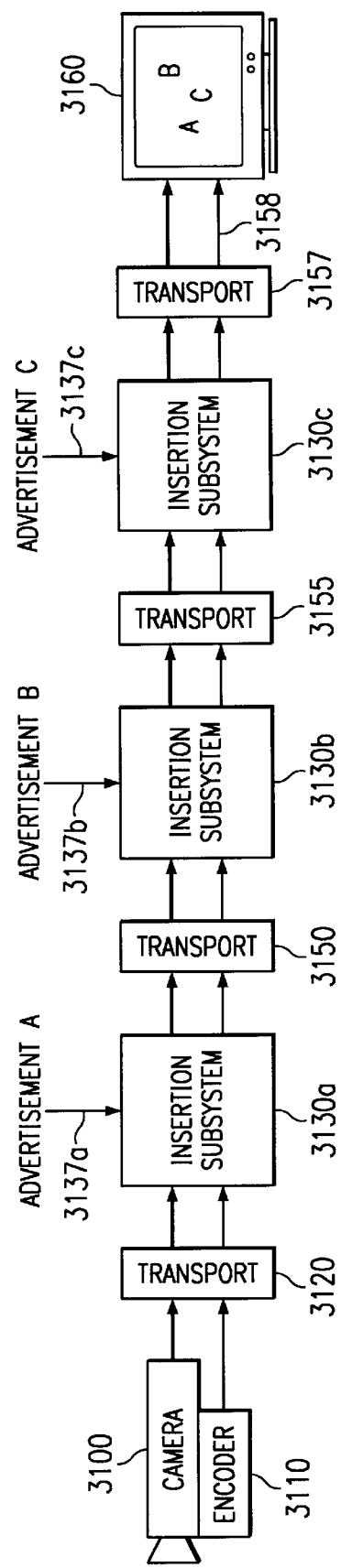

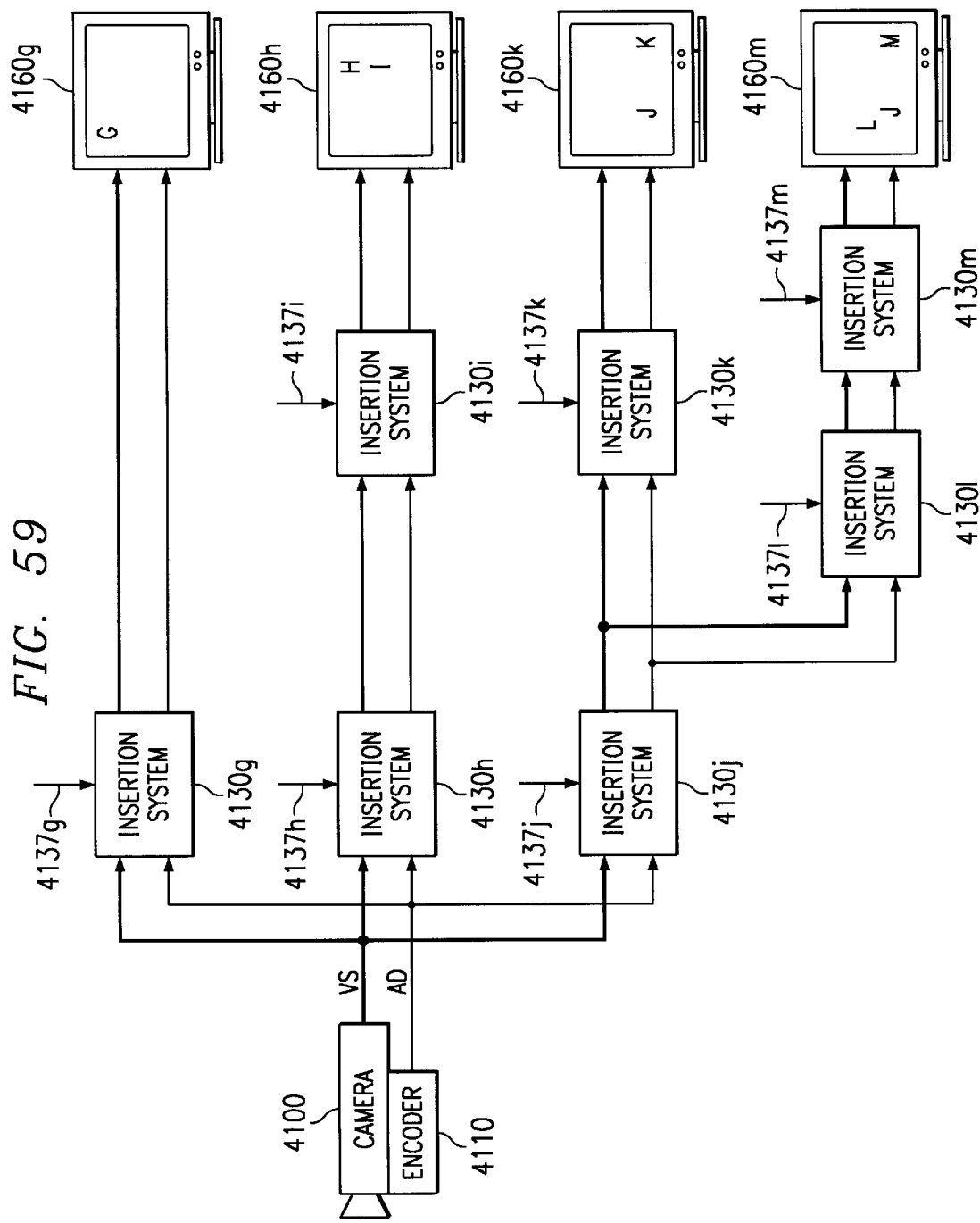

VIDEO COMPOSITION AND POSITION SYSTEM AND MEDIA SIGNAL COMMUNICATION SYSTEM

RELATED APPLICATIONS

This application claims priority from provisional application Ser. No. 60/016,222, filed Apr. 25, 1996.

FIELD OF THE INVENTION

This invention relates generally to video composition systems, and more particularly, to media signal communication systems, architectures, advanced display systems, and video compositing and positioning systems.

BACKGROUND OF THE INVENTION

This invention relates to communications technology, and more particularly to interface architecture, communications architecture and protocol, and interface bus structures, timing and related new configurations.

These elements of communications architecture, interface protocols, and interface bus structures, etc., all interrelate into a total system. The prior art systems have traditionally reached a certain level of maturity at which point a new architecture is adopted because the technology capabilities have surpassed the capabilities of the communications infrastructure.

The IBM PC bus represents an early bus architecture characterized by insufficient bandwidth to support video applications and a single bus master design where only the system could arbitrate use of the bus. This architecture has been superseded by the Intel PCI bus, which supports higher bandwidth applications than the IBM PC bus and multiple bus masters. Other bus architectures that have been superseded in recent years include the Apple/NuBus, developed by MIT and Texas Instruments, used in Apple Computer products, and the DEC Turbo Channel.

It is therefore an object of the present invention to provide a multi-configuration communication compatible protocol and infrastructure which provides the necessary upward and downward compatibility through generations of multiple non-compatible communications infrastructure-based subsystems, to share a common communications infrastructure.

This invention relates to a data communication system. In particular, it is an improvement that is applicable to the communication and routing of digital data.

Data communication architectures for the hard-wired communication of digital data have included bus architectures such as the IBM PC bus, cabled architectures such as the IBM 370 channel controller, and the more recently, fiber-optic based architectures. These approaches to digital data communication have fixed characteristics. The bandwidth is fixed, the number of signal lines is fixed, and the source and destination of the communication is fixed.

It would be extremely advantageous to system designers to have a digital communication architecture to build on that exhibited flexible and adaptable characteristics. Especially valuable would be an architecture that allowed for multi-directional communication, continuously variable bandwidth keyed to the bandwidth requirements of the signal being sent, continuously variable physical and logical channel allocation, and interchangability between the source and destination.

These requirements place extreme demands on the organization and allocation of function between hardware and software in a digital system.

Another aspect of the present invention relates generally to video composition systems and particularly to a method and apparatus for selectively combining video images into a video signal.

The Ultimatte™ system (manufactured and sold by Ultimatte, U.S.A.) keys to a single color and uses that key to map an additional source of video into a keyed area. See also U.S. Patent assigned to Ultimatte. These systems have a lot of limitations. A major limitation is that it can only map to a single color in one area, and can only map to that one area or region within a display frame screen.

Ultimatte systems are also spatially dependent. In other words, colored objects cannot be moved around (e.g., you can't move the camera) or else the perspective of the mapping shifts. That rapid shift is not something that can be computed real-time, or even computed very quickly. There are many limitations on uses of the single-color or Ultimatte process.

Princeton Electronic Billboard's system inserts a static ad into an existing program stream. A super computer processes the video in real-time and uses the computer in a pattern recognition mode. When the computer recognizes a particular pattern or background, it provides the information for an advertisement to be keyed on top of that background.

One of the disadvantages of this system is that it requires very expensive hardware. It's impossible to do it at the point of program delivery to a consumer and it's unreasonable, even for cable head-ends, to afford this technology.

Another problem with the Princeton system is that if a program fades from one camera view to another, the image recognition cannot detect that it is seeing the second image until enough of it is revealed to be locked in. The effect is, when the super computer finally locks in, the ad suddenly appears. It is very disconcerting to see a billboard suddenly appear.

There is a resulting need for an economical process and apparatus for merging one video source into another video source. There is also a need for an economical process and apparatus for merging multiple video sources into another video source. There is also a need for an economical process and apparatus for merging multiple video sources into another video source mapped into 3-D space. There is also a need for an economical process and apparatus for merging multiple video sources with synthetically generated sources.

SUMMARY OF THE INVENTION

This invention relates to a configurable communications protocol and architecture infrastructure that permits multiple non-compatible communications subsystems to share a common communications infrastructure comprised of adaptive and configurable multiple bus structures, timing, and interface protocols. One embodiment of this new system and methodology is illustrated with reference to the Figures showing a Video Explorer® commercially available from Intelligent Resources Integrated Systems, Inc. starting architecture, which is comprised of a one or more video processing subsystems interlinked to each other through special dedicated multiple data buses which provide full word multiple byte data channels every clock cycle, plus a control bus comprised of a control, power, and timing signals.

In the above disclosed Video Explorer®-based commercial embodiment, there are existing two parallel 32-bit data buses which each operate to transfer one channel of information per clock cycle between media signal processing systems intercoupled by the parallel data buses. The present invention is directed to multiple purposes. One is to provide improved communications bandwidth in a manner compatible with the existing architecture, and yet adaptive and responsive to improved uses of the existing architecture, as well as compatible with new architectures for new media signal processing systems more optimized for utilization of the new communications structure. Furthermore, both the new communication structure and new architecture can be co-designed to optimize each other and to maintain compatibility with the targeted (e.g., Video Explorer) existing base communications structure and architecture. Many advantages can be derived from the new communications structure, architecture, and timing. By synchronizing the timing of the new clock rate frequency to a multiple of the old (base) clock frequency rate, many optional communications combinations are enabled simultaneously over a single communications infrastructure.

Channel usage can be optimized for packetized sub-channels on one or both buses, providing continuous (once per new clock cycle) channel allocation, or parallel full channel bandwidth communication (on one or more buses), providing one full channel of data on the bus per each new clock cycle. The new clock cycle can be any multiple of the old clock cycle, preferably a binary multiple. In the illustrated example, a multiple of four is chosen. Thus, each pre-existing clock cycle is replaced with four new clock cycles, each new clock cycle one-fourth as long in duration and four times as often in frequency relative to the original clock cycle and frequency.

The pre-existing architecture for the media processing systems can use front end interface modules which provide for interface of the pre-existing communications infrastructure into the new communications. This is true whether the mode of transmission on the new communications infrastructure is full channel per bus communications during each new clock period, or multiple sub-channels per data bus of packetized information associated with each of the parallel buses communicating one packet per new clock cycle. The bus utilization and protocols for operation can be permanently defined in hardware, or defined upon start-up, and/or can be programmed for control responsive to bus communications. Depending upon the configuration at start-up, the interface subsystem module captures the transmitted signal in one or multiple clock cycles. In one example, the interface system accumulates a full channel of data over multiple new clock cycles, depacketizes and reconstructs the original information for full channel synchronized transfer to the embodiment-base (pre-existing) Video Explorer systems. Four 8-bit channels are constructed from each pre-existing 32-bit parallel data bus (each Videobahn® bus). Full 32-bit data bus communication is achieved, but is delayed by one old clock cycle (being equal to four new clock cycles in the illustrated example). During this time, the interface system provides reconstruction of the original information.

Alternatively, one or both buses can each provide four full parallel channels, time sliced as one full channel of communication per new clock period. In this mode, the media processing system can take advantage of constantly improving processing throughput speeds, permitting multiple processing effects to be performed in parallel and recombined, either in a single combination manner after all have completed needed processing, or in a cascaded manner where intermediate outputs are coupled between the subsystems using the increased full channel bandwidth.

The increased channel bandwidth can be utilized to effect additional inter media processing system communication within the old clock cycle. This permits properly equipped pre-existing media processing systems to be configured as a system consisting solely of original Video Explorer type systems, or a totally new architecture based on systems taking advantage of the communications combinational possibilities, or a hybrid combination of the original and the new.

The new architecture can optimize the media processing functions in a building block manner, breaking down and separating out the combined old blocks to create smaller new combinations, creating advantages of utilizing and using the increases in processing power, speed, reduced cost, increased communications bandwidth provided as described above. The current Video Explorer architecture uses multiple complex functional modules integrated into very large scale integrated ("VLSI") circuit custom chips which are utilized to construct the Video Explorer media processing system boards to provide general purpose do-all capability. A new alternative is provided as one aspect of the present invention, where the various functional block modules making up the VLSI chips custom designed by Intelligent Resources are replaced by a series of small modular circuits.

The VLSI chips include the Video System Controller, the Video Data Engine, and the NuBus Interface Controller. The functions of each of these chips are documented in the Video Explorer Technical Overview manual published by Intelligent Resources Integrated Systems, Inc., and the technical specification that are attached hereto as microfiche. The functional modules previously contained only in combination within the VLSI circuits are now instead provided as a part of the new modular circuit on an only as needed basis, used in conjunction with the sliced bus timing and architecture (e.g., the packet-based division of the channels on each bus). This permits smaller specialized function module sub combinations to be provided as building blocks, much in the same way that early pre-defined sub combinations of digital logic circuits were provided by the 7400 series of TTL. These new media processing combinationally-based building blocks can take advantage of the time division multiplexing and channel division multiplexing communications versatility provided by the present invention as described above. The new customized architecture provides the capability for building customized, less expensive, video processing systems. For example, an application that required the blending of two sources can now be built using a collection of blending circuits on a single card. Prior to this invention, the blending of two signals required two complete Video Explorers, including ASICs, containing rectangle controls, pixel controls, and line controls not required for the blending function. An example of cost savings occurs when it is desired to blend three signals. Originally, a 24-bit blender with 8-bits allocated to each of the source signals would be implemented. Using the present invention incorporating time division multiplexing and an 8-bit modular blend circuit the same blend operation can be accomplished at lower cost, since the 8-bit modular blender will cost less to design and manufacture than the 24-bit blender.

It is an object of this invention to provide an improved data communication system.

It is a further object of the invention to provide an improvement in a high speed data communication system that permits data to be routed in more than one direction.

It is a further object of the present invention to provide in a high speed data communication system adaptable point-to-point communication.

It is a further object of the present invention to provide a stream processor for selectively inputting, storing, and re-outputting data signals in a high speed communication system.

It is a further object of the present invention to provide a data communication system that can continuously modify the bandwidth of the channel in each point-to-point communication.

In the present invention, each of the cards that connect to the communication bus selectively provide for both a coupling from the card to the bus and a coupling from the card to an adjacent card connected to the bus. It is this selective function of coupling from and to one or more adjacent cards to continue the bus that provides for software controlled logical selection of bus sections. Furthermore, alternatively or additionally, this can be done during each time slot to provide a time division multiplexed architecture.

In a string of modules connected one to the other along a chain, the breaking of a bus section link at any of the modules in the string disassociates the subsequent physical links from communication on that bus for that time slot, as to the modules which follow after, or downstream, from the module where the break is initiated. However, this permits downstream modules to intercommunicate amongst themselves along different bus sections of the same physical/logical bus without interference with the communication along other bus sections of the same logical bus.

A continuum of embodiments of this invention exist from totally new embodiments to adaptations of old systems embodied to operate in a new way. For example, multiple sub-blocks and subsystems of block of components already exist and can be utilized to construct elements of the present invention. One such current commercially available system consists of multiple Video Explorer® boards, each connecting to a VideoBahn® data communications architecture comprised of two data buses, VB1 and VB2, and a control and timing bus (or "control bus"). Boards, modules, and documentation of the Video Explorer system are commercially available from Intelligent Resources Integrated Systems, Inc. of Arlington Heights, Ill.

The present invention can be applied to resolve communication channel bandwidth problems by increasing the effective logical channel mapping in a way which not only supports the older communication architecture and protocol, but also permits simultaneous time-slot managed multiplication of channels.

These and other aspects and attributes of the present invention will be discussed with reference to the following drawings and accompanying specification.

In accordance with one aspect of the present invention, each region of a display frame [comprised of multiple regions (for example a blue region and a green region)], is processed as a separately keyed area with its own respective mapping. A corresponding number (e.g., two) of different additional sources, one color per keyed area is provided for each source of video signals, and is mapped onto the display frame screen or into the display presentation to be mixed with live video or some other source of video to get a composite, creating the ability to have a virtual studio, (e.g., providing an artificial desk mapped onto the green region, and a weather map behind the announcer mapped onto the blue region).

Furthermore, the multiple key-color system permits spatial mapping in multiple dimensions. The Ultimatte process is single dimensional. The camera and the video sources take a 3D space and map it into a 2D representation which is then digitized down into a binary zero-one representation. The 2D space, has its limitations. With only one point as a reference, the camera cannot move without destroying the reference perspective.

Another novel area of the invention is related to the fact that by using the multiple points based upon the multiple masks, the ability is provided not only to key for the mapping of an independent source of video onto each region, but alternatively or additionally also provide spatial position relationship indexing.

Indexing can be done generically in 2D, or generically in 3D, or otherwise.

Examples of embodiments include synthetic keyed areas and other spatial positioning functions.

Ultimatte systems key (via Chroma-keying) to a colored region (such as a backdrop blue screen) as to where to map an additional source of video which is to be composited or blended into an original first source of video. The Chroma-key identifies the region within a frame of the first video source (the "original") into which to map the additional source of video. This region is the area (or subset) of the original source of video to be substituted, or superimposed upon, or processed for a certain region. For example, the composited video can include a weather map (e.g., the additional source of video) mapped onto and substituted for the region of the blue screen. In the end composite video image, there's no blue screen, instead, there's a weather map in its place.

As another example, consider the case where there are two distinct corners at the top of a blue screen. These are reference points which can be used to spatially position and index. In this case, these two corners have relatively fixed spatial positions within the image frame. Spatial position indexing permits the camera to move and rotate, rather than having to stay fixed in position. Moving the camera changes the whole perspective for the original image frame, and without spatial position indexing, the additional image that is to be mapped onto the blue screen will shift and be partially missing, permitting the blue screen to be visible in the composited final output. The change in position of the camera alters the mapping, requiring complex calculations. By utilizing spatial positioning, the relative position of view origin relative to the original source frame is known. Thus, for example, as the camera is moving on an arc in a circle from its point of view, around towards the viewing frame, then as it moves from 0° to 90° to one side or to the other side, the mapping is still composited correctly on the region (e.g., onto the blue screen). Additionally, one of a plurality of distinct additional sources of video (such as multiple perspective views of the same image frame) can be selected from the plurality responsive to the relative change in viewing origin to defined regions as represented by the spatial position. That blue screen additional source of video might be more than a weather map; it might be a real video image and what is being viewed behind the actor is an entire blue wall screen, not just a weather map size screen, so as to create a virtual studio having an artificial reality. As the camera is moving and arcing around, and zooming and panning while it's moving, the spatial positioning and indexing allows for a lot of heretofore unavailable features, including selecting one of a subset of views to give the right perspective of the backdrop responsive to spatial positioning. Thus, for example, if there's a narrow stream in a view (frame) that's on an additional source of video, and on each side of the stream there are trees and grass, then depending on where the perspective of the camera view is (with a moving camera) will determine what the backdrop should look like (i.e., which subset to use). Heretofore, creating that backdrop could not be done with the camera moving, such as in an arc, and so a stationary fixed point of view was used to do the shoot.

Any type of display technology is compatible. The display can be a CRT, LCD, big theater screen, computer display, etc. The technology is directed to a virtual studio environment.

In some cases, a colored screen is not even needed. For example, video cameras can have ancillary signals, such as positioning information relative to their original point of origin. There's no need for any positioning references from the set or from the image signals. The spatial positioning is derived from the camera itself which gives positioning information. In accordance with the present invention, a spatial position reference is provided to designate one or more regions, relative to the spatial positioning system of the frame of reference. That information allows starting with a particular origin and defining one or more identified regions. The region identification data can be digitally generated and the substitution mapping performed accordingly for one or more regions.

The concept of spatial positioning is very important in embodying the virtual studio. Spatial positioning can also be achieved in many ways, such as by using two different color masks, or digitally generated, etc. For example, a blue box sitting in front of an actor, and a green screen on the wall behind the actor could be mapped such that the blue box becomes a car in the composited video, and, depending on what the origin viewing angle is, the composited region would provide the respective, angular perspective views of the car (e.g., a Rolls Royce). The back set, the backdrop green screen, could be an entire wall or all walls for an entire studio. For example, the actor could be in a boat which is going over Niagara Falls, with the water gushing all around being composited onto the green walls. That same thing can be done with other embodiments of spatial positioning. Using ancillary information from one or more cameras plus a colored mask provides the capability to do spatial positioning in a three-dimensional space, which could not be effectively done before. Spatial positioning in a three-dimensional space moves the realm of spatial positioning in a virtual studio into a 3-D virtual reality studio.

In accordance with one aspect of the present invention, each region of a display frame is comprised of multiple regions (for example a blue region and a green region). Each region is processed as a separately keyed area with its own respective mapping. A corresponding number of different additional video sources, one source per color keyed area, is provided. Each additional video source is mapped onto the display frame screen or into the display presentation to be mixed with live video or some other source of video to get a composite, creating the ability to have a virtual studio.

Another novel area of the invention is related to the fact that by using the multiple points based upon the multiple masks, the ability is provided not only to key for the mapping of an independent source of video onto each region, but additionally to provide spatial position relationship indexing.

As another example, consider the case where there are two distinct corners at the top of a blue screen. These are reference points that can be used to spatially position and index. In this case, these two corners have relatively fixed spatial positions within the image frame. Spatial position indexing permits the camera to move and rotate, rather than having to stay fixed in one position.

Moving the camera changes the perspective for the original image frame. Without spatial position indexing, the additional image that is to be mapped onto the blue screen will shift and be partially missing, thus permitting the blue screen to be visible in the composited final output.

The change in position of the camera alters the mapping, requiring complex calculations. By utilizing spatial positioning, the relative position of view origin relative to the original source frame is known. Thus, for example, as the camera is moving on an arc in a circle from its point of view, around towards the viewing frame, then as it moves from 0° to 90° to one side or to the other side, the mapping is still composited correctly on the region (e.g., onto the blue screen). That blue screen additional source of video might be more than a weather map; it might be a real video image and what is being viewed behind the actor is an entire blue wall screen, not just a weather map size screen, so as to create a virtual studio having an artificial reality.

Additionally, one of a plurality of distinct additional sources of video (such as multiple perspective views of the same image frame) can be selected from the plurality responsive to the relative change in viewing origin to defined regions as represented by the spatial position.

As the camera is moving and arcing around, and zooming and panning while it's moving, the spatial positioning and indexing allows for a lot of heretofore unavailable features, including selecting one of a subset of views to give the right perspective of the backdrop responsive to spatial positioning. Thus, for example, if there's a narrow stream in a view (frame) that is on an additional source of video, on each side of the stream there are trees and grass. Given a plurality of video sources, some showing the stream and foliage, others perhaps just the stream, the appropriate perspective may be selected responsive to the spatial positioning, yielding a realistic backdrop that is free from visual inconsistencies as the camera moves. Heretofore, creating that backdrop could not be done with the camera moving, such as in an arc, and so a stationary fixed point of view was used to do the shoot.

In some cases, a colored screen is not even needed. For example, video cameras can supply or generate ancillary signals, such as positioning information relative to their original point of origin. There's no need for any positioning references from the set or from the image signals. The spatial positioning is derived from the camera itself that gives positioning information. In accordance with the present invention, a spatial position reference is provided to designate one or more regions, relative to the spatial positioning system of the frame of reference. That information allows starting with a particular origin and defining one or more identified regions. The region identification data can be digitally generated and the substitution mapping performed accordingly for one or more regions.

It is an object of this invention to provide a system to produce a panoramic display from source signals representing a multiple direction perspective view from a defined point source comprising multiple subset views. Further, to add the ability to composite visual signals (from camera, from still image, from stored disk system, etc.) in said system so that it would seem to an observer that the composited visual signals would appear seamless and natural. Effects of this nature have been performed by non-real-time computer processing in such prior art as the visual special effects in "Forest Gump" where an actor was inserted into an existing scene.

A novel aspect of this invention is that it is not limited to fixed flat 2D space such as film or video, and this invention allows real-time interaction with a panoramic background perspective, or subset of a panoramic background.

In accordance with one aspect of the present invention, source signals representing a multiple direction perspective view (from video cameras, from digital media storage systems, from computer synthesis, from wide angle camera, from distortion lens, from multiple independent sources of video) are composited with a second source of video signals to produce a resulting display that can be a panoramic display or a portion of a panoramic display. The means of compositing can be controlled by blue screen, alpha channel, depth information or cues, triangulation, synthesis of key regions and masks, or under operator control.

BRIEF DESCRIPTION OF THE DRAWING

The present invention may be better understood by reference to the detailed description in conjunction with the drawings, wherein:

FIG. 38 is a block diagram of embodiments of a camera-based depth-sensing apparatus supplying signals;

FIG. 47 shows a block diagram of an alternate embodiment of the video composition system of the present invention;

FIG. 48 shows a simplified video set with a camera and a block having two sides facing the camera;

FIG. 49 shows a first view of the block of FIG. 48;

FIG. 50 shows a second view of the block of FIG. 48;

FIG. 56 shows a block diagram of an embodiment of the present invention;

FIG. 57 shows a block diagram of an alternate embodiment of the present invention;

FIG. 59 shows a block diagram of another alternate embodiment of the present invention;

DETAILED DESCRIPTION OF THE ILLUSTRATED EMBODIMENT

Figure 1:
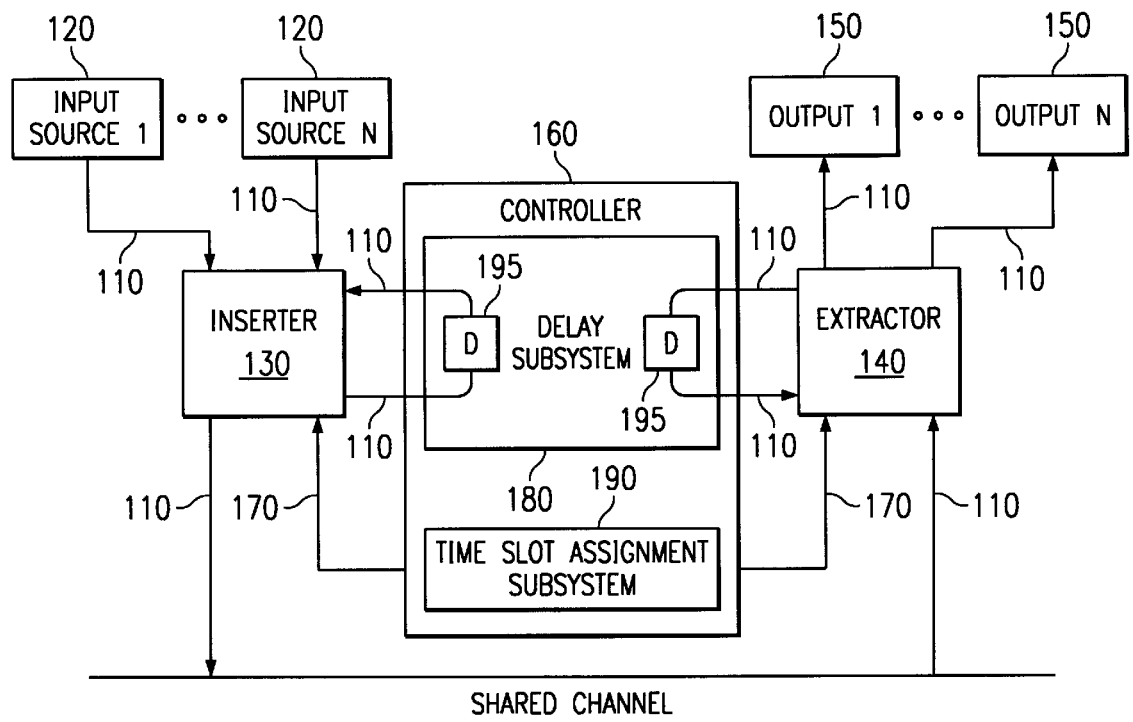
FIG. 1 is a block diagram of a data communications system including input sources, outputs, inserter, extractor, and controller.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

Referring to FIG. 1, a data communication system utilizing a shared channel 100 for communicating data signals 110 is illustrated. One or more input sources 120 provide data signals 110 to an inserter 130 for insertion onto the shared channel 100. An extractor 140 extracts data signals 110 from the shared channel 100 for routing to one or more outputs 150. The inserter 130 and the extractor 140 are responsive to the controller 160. The data signals 110 are comprised of data representing time varying signals and of data representing the relative synchronization of the time varying signals to a reference signal. In the preferred embodiment, the controller 160, the inserter 130, and the extractor 140 are all digital systems, while the data signals 110 are digital signals, and the controller 160 controls the relative physical path of the data signals 110 to and from the shared channel 100, by sending control signals 170 to the inserter 130 and the extractor 140. In an alternate embodiment, the controller 160 controls the time slot assignment for the placement of data signals onto the shared channel 100, by sending control signals 170 to the inserter 130 and the extractor 140. In a third embodiment, the controller 160 controls both the relative physical path of the data signals 110 and the time slot assignment of the data signals 110 on the shared channel by sending control signals 170 to the inserter 130 and the extractor 140.

Still referring to FIG. 1, a block diagram of the controller 160, including a delay subsystem 180 and a time slot assignment subsystem 190, is illustrated. The delay subsystem 180 delays placement of the data signals 110 on the shared channel 100. The delay element 195 is implemented using analog delay lines, programmable digital delay subsystems, or a series of delay gates. The time slot assignment subsystem 190 controls the placement of data signals 170 onto the shared channel 100 and is implemented using hardware gating systems or combinations of hardware and microcode gating systems.

Figure 2:
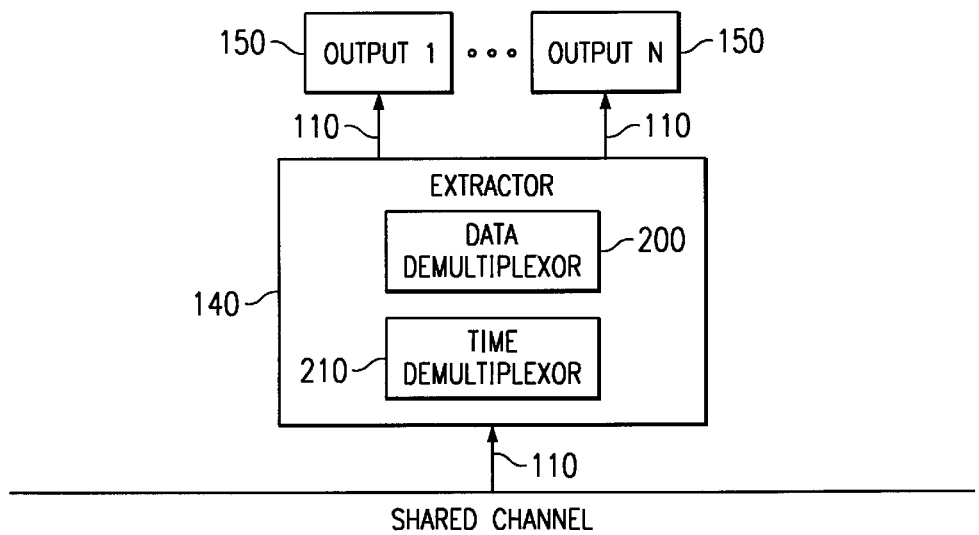
FIG. 2 is a detailed block diagram of the extractor of FIG. 1.

Referring to FIG. 2, an extractor 140, utilizing a data demultiplexor 200 for the purpose of routing data signals 110 to outputs 150 is shown. In an alternate mode of operation, the extractor 140 utilizes a time demultiplexor 210 for demultiplexing time multiplexed data signals 110 from the shared channel 100. In a third mode of operation, the extractor 140 uses a data demultiplexor 200 and a time demultiplexor 210 to both time demultiplex and data demultiplex data signals 110 from the shared channel 100. The time demultiplexor 210 is implemented by gating a multiplexor with a timed gating signal. A timed gating signal controlling a time demultiplexor 210 allows data signals 110 to be routed during the time slot that data signals 110 are valid for their destination.

Figure 3:
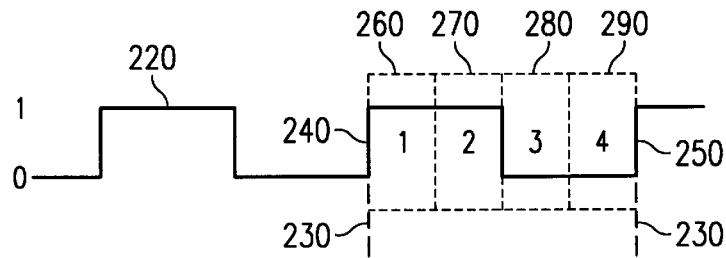
FIG. 3 is a timing diagram illustrating the four time slots included in one master clock cycle.

Referring to FIG. 3, a master clock 220 is shown. The clock 220 defines a communication cycle 230 that begins on the first rising edge 240 of the clock 220 and ends on the second rising edge 250 of the clock 220. The clock 220 synchronizes the operation of the data communication system and controls the time demultiplexor 210 of FIG. 2. The communication cycle 230 is divided into four time slots, time slot one 260, time slot two 270, time slot three 280, and time slot four 290. Each time slot provided, one 260, two 270, three 280, and four 290, serve to define a communication time for sending and receiving data from the shared channel 100. Time slots one 260, two 270, three 280, and four 290 each repeat during the next communication cycle. Thus, data is identified and placed on or taken off of the shared communication channel 100 during each of the four time slots.

Figure 4:
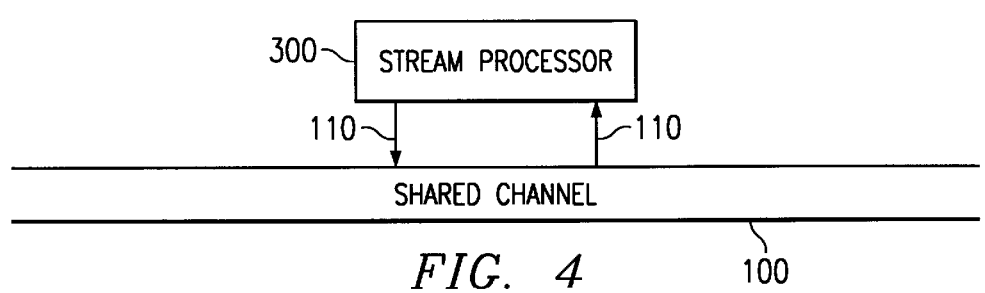
FIG. 4 is a block diagram of a stream processor.

Referring to FIG. 4, a stream processor 300 for inputting, storing, and reoutputting data signals 110 to and from the shared channel 100 during unique time slots of the communication cycle is shown. The stream processor is implemented as a pure logic system or a combination of logic, storage, and software as embodied in a microprocessor-based system. The processing occurring in the stream processor consists of operations such as blending, limiting, adding, or multiplying which occur on each clock cycle, and which are applied to data signals 110 in a continuous manner. Stream processing is distinguished from frame processing in that the stream processing is a continuous process while frame processing is a discontinuous process in that a frame of video data is stored before it is processed.

Figure 5:
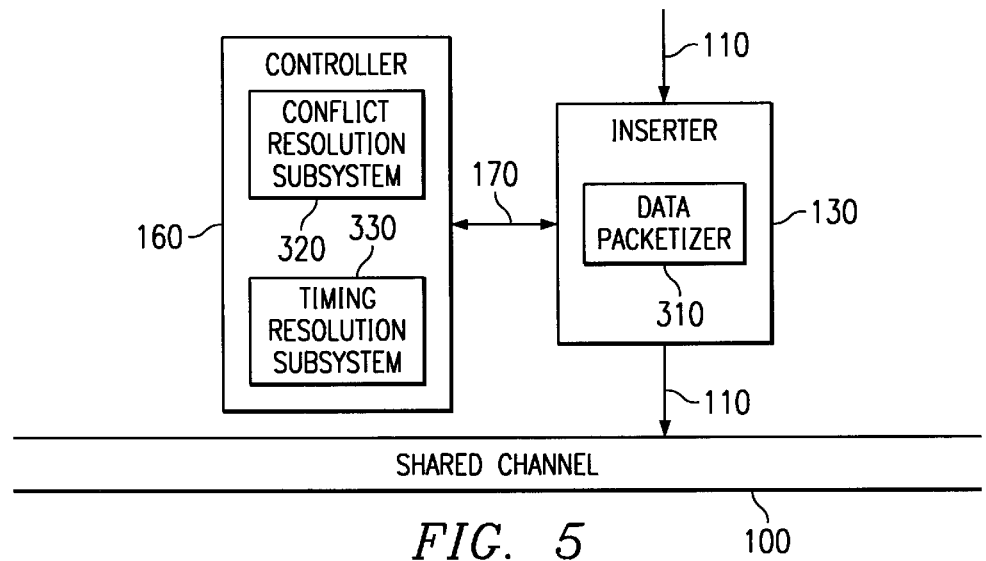
FIG. 5 is a detailed block diagram of the controller and inserter of FIG. 1.

Referring to FIG. 5, a system for transmitting packetized data is shown. A data packetizer 310 packetizes data for the inserter 130. Packetized data from the data packetizer 310 is transmitted as the data signals 110 that are placed on the shared channel 100. A conflict resolution subsystem 320 and a timing resolution subsystem 330 control the access and timing for transmitting packetized data to the shared channel 100. In operation, controller 160 includes a conflict resolution subsystem 320 and a timing resolution subsystem 330 for generating control signals 170 to control the inserter 130 when sending packetized data as data signals 110 to the shared channel 100. Specifically, the conflict resolution subsystem 320 controls the packet width assignment to the shared channel 100 and the total number of subchannels to which a packet is assigned. In operation, the timing resolution subsystem 330 generates control signals 170 for adaptively controlling the data width, time slot assignment, and total number of subchannels.

Figure 6:
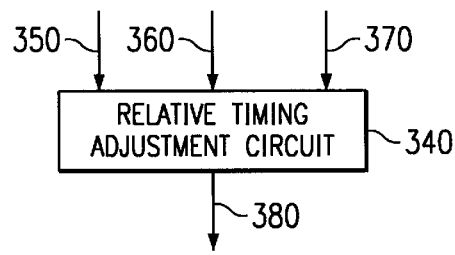
FIG. 6 is a block diagram of a relative timing adjustment circuit, its inputs and outputs.

Referring to FIG. 6, a block diagram for a relative timing adjustment circuit 340 for adjusting the relative timing of a selected one of the time varying signals 350 to be synchronized with a reference signal 360 is shown. Relative synchronization data 370 is combined with the selected one of the time varying signals 350 in a relative timing adjustment circuit 340 to generate a reference synchronized signal 380. The synchronization is accomplished by delaying the selected one of the time varying signal 350 by an amount derived from the relative synchronization data 370 to generate the reference synchronized signal 380. The relative timing adjustment circuit 340 is designed to generate the reference synchronized signal 380 where the timing relationship between the inputs to the relative timing adjustment circuit 340 take different forms. First, the timing adjustment circuit 340 generates a reference synchronized signal 380 where the selected one of the time varying signals 350 is in synchronization and coincident with the reference signal 360 and the reference signal 360 is a predefined fixed reference signal or the reference signal 360 is one of the time varying signals. Second, the time adjustment circuit 340 generates a reference synchronized signal 380 where the selected one of the time varying signals 350 is synchronized and offset to be non-coincident with the reference signal 360 and the reference signal 360 is a predefined fixed reference signal or the reference signal 360 is one of the time varying signals. Third, the time adjustment circuit 340 generates a reference synchronized signal 380 where the relative synchronization of the time varying signal to the reference signal is communicated separate from, but in parallel with, the data representing the time varying signals. Fourth, the time adjustment circuit 340 generates a reference synchronized signal 380, where the relative synchronization of the time varying signals 350 to the reference signal 360 is encoded in the data representing the time varying signals 350. In operation, all four modes need not be supported, but the greatest flexibility is achieved by implementing all four modes.

Figure 7:
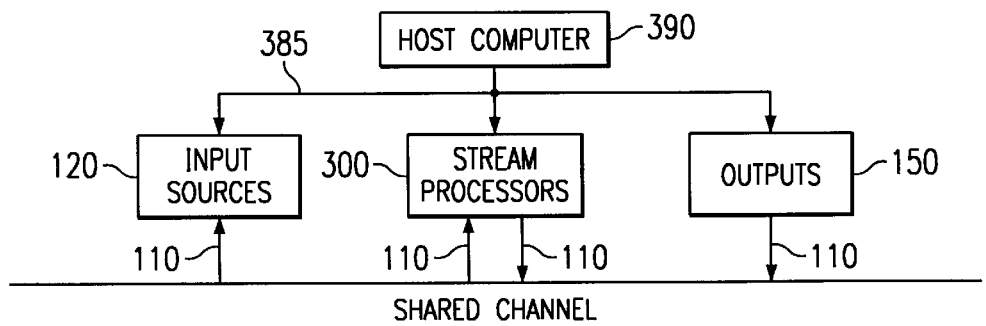
FIG. 7 is a block diagram illustrating the interaction between a host computer, stream processors, input sources, and outputs.

Referring to FIG. 7, a block diagram for stream processing is illustrated. The host computer 390 is coupled to the input sources 120, the outputs 150, and the stream processor 300 through control signals 385. The host computer 390 is configured and programmed to provide for data stream transfer between at least two of the following three systems: the input sources 120, the stream processor 300, and the outputs 150. This transfer takes place over the shared bus 100. The control of the digital subsystems such as the input sources 120, the outputs 150, and the stream processor 300, by the host computer 390 is implemented completely in hardware or in a combination of hardware and software. The control signals 385 determine how the input sources 120, stream processors 300, and the output sources 150 operate, and can be generated through user interaction with the host computer or a program running on the host computer. The control signals 385 can control selection of data signals 110, indicate the characteristics of the data signals 110 (PAL, NTSC, RGB, etc.), or designate the width of the data packet. In operation, a user manipulating a slide bar on the host computer 390 can send continuously varying color coefficients to a stream processor 300 doing color space conversion, or the operation of the slide can control, through control signals 385, the blend of two input sources 120 being processed by the stream processors 300. A user may vary other parameters of stream processors 300 with similar controls supplied as software in the host computer 390.

Figure 8:
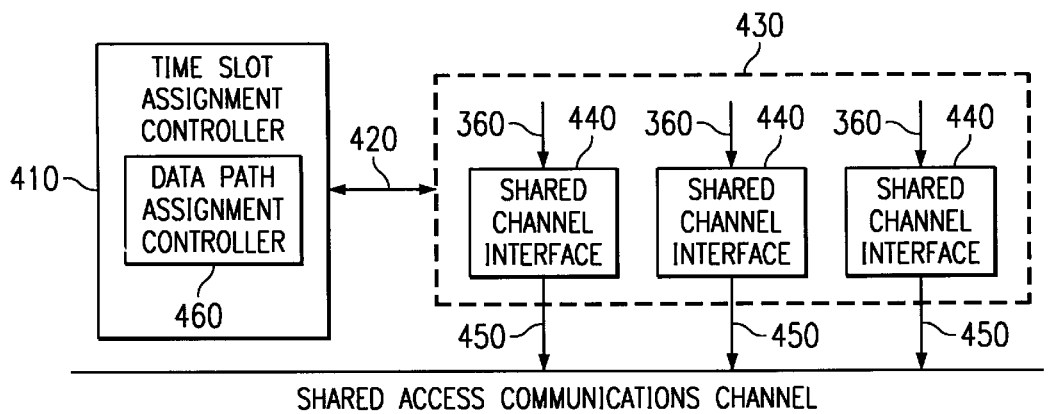
FIG. 8 is a block diagram illustrating the relationship between a time slot assignment controller and a shared channel interface and the relationship between a shared channel interface and a shared access communication channel.

Referring to FIG. 8, a block diagram for a signal processing system for managing multiple data stream communications is shown. The signal processing system comprises a shared access communications channel 400, a time slot assignment controller 410, time slot control signals 420, a plurality of subsystems 430, each of the plurality of subsystems 430 comprising a shared channel interface 440, and a data stream 450. In operation, the shared access communications channel 400 provides multiple individual subchannels of data signals. The communications on the shared access communications channel 400 occurs during each of a plurality of individual access time slots provided on a cyclically recurring basis, once during each clock cycle, as illustrated in FIG. 3. Each shared channel interface 440 in the plurality of subsystems 430 provides communication during its respective individual access time slot. The time slot assignment controller 410 allocates input and output access time slots for the shared access communications channel 400, and controls a plurality of subsystems 430 including the shared channel interface 440. The time slot assignment controller 410 couples to each of the shared channel interfaces 440 for selectively connecting data stream 450 to the shared access channel 400 during an allocated access time slot. The data stream 450 represents time varying signals and the relative synchronization of the time varying signals to a reference signal independent of the time slot.

The time slot assignment controller 410 is further comprised of a data path assignment controller 460 for controlling the data path which the data stream 450 will occupy on the shared access communication channel 400.

The data stream 450 contains data representing time varying signals. One mode of operation permits the relative synchronization of the time varying signals carried on the data stream 450 to the reference signal 360 to be communicated separately from but in parallel with the data representing the time varying signal. Another mode of operation permits data stream 450, when represented as time varying signals to have the relative synchronization of the time varying signals to the reference signal 360 encoded within the data representing the time varying signal.

Figure 9:
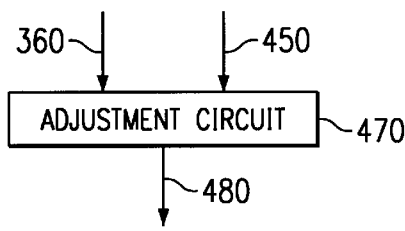
FIG. 9 is a block diagram of an adjustment circuit, its input and output.

Referring to FIG. 9, a block diagram of an adjustment circuit 470 is shown for synchronizing the data stream 450 to the reference signal 360. Adjustment circuit 470 adjusts the relative timing of the data stream 450 with respect to the reference signal 360 and outputs a synchronized data stream 480. The adjustment circuit 470 adjusts the relationship between the data stream 450 and the reference signal 360, and can be implemented using analog delay lines, digital delaying gates, or microprocessor-controlled delaying subsystems. The preferred embodiment is a variable length FIFO (first in/first out) register. The adjustment circuit 470 is designed to generate the synchronized data stream 480 where the timing relationship between the inputs to the adjustment circuit 470 take different forms. First, the adjustment circuit 470 generates the synchronized data stream 480 where the data stream 450 is in synchronization and coincident with the reference signal 360, where the reference signal 360 is a predefined fixed reference signal or the reference signal 360 is one of the data stream 450 signals. Second, the adjustment circuit 470 generates a synchronized data stream 480 where the data stream 450 is synchronized and offset to be non-coincident with the reference signal 360, where the reference signal 360 is a predefined fixed reference signal or the reference signal 360 is one of the data stream 450 signals. Third, the adjustment circuit 470 generates a synchronized data stream 480 where the relative synchronization of the data stream 450 to the reference signal 360 is communicated separate from, but in parallel with, the data stream 450. Fourth, the adjustment circuit 470 generates a synchronized data stream 480, where the relative synchronization of the data stream 450 to the reference signal 360 is encoded in the data representing the data stream 450. In operation, all four modes need not be supported.

Figure 10:
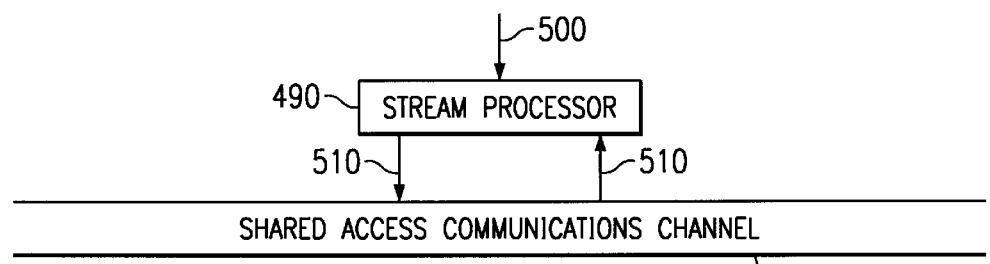
FIG. 10 is a block diagram illustrating the relationship between a stream processor and a shared access communications channel.

Referring to FIG. 10, a block diagram of a stream processor 490 and the shared access communications channel 400 is shown. In operation, data stream output 510 is processed by the stream processor 490. Processing operations include inputting, storing, and reoutputting data stream output 510 and data stream input 500.

Figure 11:
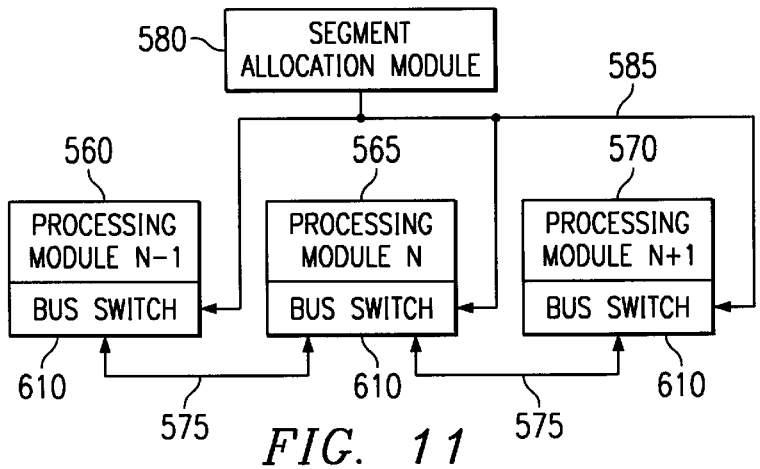
FIG. 11 is a block diagram illustrating the relationship between a bus switch and a channel segment.

Referring to FIG. 11, a block diagram and data flow is shown for a communication system for coupling a variable number of data streams. The communication system is comprised of a processing module N−1 560, a processing module N 565, a processing module N+1 570, channel segments 575, a segment allocation module 580, and bus switches 610. In operation, processing module N+1 570 can communicate with processing module N 565 over one of the channel segments 575, and processing module N−1 can communicate with processing module N over one of the channel segments 575. Also, in operation, segment allocation module 580 via bus 585 controls bus switches 610. Bus switches 610 can each be open or closed. When open, bus switches 610 isolate non-neighboring processing modules. When closed, bus switches 610 permit non-neighboring processing modules, such as processing modules N+1 and processing module N−1, to communicate. When all bus switches 610 are closed, the system reduces to that shown in FIG. 12.

Figure 12:
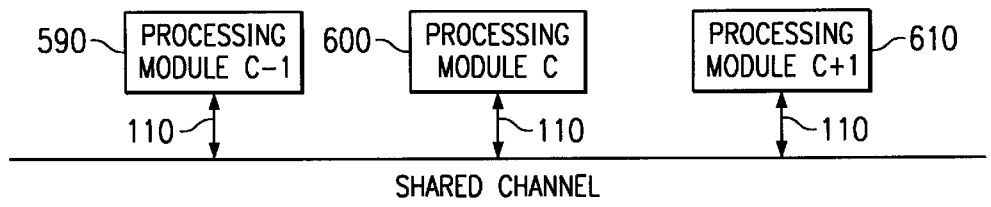
FIG. 12 is a block diagram illustrating the relationship between processing modules and a shared channel.

Referring to FIG. 12, processing module C−1 590, processing module C 600, and processing module C+1 610 can all communicate over the shared channel 100. In an alternate embodiment, a system can be configured that would be comprised of bus switches 610 as illustrated in FIG. 11 and shared channel 100 as illustrated in FIG. 12, both of which are connected to processing modules 560, 565, and 570. In that embodiment, data can flow both over the channel segment 575 via the bus switches 610 and data can flow over the shared channel 100, and channel segments 575 can be driven in two directions. For example, processing module N can drive channel segment 575 in the direction of processing module N−1 560, and processing module N−1 560 can drive channel segment 575 in the direction of processing module N 565.

Figure 13:
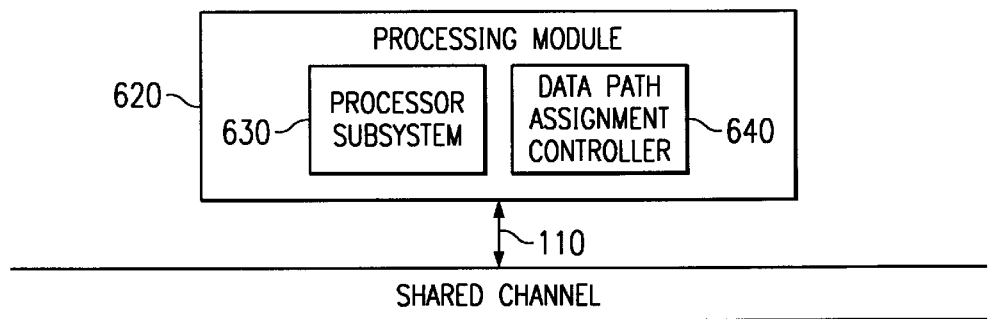
FIG. 13 is a detailed block diagram of a processing module.

Referring to FIG. 13, a block diagram illustrating a processing module 620, a processor subsystem 630, a processor interface module 640, the data signals 110, and the shared channel 100 is illustrated. The processor subsystem 630 can consist of a blender or a unit that controls luminance, or a unit that averages or filters over time, or more generally, a stream processor. The processor subsystem 630 is linked to the interface module 640, and the interface module 640 communicates with the shared channel by generating data signals 110.

Figure 14:
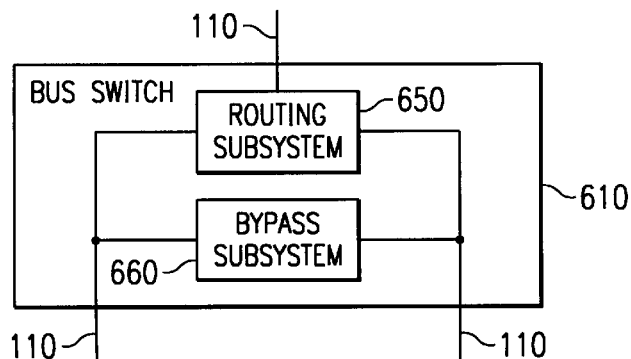
FIG. 14 is a detailed block diagram of a bus switch.

Referring to FIG. 14, a bus switch 610 comprised of a routing subsystem 650 and a bypass subsystem 660 is shown. In operation, the bus switch 610 can route data signals 110 through the bypass subsystem 660, through the routing subsystem 650, and/or up to the processor subsystem 630, as illustrated in FIG. 13.

Figure 15:
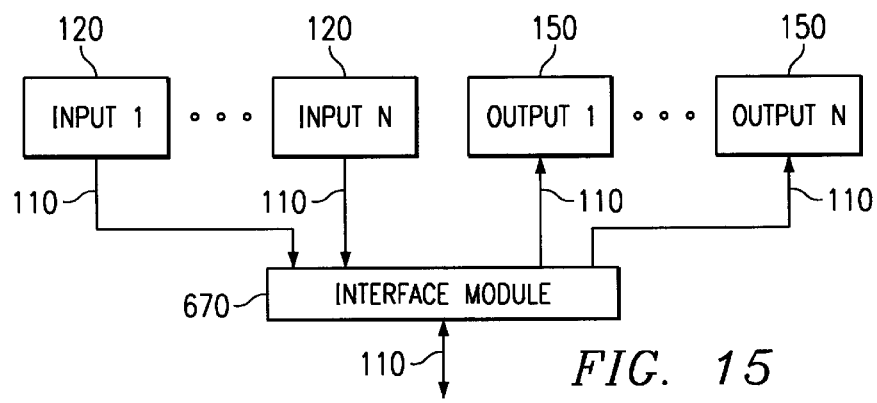
FIG. 15 is a block diagram illustrating an interface and its relationship with input sources, outputs, and data signals.

Referring to FIG. 15, a block diagram and data flow for input source one 120 through input source N 120 and output one 150 through output N 150, data signals 110, and interface module 670 is shown. Referring to FIGS. 1 and 15, interface module 670 in FIG. 15, is comprised of the inserter 130, the controller 160, and the extractor 140 of FIG. 1.

Figure 16:
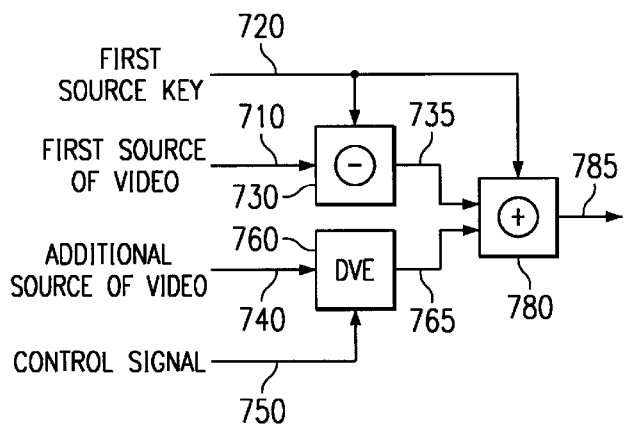
FIG. 16 is a detailed block diagram illustrating a video processing flow for compositing.

Referring to FIG. 16, a video processing flow is illustrated with a first source key 720 is supplied to a video image subtractor 730 and a video image adder 780. Also supplied to the video image subtractor is a first source of video 710.

The video image subtractor 730, responsive to key signal 720, removes some portion of the video in the first source 710 producing a subtracted video image 735. A control signal 750 and an additional source of video 740 are supplied to a image transformation subsystem 760. The image transformation subsystem, responsive to the control signal 750, manipulates the additional source of video 740 producing a manipulated source of additional video 765. The preferred embodiment of the image transformation subsystem is a Digital Video Effects (DVE) unit. DVE units are commercially available from ADO, Abekas, Aladdin, Miranda, Grass Valley Group, and others.

Still referring to FIG. 16, the subtracted video image 735 and the manipulated source of additional video 765 are coupled to the video image adder 780, which responsive to the first source key signal 720 produces a video image summation 785, the video image summation being the output of the video processing flow in the figure. The image subtraction and addition process generates a composite image output 785 as a result of combining the first source of video 710 with the additional source of video 740.

The first source of video 710 in FIG. 16 may be obtained from a variety of sources, including video cameras, still cameras generating video, video tape playback, real time synthesis of images, videodisk and other prerecorded media, or from other subsystems including additional instances of the system as shown in FIG. 16 or a source of panoramic display data, wherein there are one or more subset views available in the panoramic subsystem, and a view direction is supplied to the panoramic subsystem, which couples a selected panoramic view or a composite of several selected panoramic views to the compositing system shown. The panoramic subsystem may contain still images, collections of streams of continuous images, which may be repeating loops or non-repeating streams of same or differing durations, views that are synthesized in whole or in part by one or more synthesis subsystems, possibly responsive to the control signals 750 or alternatively generating control signals 750 and/or key signal 720. The images or streams in the panoramic subsystem may be recorded or live, comprised of independent sources such as cameras et al already indicated, wide angle cameras, or scanning cameras capable of recording a 360° panorama in whole or in part. The panoramic subsystem is not limited to a single equatorial panorama, but may comprise multiple subset views corresponding to a single longitude and varying latitude, or multiple subset views corresponding to a single latitude and varying longitude, or multiple subset views containing any subset of varying longitude and latitude. The panoramic subsystem can thus supply a source of video 710 to the system corresponding to any possible view in three dimensions from a fixed point in space, given sufficient storage to contain the necessary plurality of views. In the instance where the panoramic subsystem is called upon to supply a subset of views for which it does not have an explicit image or video stream available, it may select multiple adjacent views and perform a stitching or concatenation of these images providing the stitched or concatenated image to the compositing system. This stitching or concatenation may occur in a horizontal direction only, the vertical direction only, or in a combination of horizontal and vertical directions. In addition, generation of control signals 750 and/or key signal 720 may alternatively be performed by interpolation or other mathematical operation based on values for control signals 750 and/or key signal 720 associated with each or any of the respective subset views thus stitched or concatenated, or independently of the those values.

Figure 17:
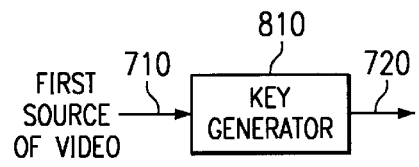
FIG. 17 is a block diagram of a key generator.

Referring to FIG. 17, one method for generating the first source key signal 720 is illustrated in detail wherein the original first source of video 710 is coupled to a key generator 810 which therefrom generates the first source key signal 720. Additionally, the first source key signal 720 may be supplied by some component of an external source of video, such as a luminance channel or a saturation channel, or synthesized by static or time-varying parameters available from key generators and key synthesizers, including those commercially available from Abekas and Grass Valley Group.

Figure 18:
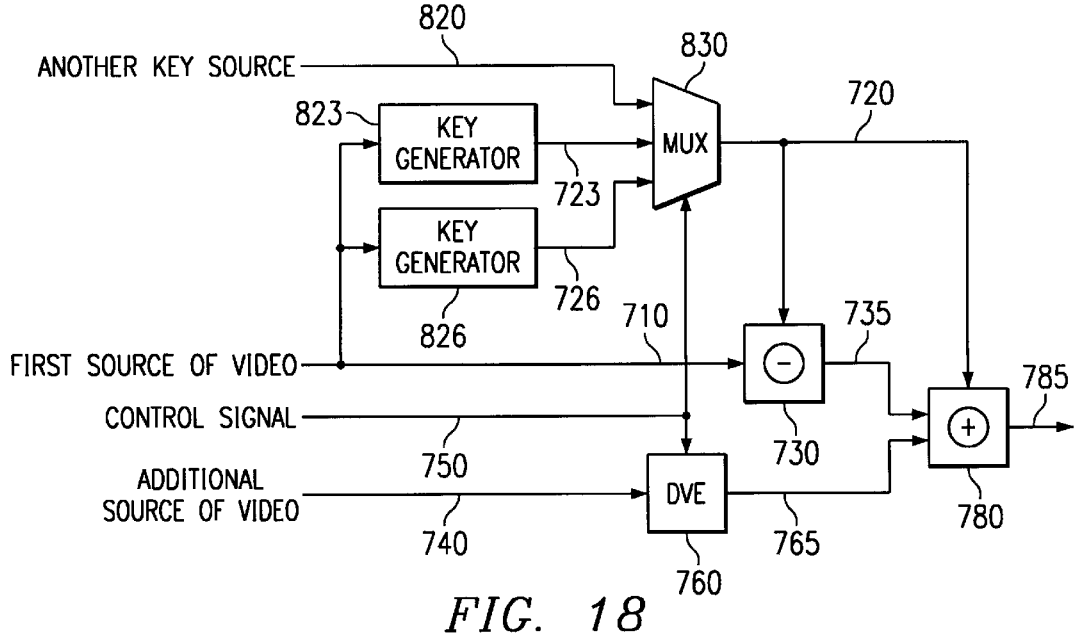
FIG. 18 is a detailed block diagram of a video processing flow using multiple keys and sources.

Referring to FIG. 18, a multiple source key system is illustrated in detail. A first source of video 710 is coupled to key generators 823, 826 and to a video image subtractor 730. Key generators 823, 826 produce key signals 723, 726 respectively and couple to a key selector multiplexor 830. Also coupled to the key selector multiplexor 830 are additional key source(s) 820 and a control signal 750. The key selector multiplexor 830, responsive to the control signal 750, selects one of the key sources 723, 726, 820 to output as multiplexor output 720. The multiplexor output 720, in a manner analogous to FIG. 16, is coupled both to video image subtractor 730 and video image adder 780.

Still referring to FIG. 18, the video image subtractor 730 responsive to the multiplexor output 720 and the first source of video 710 produces a subtracted video image 735 which is coupled to the video image adder 780. The control signal 750 and an additional source of video 740 are supplied to a image transformation subsystem 760. The image transformation subsystem, responsive to the control signal 750, manipulates the additional source of video 740 producing a manipulated source of additional video 765. The subtracted video image 735 and the manipulated source of additional video 765 are coupled to the video image adder 780, which responsive to the first source key signal 720 produces a video image summation 785, the video image summation being the output of the video processing flow in the figure. The image subtraction and addition process generates a composite image output 785 as a result of combining the first source of video 710 with the additional source of video 740.

Figure 19:
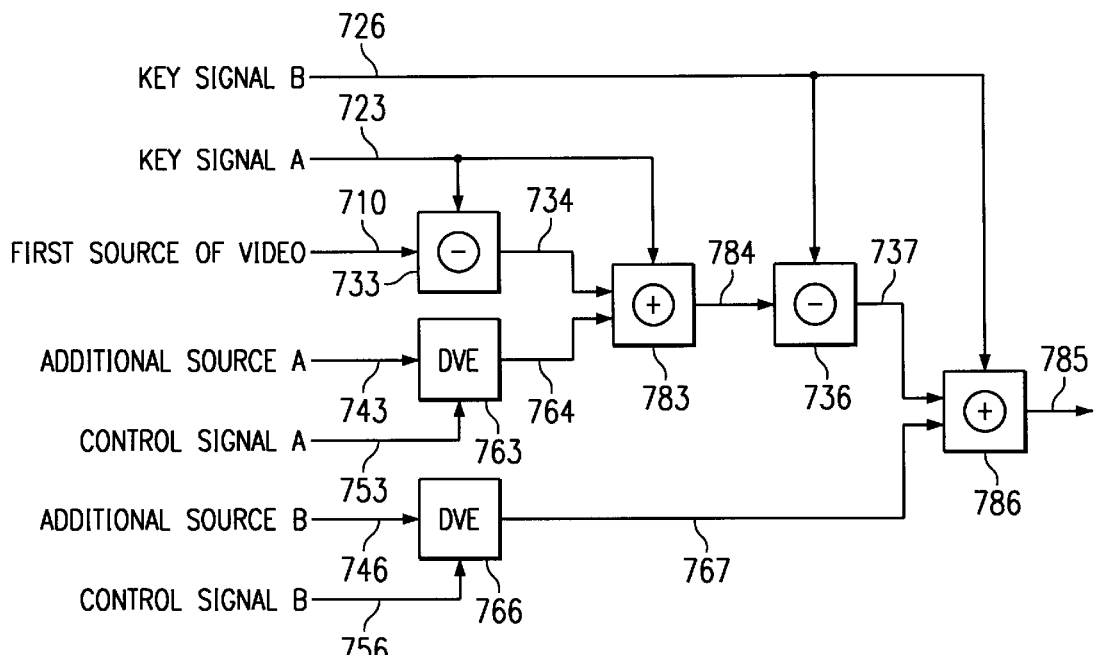
FIG. 19 is a detailed block diagram of an alternate embodiment the flow shown in FIG. 18.

Referring to FIG. 19, another embodiment of the present invention is illustrated where there are multiple additional sources of video 743, 746, multiple control signals 753, 756 respectively, multiple image transformation subsystems 763, 766 respectively, multiple video image subtractors 733, 736 respectively, multiple video image adders 783, 786, respectively, and multiple key signals 723, 726 respectively. The embodiment illustrated performs processing in a manner analogous to two serially-connected instances of the processing flow illustrated in FIG. 16, although the process is not restricted to only two instances but applies generally to any number of instances in series. The embodiment illustrated in FIG. 19 is not limited to the two additional video sources, two control sources, and two key sources shown. The sources may range from one to any number, the embodiment of one video source being previously shown in FIG. 16 and the embodiment shown in FIG. 19 illustrating a plurality of video sources.

Still referring to FIG. 19, a first source of video 710 is coupled to a video image subtractor 733. A key signal A 723 is supplied to video image subtractor 733 and video image adder 783. The video image subtractor 733, responsive to the key signal A 723, produces a subtracted output 734 which is coupled to the video image adder 783. An additional source A 743 and control signal A 753 are supplied to image transformation subsystem 763, which produces an output A 764. The output A 764 is coupled to the video image adder 783, which responsive to key signal A 723 produces a composited output 784.

Continuing to refer to FIG. 19, a key signal B 726 is supplied to video image subtractor 736 and video image adder 786. The composited output 784 is coupled to the video image subtractor 736. The video image subtractor 736, responsive to key signal B 726, produces a subtracted output 737 which is coupled to the video image adder 786. An additional source B 746 and control signal B 756 are supplied to image transformation subsystem 766, which produces an output B 767. The output B 767 is coupled to the video image adder 786, which responsive to key signal B 726 produces a final composited output 785.

Still referring to FIG. 19, the key signals 723, 726 may be supplied from a variety of sources such as those referenced in FIGS. 17 and 18 and accompanying description. Control signals 753 and 756 may be independently supplied, or may be supplied from a common source of control signals, or may be independently derived from the respective additional sources 743, 746. The additional sources 743, 746 may each be independently supplied, or may be supplied from a common source of video signals. Supplying additional sources 743, 746 from a common source of video signals does not mandate control signals 753, 756 respectively also be supplied from the same common source of video signals or any common source of control signals.

Figure 20:
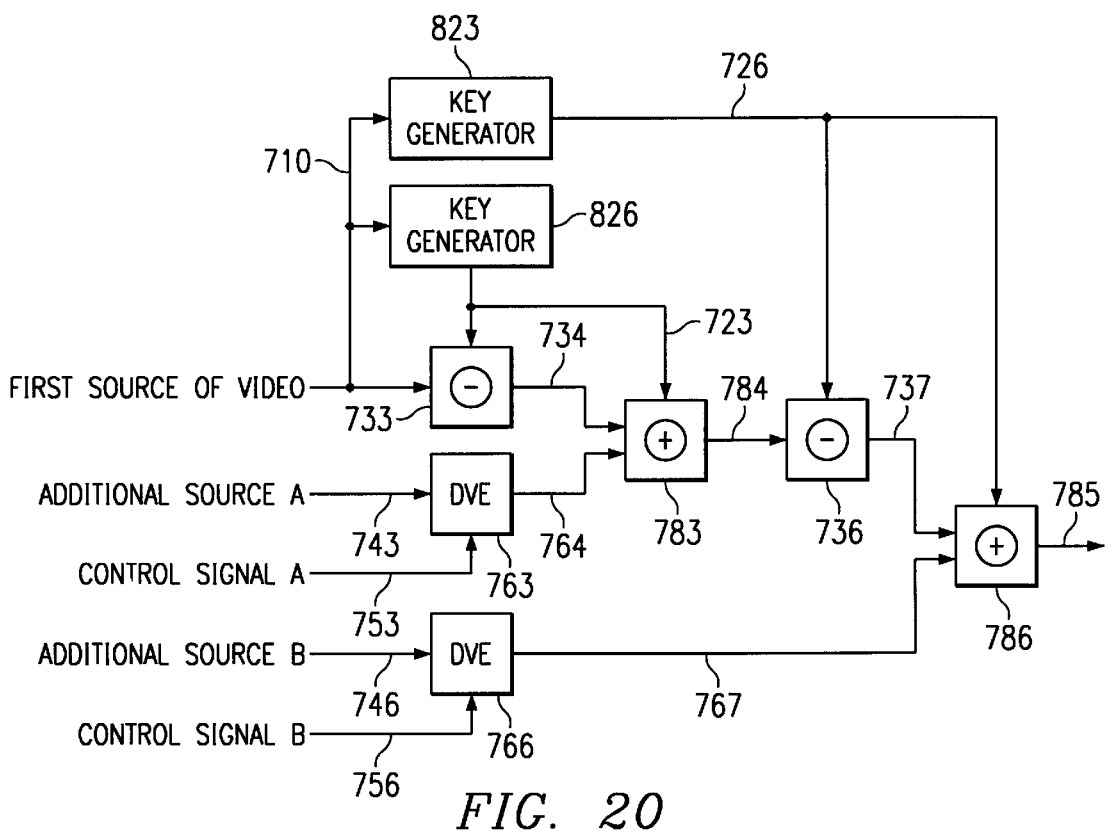
FIG. 20 is a detailed block diagram of another alternate embodiment of a video processing flow as in FIGS. 18 and 19.

Referring to FIG. 20, the system of FIG. 19 is illustrated in a specific embodiment wherein the first source of video 710 is processed by key generators 823, 826 to generate the key signals 723, 726 respectively. A first source of video 710 is coupled to a video image subtractor 733 and to key generators 823 and 826. The key signal generator output A 723 is coupled to video image subtractor 733 and video image adder 783. The video image subtractor 733, responsive to the key signal generator output 723, produces a subtracted output 734 which is coupled to the video image adder 783. An additional source A 743 and control signal A 753 are supplied to image transformation subsystem 763, which produces an output A 764. The output A 764 is coupled to the video image adder 783, which responsive to key signal generator output A 723 produces a composited output 784.

Continuing to refer to FIG. 20, a key signal generator output B 726 is coupled to video image subtractor 736 and video image adder 786. The composited output 784 is coupled to the video image subtractor 736. The video image subtractor 736, responsive to key signal generator output B 726, produces a subtracted output 737 which is coupled to the video image adder 786. An additional source B 746 and control signal B 756 are supplied to image transformation subsystem 766, which produces an output B 767. The output B 767 is coupled to the video image adder 786, which responsive to key signal generator output B 726 produces a final composited output 785.

Still referring to FIG. 20, control signals 753 and 756 may be independently supplied, or may be supplied from a common source of control signals, or may be independently derived from the respective additional sources 743, 746. The additional sources 743, 746 may each be independently supplied, or may be supplied from a common source of video signals. Supplying additional sources 743, 746 from a common source of video signals does not mandate control signals 753, 756 respectively also be supplied from the same common source of video signals or any common source of control signals.

Figure 21:
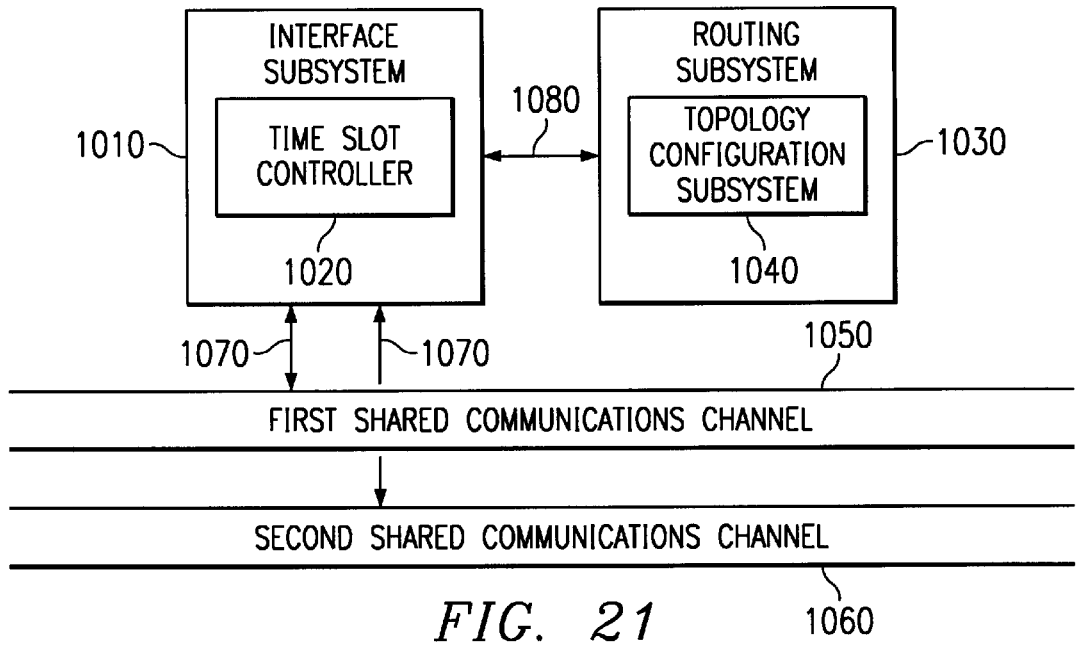
FIG. 21 is a block diagram of an architecture for the practice of the present invention.

Referring to FIG. 21, a routing interface system for communicating multiple independent data streams within time division multiplexed time slots is illustrated. The system is comprised of an interface subsystem 1010, a time slot controller 1020, a routing subsystem 1030, a topology configuration subsystem 1040, a first shared communications channel 1050, and a second shared communications channel 1060. In operation, the data streams on the first shared communications channel 1050 and the second shared communications channel 1060 move in counter-rotating directions. Data streams are communicated between the first shared communications channel 1050, the second shared communications channel 1060, and the interface subsystem 1010 as data signals 1070. The routing subsystem 1030, in combination with the topology configuration subsystem 1040, defines the time slots in which data on the first shared channel 1050 and the second shared channel 1060 are valid. Communication between the routing system 1030 and the interface subsystem 1010 (including the time slot controller 1020) is effected through control signals 1080. Specifically, the routing subsystem 1030 is responsive to the time slot controller 1020. In the case that multiple interface subsystems 1010 are connected to the first shared communications channel 1060, each interface subsystem 1010 is coupled to its neighbors in a point-to-point cascaded connection defined by the routing subsystem 1030. An advantage of point-to-point routing capability is that data streams can be selectively routed to interface subsystem 1010 in a system having more than one interface subsystem 1010. An advantage of having a time-slot controller 1020 is that data can be selectively processed at the pixel level.

Figure 22:
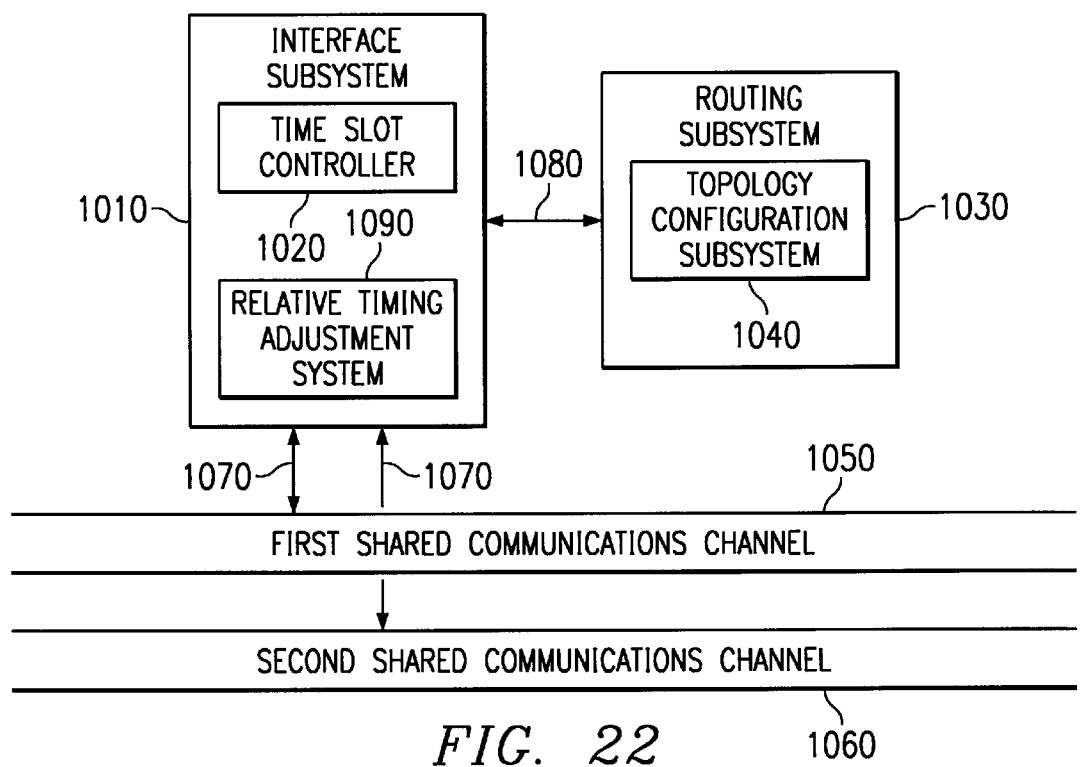
FIG. 22 is a block diagram of the architecture of the invention of FIG. 21, with an improvement relating to a relative timing adjustment system.

Referring to FIG. 22, a relative timing adjustment system 1090 is added to FIG. 21 to illustrate an enhanced routing interface system. In the case where data signals on the first shared communications channel 1050 or the second shared communications channel 1060 represent time varying signals, and a time varying signal is directed by the routing system 1030 to the interface subsystem 1010, the relative time adjustment system can adjust the relative timing of a selected time varying signal to be synchronized with a reference signal. The relative timing adjustment circuit 1090 is designed to generate synchronized data streams where the input takes different forms.

First, the relative timing adjustment circuit 1090 is designed to generate a synchronized data stream where the time varying data signals 1070 are synchronized and coincident with the reference signal. Second, the relative timing adjustment circuit 1090 is designed to generate a synchronized data stream where the time varying signal is synchronized and offset to be non-coincident with the reference signal. Third, the relative timing adjustment circuit 1090 is designed to generate a synchronized data stream where the reference signal is a pre-defined fixed reference signal. Fourth, the relative timing adjustment circuit 1090 is designed to generate a synchronized data stream where the reference signal is one of the time varying signals.

Figure 23:
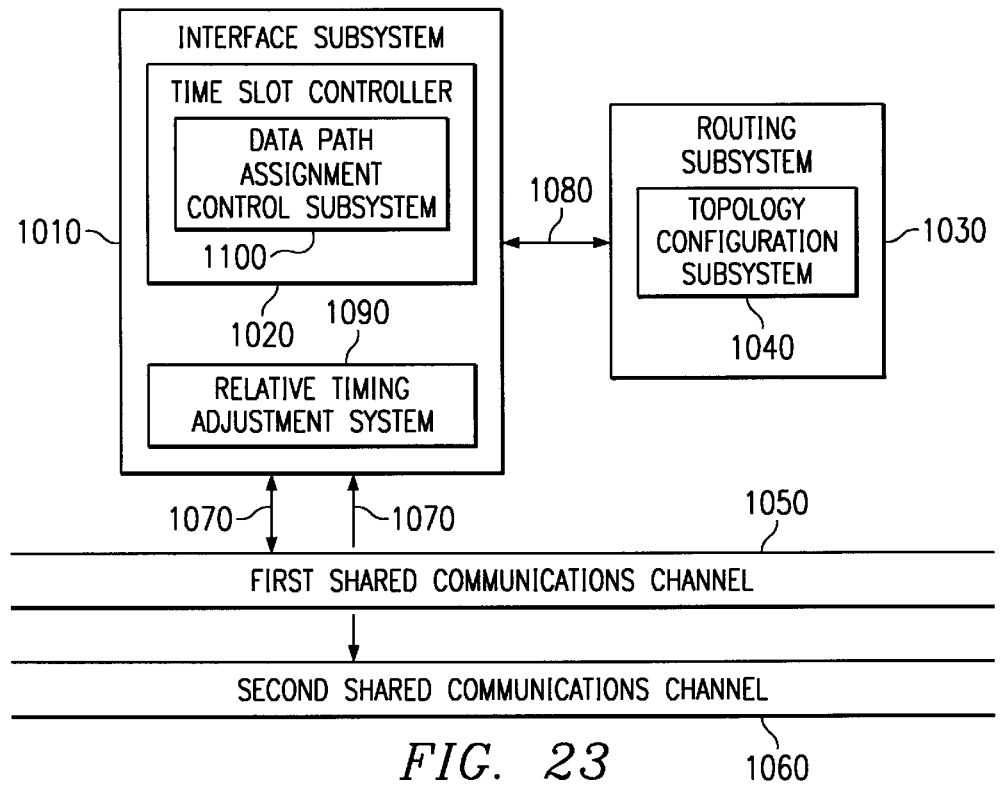
FIG. 23 is block diagram of the architecture of the invention of FIG. 22, with an improvement relating to a data path assignment control subsystem.

Referring to FIG. 23, a data path control subsystem 1100 is added to FIG. 22 as a subsystem of the time slot controller 1020. The function of the data path assignment control subsystem is to control the relative physical path of data signals 1070 on the first channel 1050 and the second channel 1060. In operation, the data signals 1070 are assigned to a subset of the first channel 1050, a subset of the second channel 1060, or a subset of a combination of the first channel 1050 and the second channel 1060. An advantage of sub-dividing the first channel 1050 and the second channel 1060 to match the channel requirements of the data signals 1070 is to achieve maximum efficiency in using first channel 1050 and second channel 1060. A second advantage of sub-dividing the first channel 1050 and the second channel 1060 is to maximize the number of interface subsystems 1010 that can communicate over first channel 1050 and second channel 1060.

Figure 24:
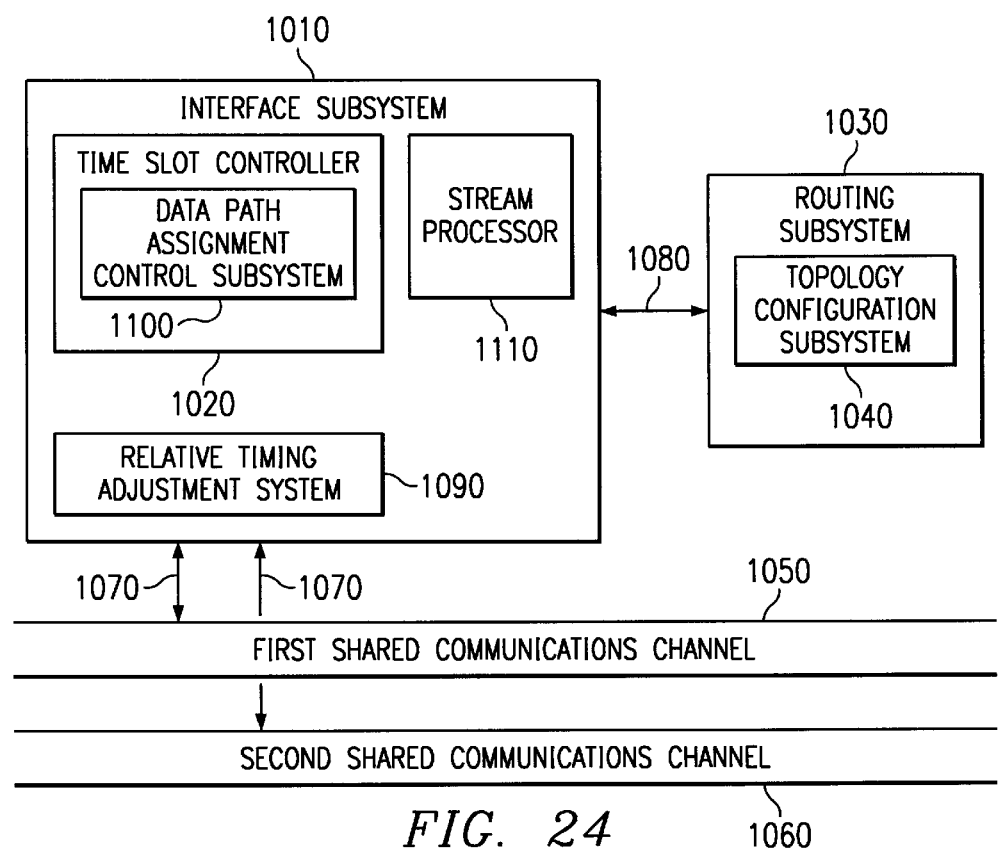
FIG. 24 is a block diagram of the invention of FIG. 23, with an improvement relating to a stream processor.

Referring to FIG. 24, a stream processor 1110 is added to FIG. 23 as a subsystem of the interface subsystem 1010. The purpose of the stream processor 1110 is to selectively process data signals 1070 from the first channel 1050 and the second channel 1060. Selectivity is applied in terms of both time and space. The processor 1110 performs time division demultiplexing and data division demultiplexing to select data signals 1070 to process. Processing of the data signals 1110 can consist of storing and re-outputting or any more complicated operations that can be performed on digital data. After processing, data signals 1070 are re-output by the stream processor 1110 to the first channel 1050 and the second channel 1060 by either time division multiplexing, data division multiplexing, or both time and data division multiplexing.

Figure 25:
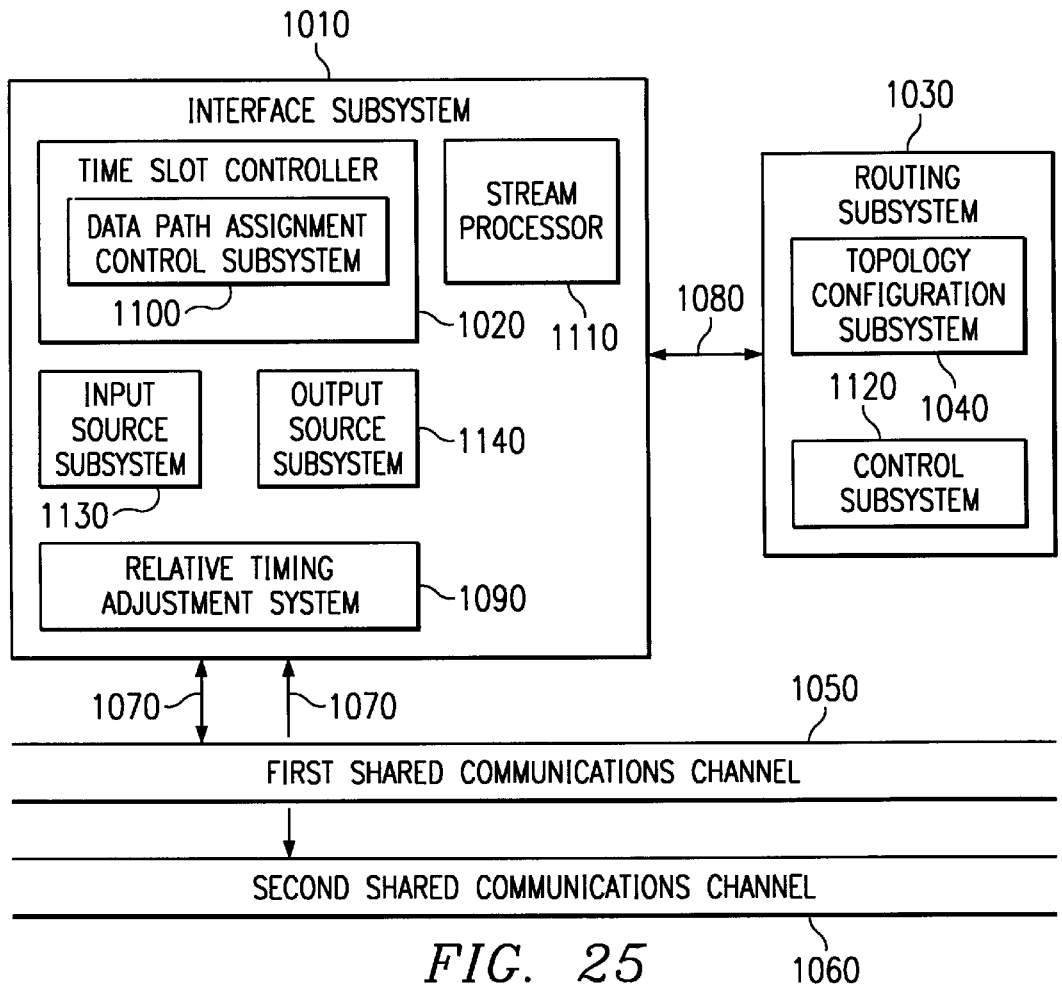
FIG. 25 is a block diagram of the architecture of the invention of FIG. 24, with an improvement relating to an input source subsystem and an output subsystem.

Referring to FIG. 25, a control subsystem 1120 is added to FIG. 24 as a subsystem of the routing subsystem 1030 for the purpose of coordinating the assignment of shared channel time slots. Still referring to FIG. 25, an input source subsystem 1130 and an output subsystem 1140 are added to FIG. 24. In operation, the stream processor 1110, the input source subsystem 1130, and the output source subsystem 1140 all communicate data signals 1070 over the first channel 1050 and the second channel 1060. The controller subsystem 1120, in combination with the time slot controller 1020, allocates the first channel 1050 and the second channel 1060 to one or more time slots within a periodic bus cycle. During an assigned time slot, the assigned first channel 1050 or the second channel 1060 can communicate via data signals 1070 with the input source subsystem 1130 and output subsystem 1140. The topology configuration subsystem 1040, in combination with the time slot controller 1020, allocates segments of the first shared channel 1050 and the second shared channel 1060 to a time slot in the periodic bus cycle for communicating data signals 1070 to the interface subsystem 1010. The time slot controller 1020, in combination with the data path assignment control subsystem 1100, allocates time slots and segments for communication to the interface subsystem based on the number of data streams requiring approximately concurrent communication, the bandwidth of each data stream, the physical location of the input source subsystem 1130 and output subsystem 1140, embodied in modules, and bandwidth limitation of the system imposed by the bandwidth of the first channel 1050, the second channel 1060, and the bandwidth of the input source subsystem 1130 and output subsystem 1140.

Figure 26:
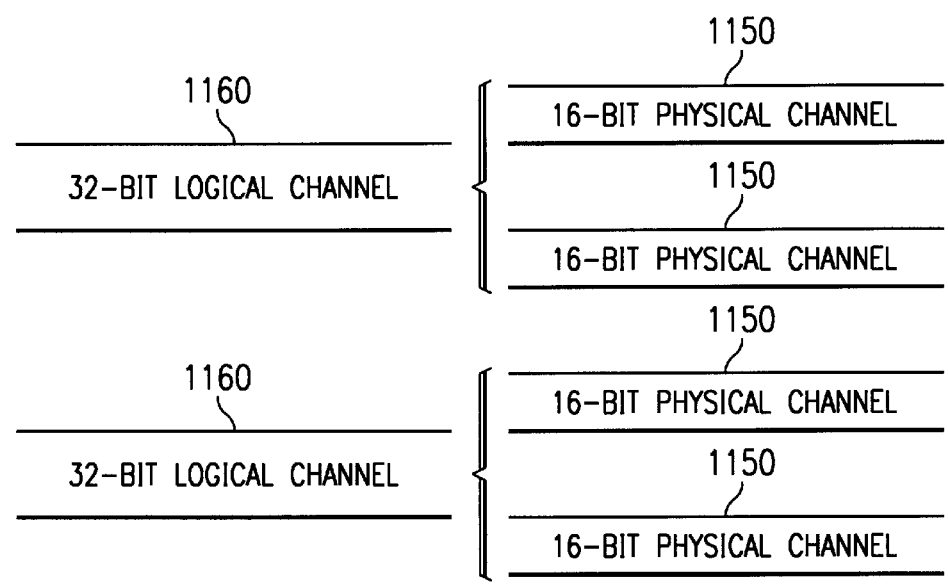
FIG. 26 is a diagram illustrating the relationship between 16-bit physical channels and 32-bit logical channels in the present invention.
Figure 27:
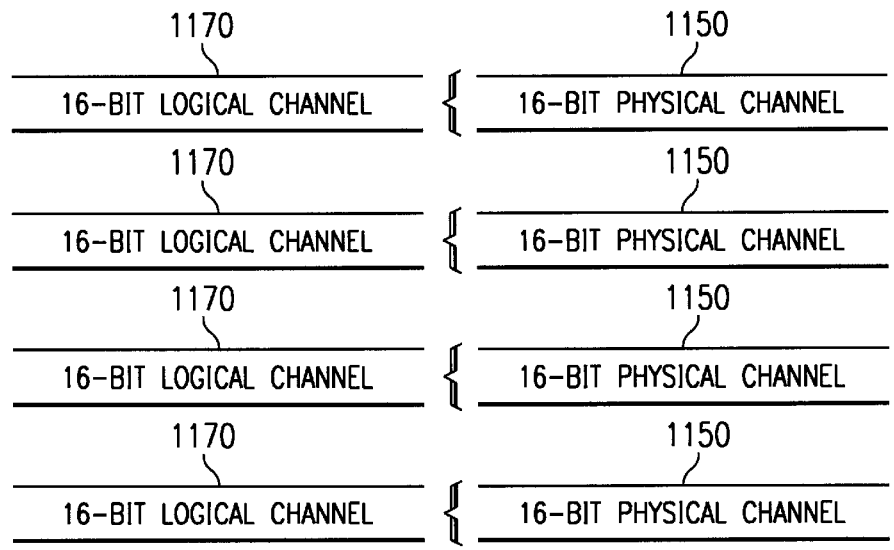
FIG. 27 is a diagram illustrating the relationship between 16-bit physical channels and 16-bit logical channels in the present invention.

One implementation of this invention is MediaBahn®, a product of Intelligent Resources Integrated Systems, Inc. MediaBahn facilitates high-speed data transfer between MediaBahn compatible cards. As illustrated in FIGS. 26 and 27, MediaBahn is composed of four 16-bit physical channels 1150, with two 32-bit logical channels 1160, or four 16-bit physical channels, with four 16-bit logical channels 1170. The number of physical and logical channels, and the bit width of each can be varied to optimize for a specific application. MediaBahn data is time-division multiplexed based on a multiple of the pixel clock frequency (PCLK), which is driven over the MediaBahn by a single PCLK master. A PCLK multiplier determines the number of possible logical channels. Operation at 1×, 2×, and 4×PCLK is supported. For other applications, other multiples can be supported (e.g., ×8, ×16, etc.). Thus, this is a scaleable solution. The MediaBahn itself carries only the 1× clock, and individual cards multiply this frequency to decode the interleaved data on the MediaBahn. The data interface to the host board can run at any of the available clock rates, allowing for multiplexing on the host board as well.

The MediaBahn topology is an enhancement of the current VideoBahn "cascade" topology, modified for higher throughput and flexibility. The VideoBahn topology is available in the Video Explorer board set commercially available from Intelligent Resources Integrated Systems, Inc. and described in commercially available literature, such as "Technical Introduction to VideoBahn".

VideoBahn does not have the raw bandwidth necessary for the compositing operations in the present invention, and the VideoBahn architecture is very limiting in the routing available between cards in a VideoBahn system. MediaBahn overcomes this limitation by vastly increasing both the available bandwidth for cards in a system and by a similar increase in the available routing resources. MediaBahn provides the bandwidth necessary to support the multiple sources of video, multiple key channels, ancillary data, depth data, alpha channels, and control signals throughout the invention described here. The MediaBahn architecture also provides the routing flexibility and resources necessary to connect the subsystems of the present invention into a implementable system.

Figure 28:
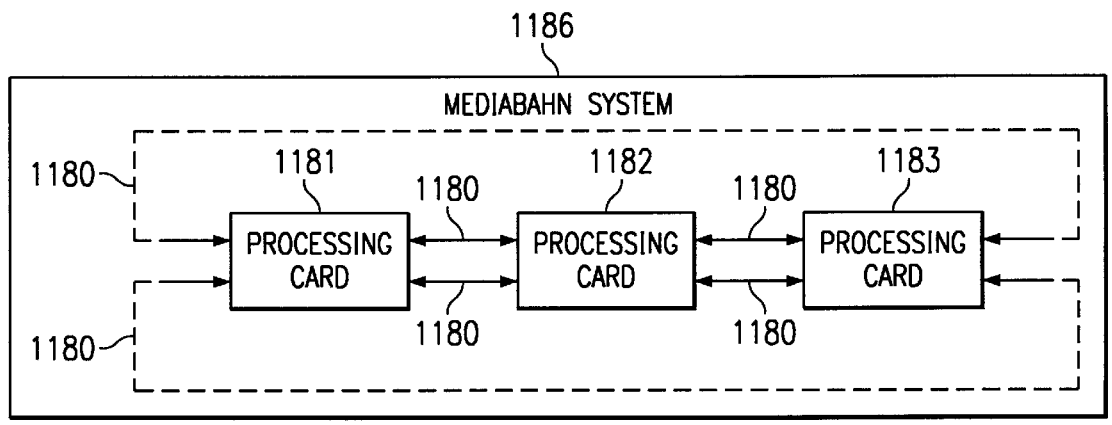
FIG. 28 is a block diagram illustrating that universe of data directions in the present invention.

Referring to FIG. 28, the physical data channels 1180 for a MediaBahn system between processing cards 1181, 1182, and 1183 are illustrated. Although the arrows are bi-directional, once a data flow direction is selected for the system, data flows in only one (programmable) direction along the segment. This way, if there is clock skew among regenerated clocks on different processing cards, it will not result in bus collisions.

Figure 29:
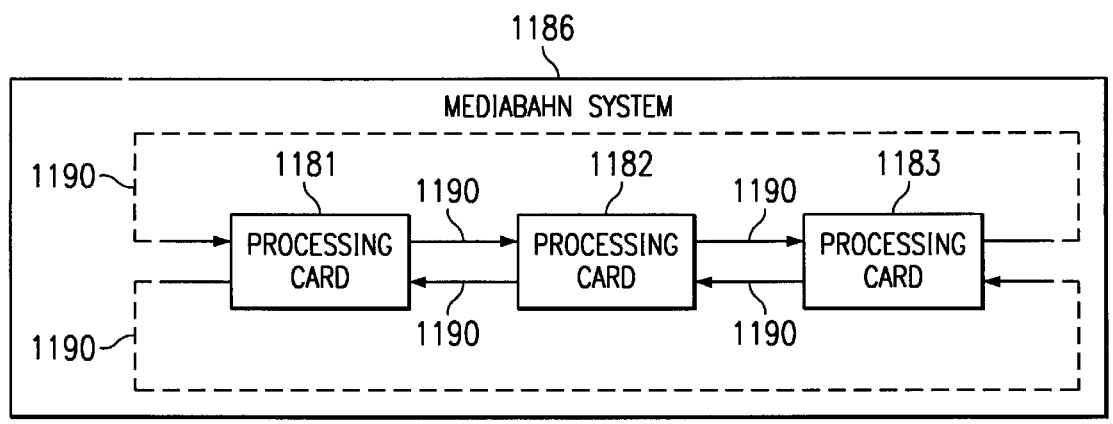
FIG. 29 is a block diagram illustrating two counter-rotating data streams of the present invention.

Referring to FIG. 29, a preferred embodiment is illustrated. As illustrated, the recommended mode of operation shows how data flows in one direction along a physical channel segment 1190 between processing cards 1181, 1182, and 1183. As illustrated, each segment 1190 in the diagram is a 16-bit physical data channel with associated control signals.

Physical channel segments comprise sixteen data lines and four control lines, and couple a MediaBahn compatible device to one adjacent MediaBahn compatible device. Physical channel segments are grouped into physical channel segment pairs (PCSP). PCSPs couple one or two adjacent MediaBahn devices to a MediaBahn compatible device. The MediaBahn device has the capability to independently drive either or both of the PCSs in a PCSP. The MediaBahn device also has a bypass capability which couples both PCSs in a PCSP together in an arrangement that allows uninterrupted data flow between the PCSs.

Note that the optional paths indicated by the dashed lines in FIGS. 28 and 29 provide increased routing flexibility, when implemented on the MediaBahn connector.

As illustrated, MediaBahn incorporates two types of communications channels: physical and logical. There are four physical channels, each of which can hold up to four logical channels. Thus, a given card can simultaneously send or receive sixteen independent video signals over MediaBahn. In addition, there are four physical channel segments per MediaBahn connector. Each of these can be configured for input or output independently.

Figure 30:
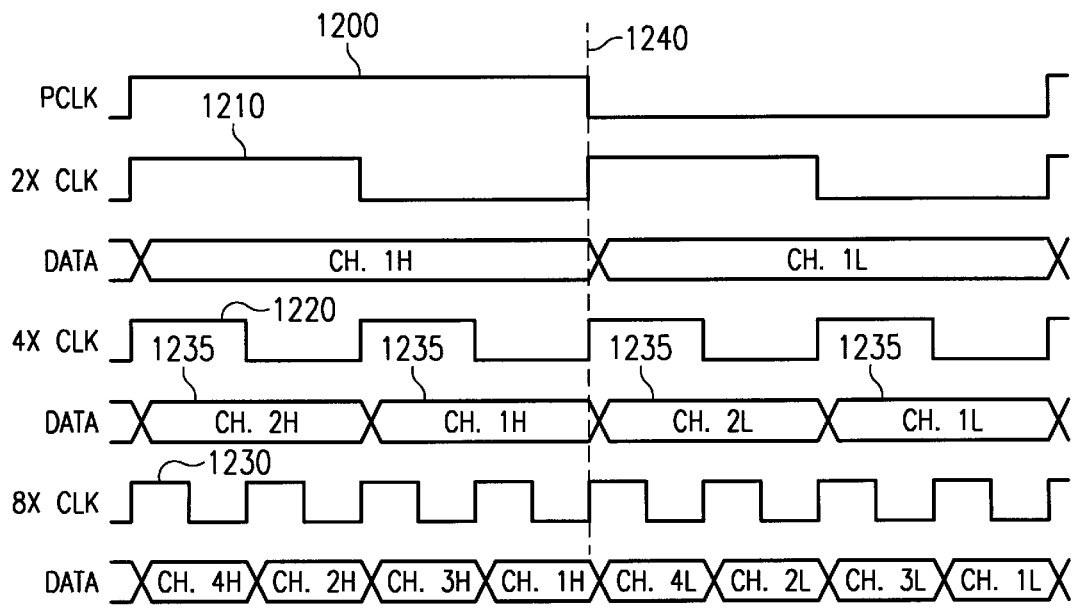
FIG. 30 is a timing diagram illustrating the relationship between the pixel clock and the 2×, 4×, and 8×clocks that provide for time division multiplexing in the present invention.

As illustrated in FIG. 30, a PCLK 1200 is subdivided into a 2×CLK 1210, a 4×CLK 1220, and an 8×CLK 1230. Each subdivided clock can thus multiplex several logical channels onto a single physical channel. For example, the MediaBahn is typically running at 4×PCLK or 4×CLK 1220 and thus, two 32-bit data channels are multiplexed by high and low words 1235 per PCLK 1200 cycle. In addition to providing higher system throughput, this architecture permits interface chips operating at different speeds to communicate with each other. A data line 1240 shows that critical sampling periods are maintained for downward and upward compatibility on relative clock time edges so that data communication at the highest multiple of the clock rate is compatible and communicative with all other multiple clock rates in the MediaBahn architecture.

Figure 31:
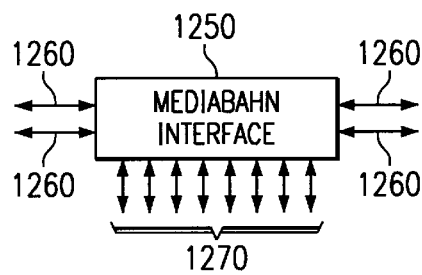
FIG. 31 is a block diagram illustrating the two interfaces in a preferred embodiment of the present invention.

FIG. 31 illustrates a MediaBahn interface subsystem 1250, which in the preferred embodiment can be built as an ASIC or can be constructed from multiple ICs. All four physical MediaBahn channels 1260 are routed and coupled to the interface subsystem 1250. The interface subsystem 1250 provides eight connection channels 1270 for coupling to the host card.

Bypass interconnects, which allow non-adjacent media-Bahn devices to "talk" to each other "through" some number of intervening MediaBahn devices, between MediaBahn physical channel segments allow data to flow through the chip with less than 1 ns propagation delay. The MediaBahn interface ASIC also synthesizes or accepts a multiplied PCLK signal to provide for time multiplexed operation.

Still referring to FIG. 31, in the preferred embodiment, each host card connection channel 1270, and each Media-Bahn channel 1260 segment has both a data channel (e.g., 16-bits) and an associated sync channel (e.g., 4 bits), exclusive of the other data and sync channels.

In an alternate embodiment, there is no separate sync channel, and a digital delay (relative to a reference) sync signal is communicated over the respective data channel, embedded in its respective data, or communicated concurrently on a separate data channel, or communicated during a different time slot on the same or another data channel.

Still referring to FIG. 31, the host card connection channels 1270 are used to interface mediaBahn data with the host card. They run at a clock rate synchronous with the pixel clock; they do not necessarily run at the same rate as the MediaBahn channels 1260. Connection channels 1270 can operate at the normal PCLK rate, or can be clocked and operated in a time division multiplexed manner, in the same manner as the MediaBahn channels 1260, for use as connections between multiple MediaBahn interface chips.

Continuing to refer to FIG. 31, connection channels 1270 can selectively alternate incoming and outgoing data on the same physical channel, since subsystem and chips on a single card run from the same clock. However, it is recommended that MediaBahn channels not be used in this manner, since there can be clock skew in regenerated clocks among other chips interfacing to the MediaBahn.

Still referring to FIG. 31, the functional differences between MediaBahn channels 1260 and connection channels 1270 are that the MediaBahn channel 1260 in a physical channel segment pair can be coupled together in a bypass mode, and higher current output drivers are used to drive MediaBahn channels 1260. In a preferred embodiment, one or more pairs of connection channels 1270 also have higher current drivers to facilitate a MediaBahn bridge to a host card local MediaBahn. A MediaBahn interface to an external out-of-box system can be accomplished using differential or optical drivers to couple to and from the external system, so as to provide noise immunity, increased transmission range, and electrical and electromagnetic isolation.

In reference to FIG. 31, data on any physical MediaBahn channel 1260 can be bypassed via the bypass interconnects onto any other physical MediaBahn channel 1260, but the data remains in its original logical time-slice. This simplifies the implementation without compromising routing flexibility. When a channel is driven for output, the bypass interconnects for that channel are disabled to avoid bus collisions. Thus, cards that are physically located between the sender and receiver do not send or receive during the time bypass interconnects are disabled. Any MediaBahn compatible channel can alternatively be selectively configured as a connection channel for exchanging data with the host card. This allows MediaBahn interface chips to be tied together to perform host system routing functions.

A key element of the MediaBahn is the ability to pass data through cards without any significant propagation delay. This allows various MediaBahn segments to be chained together into a bus topology, without giving up the flexibility of a segmented topology.

Bypassing is accomplished by a mechanism similar to the Quality Semiconductor "QuickSwitch" family of devices. These devices employ a scheme that exhibits a propagation delay of 250 ps, and permits two buses to be isolated from one another.

In operation, two MediaBahn channels can be tied together via a FET. When the FET is turned on, it acts like a wire connection between the two channels, and data flows freely without any appreciable propagation delay. When turned off, the two channels become isolated, allowing them to be used individually. Note that this method allows for bypass operation while "siphoning" data from the MediaBahn.

When enabled, the bypass is always turned on, except when one of the physical channels connected to it is being driven with data. The bypass can also be disabled, which causes the channels to be isolated regardless of their operation. This mechanism allows programmable flexibility without allowing the device to be programmed in a configuration that would cause bus contention. Typically, the bypass mechanism would be enabled between channels that flow in the same direction, and disabled between channels that flow in opposite directions. Any two physical channels of the same polarity (input or output) must have the bypass disabled. When inserting data into a logical time-slice on a physical channel, the act of outputting data isolates the bypass, interrupting the flow so that new data now resides in that logical channel. This mechanism also allows chips of differing clock speeds to function together and communicate along the same physical channels.

Figure 32:
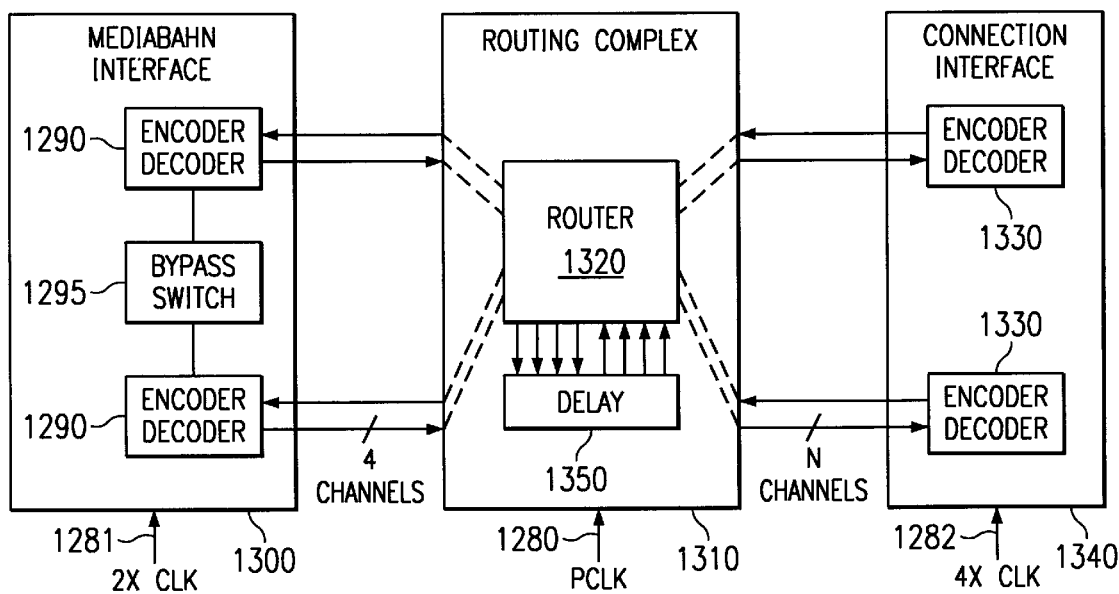
FIG. 32 is a block diagram illustrating the relationship between the interface of FIG. 31 and the routing complex.

FIG. 32 illustrates the MediaBahn interface subsystem 1250 ASIC of FIG. 31 in greater detail, and further illustrates how the subsystem blocks of FIG. 32 can be used to perform various functions.

Referring to FIG. 32, PCLK 1280 represents the MediaBahn pixel clock from which all other clock signals are derived. In the illustrated example of FIG. 32, the MediaBahn is running at a 2×PCLK 1281 clock rate, but connections on the host card are running at a 4×PCLK 1282 clock rate. Data is first decoded via MediaBahn encoder-decoder 1290 from the MediaBahn interface 1300 at 2×rates. The data is then passed into the routing complex 1310, where it is routed via router 1320, and re-clocked by PCLK 1280. The data is then sent to the host card via connector encoder-decoder 1330 from the connection interface 1340 at a 4×clock rate. There is a separate encoder-decoder block for each physical channel. The delay block 1350 associated with the router 1320 allows for delay equalization of signals (functionally equivalent to that accomplished using Video Delay Lines (VDL) ASICs commercially available from Intelligent Resources).

Still referring to FIG. 32, the routing complex 1310 receives input of four channels from each of the twelve encoder-decoder 1290 blocks, and provides outputs to N channels 1360. In operation, four channels can be compressed onto a single channel, in which case N=1, or four channels may be broadcast to four or more than four channels, in which case N equals the number of channels broadcast to. As discussed with reference to FIG. 31, each channel is comprised of a data subchannel and a sync subchannel. All incoming data that is not bypassed is clocked by PCLK 1280 in the routing complex 1310. Sync signals are routed and may be equalized to the data video streams. The routing complex receives input of four logical channels from the decode portions of each of the twelve encoder-decoder 1290 blocks, representing a total of (4×12= 48) logical input channels. The routing complex 1310 provides (48÷2=24) logical output channels in parallel to the encoder portions of each of the twelve encoder-decoder 1330 blocks. Logical output channels of the routing complex are clocked by PCLK 1280, thus any data path through the routing complex incurs a one-PCLK delay.

Continuing to reference FIG. 32, it is not necessary for the routing complex 1310 to provide more than (48÷2=24) logical output channels because each of the independent encoder-decoder blocks must be configured exclusively for input or output; a routed path requires both an input and an output, therefore only twenty-four paths are necessary. Data which flows between physical channel segments via the bypass mechanism does not go through the routing complex, and thus incurs only signal propagation delays.

Still referring to FIG. 32, within the routing complex 1310, there are N video routing blocks, and N sync routing blocks. Since the MediaBahn interface 1300 can provide up to forty-eight incoming video streams, the routing complex 1310 must provide adequate levels of flexibility without necessarily providing complete cross-point functionality. Regardless of the possible number of incoming video signals, N determines the number of data paths through the routing complex. N=24 is an adequate solution, providing twenty-four 16-bit data paths or twelve 32-bit paths. However, N can vary depending upon implementation from N=1 at a minimum, up to the number of encoders plus decoders present.

Figure 33:
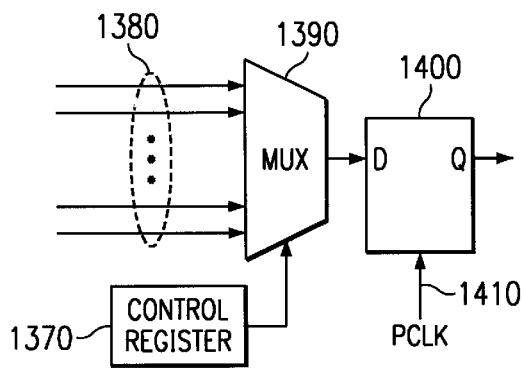
FIG. 33 is a detailed block diagram of the video routing block that is a subsystem of the router of FIG. 32.

FIG. 33 illustrates FIG. 32's router 1320 of the routing complex 1310 in greater detail. The video routing of the router 1320 is composed of N sections, each 16 bits wide. All sections are controlled by a single control register 1370. This register 1370 selects which of the forty-eight possible incoming sources 1380 of video or other data shall be routed by multiplexor 1390 to register 1400. The source is then clocked at pixel clock (×1) 1410 rates. This provides a stable time base for data flowing through the chip. A limited number of these sections are implemented using variable delay lines (VDL) to support equalization of video signals.

Figure 34:
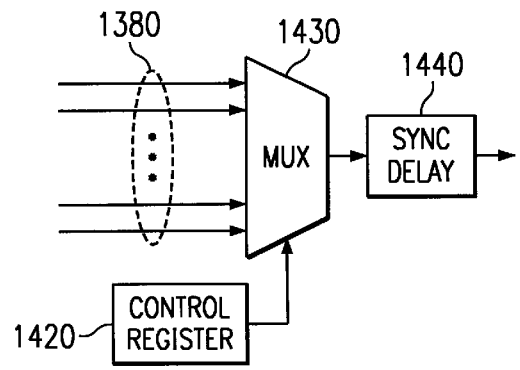
FIG. 34 is a detailed block diagram of the sync routing block that is a subsystem of the router of FIG. 32.

FIG. 34 illustrates the sync routing of FIG. 32's router 1320 and the delay block 1350. A sync control register 1420 selects from incoming sources 1380 by gating the selected one of the incoming sources 1380 through the sync multiplexor 1430 to the sync delay 1440. Sync routing operates similarly to the video routing illustrated in FIG. 33. The function of this sync routing is not only to perform routing of the four sync signals, but also to selectively provide for delays or delay of sync to compensate for external processing of the video streams associated with those sync signals, since MediaBahn sync signals must be coincident with their video streams. In the case where video is being routed from an input module, through an external process, to an output module, the sync delay would take as its source the input module sync, and delay it by an amount equal to the pipeline delay of the external process. The sync delay may provide greater delay capabilities than VDL blocks Given the time division multiplexed nature of the MediaBahn, data must be decoded from the requested channel, and/or encoded onto the proper channel. These functions are associated not only with MediaBahn interface channels but also with the connection channels, since data can be exchanged between chips in a multiplexed fashion.

Figure 35:
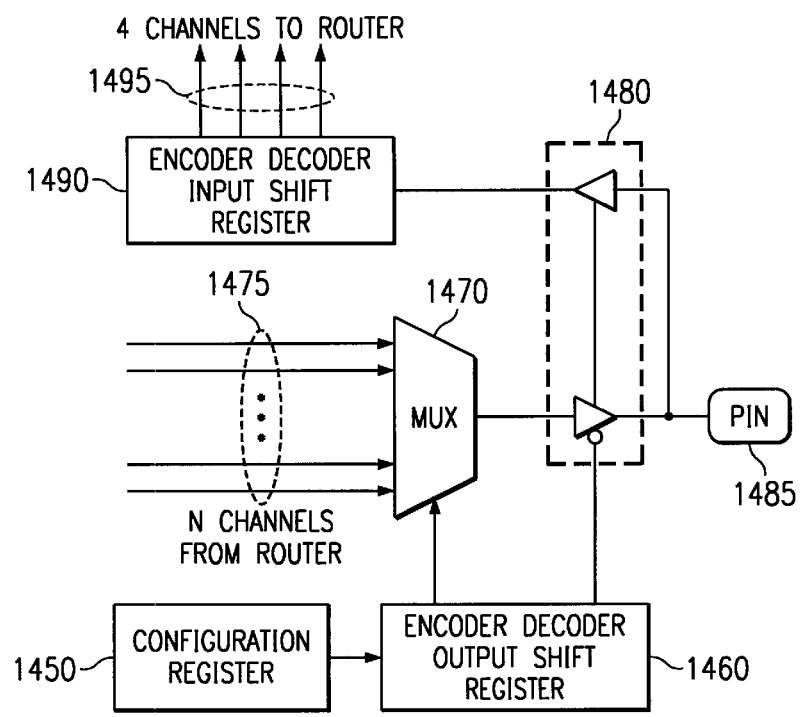
FIG. 35 is a detailed block diagram of the encoder-decoder subsystem of FIG. 32.

Referring to FIG. 35, the illustrated encoder-decoder is controlled by a configuration register 1450 that determines the operation of the encoder-decoder during each logical time-slice. During each MediaBahn bus cycle (defined by PCLK), the contents of the configuration register 1450 are loaded in parallel into the encoder-decoder output shift register 1460, which then shifts out data at the multiplied clock rate. The output shift register 1460 is used to control the encoder-decoder multiplexor 1470, the encoder-decoder input/output buffer 1480, and the bypass enables. The input/output buffer 1480 selectively drives I/O pin 1485 responsive to the encoder/decoder output shift register 1460. The encoder-decoder input shift register 1490 de-serializes incoming data on the logical channels at a multiple of PCLK, and then makes the data on the channels available to the routing section which latches them once each PCLK cycle. Each encoder-decoder is capable of running from PCLK, 2×PCLK, or 4×PCLK on an individual basis. This provides flexibility in timing the various inputs and outputs.

Figure 36:
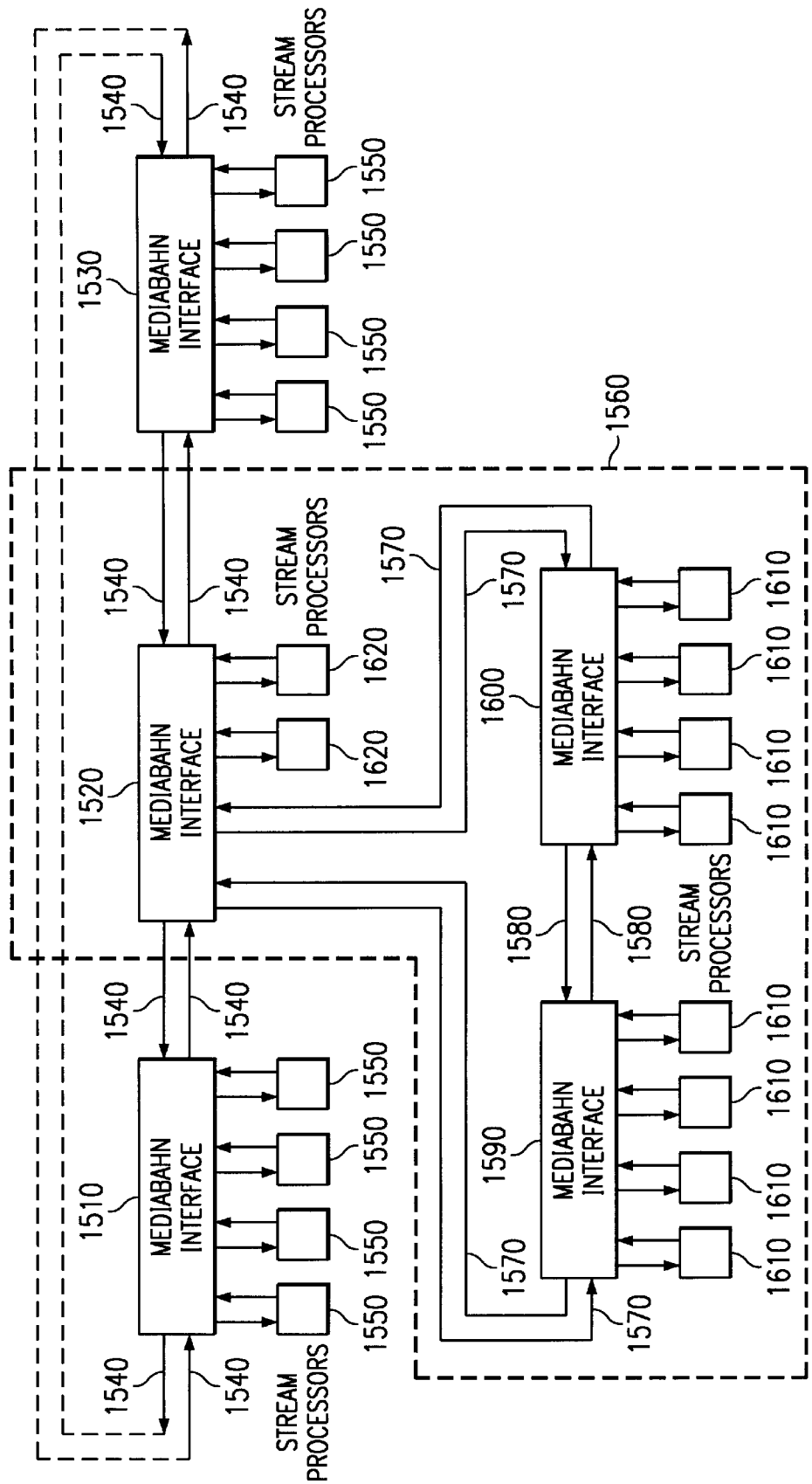
FIG. 36 is a block diagram of an alternate connection architecture of the current invention.

Referring to FIG. 36, an embodiment of the present invention is shown in which the connection channels 1270 of FIG. 31 can be utilized as MediaBahn channels 1270 to connect entire an MediaBahn system 1560 as a subsystem of another MediaBahn system. In FIG. 36, MediaBahn interfaces 1510, 1520, and 1530 are coupled in the preferred serial cascade arrangement via buses 1540. The MediaBahn interfaces 1510, 1530 are each respectively coupled to a plurality of stream processors 1550. The stream processors 1550, responsive to automatic control software or user interaction, perform processing on signals routed via the MediaBahn interfaces 1510, 1530 and output results back to the MediaBahn interfaces 1510, 1530 for further routing and processing.

Still referring to FIG. 36, the MediaBahn interface 1520 is coupled via connection channels 1570 to MediaBahn interfaces 1590, 1600, wherein all three MediaBahn interfaces 1520, 1590, 1600 comprise a MediaBahn subsystem 1560. The connection channels 1570 are configured within MediaBahn interface 1520 to operate in a compatible mode, allowing direct coupling to the MediaBahn connection channel inputs and outputs present on MediaBahn interfaces 1590, 1600. MediaBahn interfaces 1590, 1600 are coupled to each other via MediaBahn connection channel 1580, identical to the connection channels 1270 of FIG. 31 and the connection channels 1540 of FIG. 36. In the preferred embodiment, MediaBahn interfaces 1590, 1600 are connected via a serial cascade arrangement similar to that of MediaBahn interfaces 1510, 1520, 1530. MediaBahn interfaces 1590, 1600 are also coupled via their respective connection channels to stream processors 1610.

Still referring to FIG. 36, the MediaBahn interface 1520 may have additional connection channels coupled to stream processors 1620 in addition to the connection channels 1570 operating in the compatible mode. Utilization of additional connection channels allows more efficient use of available time slots and bus bandwidth within the system. FIG. 36 illustrates how MediaBahn interfaces 1590, 1600, comprising a complete MediaBahn subsystem, may be integrated into a larger MediaBahn hierarchy using the compatible mode of connection channels 1570 on MediaBahn interface 1520.

It is understood that the technique illustrated in FIG. 36 is not limited to the two MediaBahn interfaces 1590, 1600 within subsystem 1560. Any quantity of MediaBahn interfaces comprising a MediaBahn system, from one to any number, may be thus inserted into another MediaBahn system for increased processing power or to include larger numbers of stream processors to realize a system.

Figure 37:
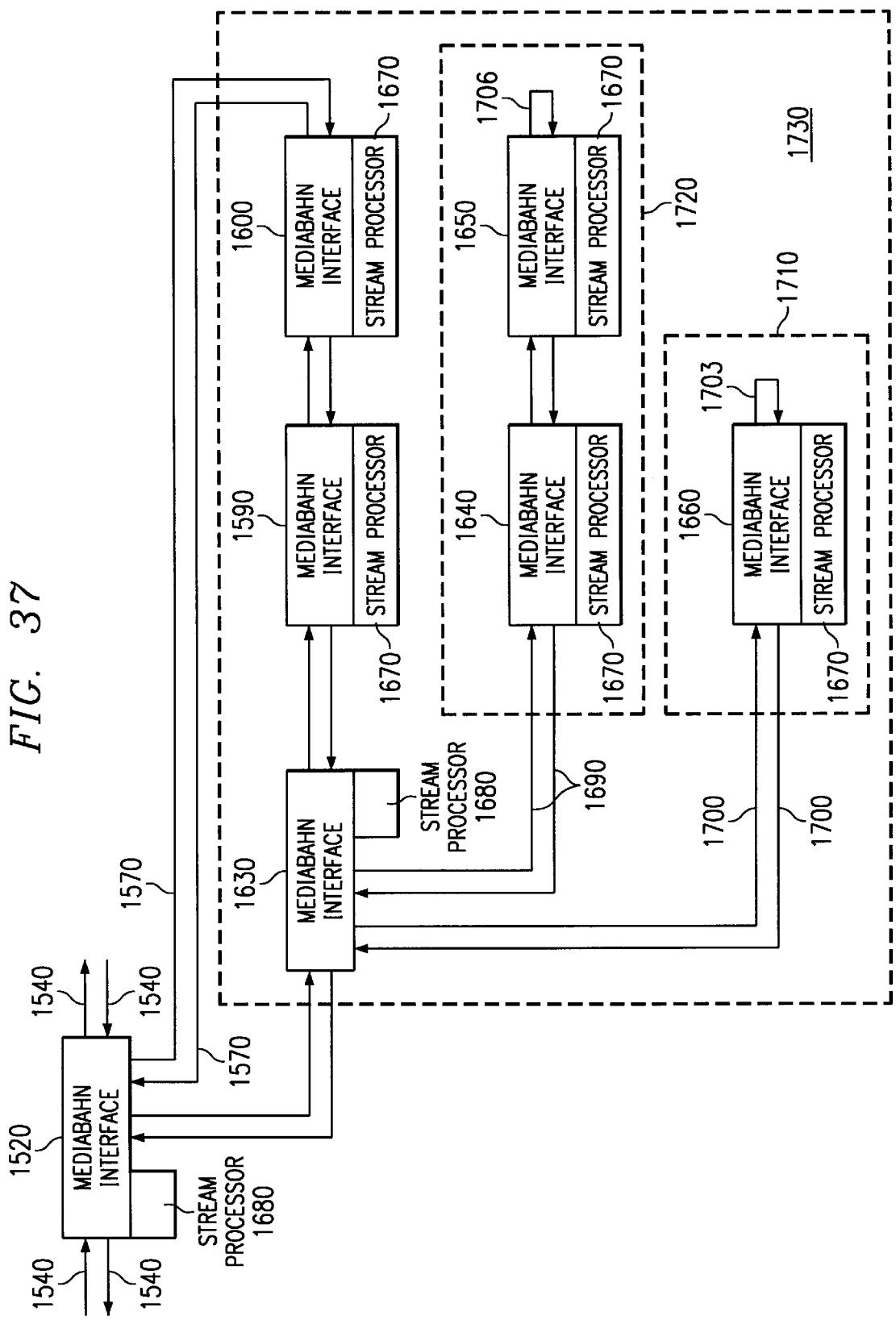
FIG. 37 is a block diagram of another alternate connection architecture of the current invention.

Referring to FIG. 37, an alternative embodiment of the example shown in FIG. 36 is illustrated. In FIG. 37, a MediaBahn system including a MediaBahn interface 1520 coupled via MediaBahn interface channels 1540 is shown, and to stream processors 1680. MediaBahn interface 1520 is also coupled to additional MediaBahn interfaces 1630, 1600 via connection channels 1570 operating in a compatible mode.

Still referring to FIG. 37, MediaBahn interfaces 1630, 1590, 1600 are connected in the preferred serial cascade arrangement, wherein interfaces 1590, 1600 in FIG. 37 are connected to stream processors 1670 in a manner analogous to interfaces 1590, 1600 of FIG. 36 are connected to stream processors 1610 of FIG. 36. In FIG. 37, MediaBahn interface 1630 is also coupled via connection channels 1690, 1700 to MediaBahn interfaces 1640, 1660 respectively and to stream processors 1680 on the connection channels not used to couple to MediaBahn interfaces 1640, 1660.

Also shown in FIG. 37 are MediaBahn interfaces 1640, 1650 connected in an alternative wrap-back serial connection architecture which is different from the preferred serial cascade architecture. This alternative wrap-back serial connection architecture is a way to maintain counter-rotating streams of video data whilst requiring the use of only one pair of connection channels operating in compatible mode from MediaBahn interface 1630. MediaBahn interface 1660 illustrates the degenerate case of only one MediaBahn interface in the alternative wrap-back serial connection architecture, wherein the external wrap-back path 1703 is optional and may be implemented by routing within the MediaBahn interface 1660 responsive to MediaBahn routing software. In an analogous manner, external wrap-back path 1706 is optional and may be implemented by routing within the MediaBahn interface 1650 responsive to MediaBahn routing software.

Further shown in FIG. 37 are a plurality of leaf nodes 1710, 1720, 1730 comprising MediaBahn subsystems linked via connection channels operating in the compatible mode. MediaBahn interfaces 1640, 1650 comprise one leaf node 1590, and MediaBahn interface 1660 comprises another leaf node 1710, both coupled to the MediaBahn interface 1630 via connection channels 1690, 1700 respectively. Further, a leaf node 1730 is comprised of MediaBahn interfaces 1630, 1590, 1600 and leaf nodes 1710, 1720. It is to be understood that the number and arrangement of leaf nodes is not fixed as shown in the diagram; any number of leaf nodes may be connected to the connection channels operating in compatible mode, from one to a number subject only to the limit of the number of connection channels available on a MediaBahn interface. Further, each leaf node may in turn be comprised of additional leaf nodes pursuant to the requirements of the MediaBahn system as a whole, and as illustrated in FIGS. 36 and 37 each leaf node may comprise different connection architectures including but not limited to the preferred serial cascade connection architecture and the wrap-back serial connection architecture.

Referring to FIG. 38, embodiments of an apparatus of this invention for sensing depth of objects in view on a pixel-by-pixel basis for supply to the processing portion of this invention are shown in block diagram form. In one embodiment, a video camera 1800 is attached to a depth sensing imaging system 1805. Video cameras are commercially available from sources such as Sony, JVC, Ikegami, and others. The video camera 1800 accepts light representing an image through lens and focusing assembly 1810 producing an image on sensor 1820. Sensor 1820 transduces the incidence of light into electrical signal 1830 representing time-varying video image signals. The video signals 1830 are supplied to the system and to the combiner/encoder 1845.

Still referring to FIG. 38, in a manner analogous to the video camera 1800, the depth sensing imaging system 1805 accepts mechanical sound or light or other form of electromagnetic radiation representing an image through lens/focusing assembly 1815 producing an image on sensor 1825. Sensor 1825 transduces the incidence of sound energy or radiation into electrical signal 1835 representing time-varying depth information in video signal form. The wavelengths of radiation used in the depth sensing imaging system in the illustrated embodiment are unrelated to those of the visible light transduced by light sensor 1820, as is sound mechanical energy. The preferred embodiment is to utilize wavelengths invisible to the sensor 1820 in the video camera 1800 such as infrared light or mechanical sound. The video depth signal 1835 is supplied to the system and to the combiner/encoder 1845.

Still referring to FIG. 38, the combiner/encoder accepts video image signal 1830 and video depth signal 1835 and responsive thereto produces an output encoded signal 1845 to the system. The output encoded signal may have the depth information modulated onto the video signal using a carrier, or, in the preferred embodiment, the depth information is conveyed to the system as an alpha channel of video.

Again referring to FIG. 38, a preferred embodiment of the apparatus for sensing depth of objects in view on a pixel-by-pixel basis is shown in block form. In this embodiment, video camera 1850 has an integrated depth sensing subsystem 1855. A splitting apparatus 1870 deflects selected wavelengths or energy received by lens and focusing assembly 1860 into depth imaging sensor 1885, while passing selected visible light wavelengths to sensor 1880. Suitable splitting apparatus 1870 include beam splitters, optical prisms, half-silvered mirrors, filters, and other means readily commercially available from such vendors as Edmund Scientific, Ikegami, Canon, Minolta, and Sharp. The light sensor 1880 transduces incident light into a video image signal 1890, and the sensor 1885 transduces incident radiation or mechanical energy into a video depth signal 1895. The video image signal 1890 and the video depth signal 1895 are supplied to the system and to the encoder/combiner 1900. The encoder/combiner 1900 produces an output encoded video signal 1905 responsive to the video image signal 1890 and the video depth signal 1895 and supplies the output encoded depth video signal 1905 to the system. The output encoded signal may have the depth information modulated on the video signal using a carrier, or, in the preferred embodiment, the depth information is conveyed to the system as an alpha channel of video. The combiner/encoder 1900 may be a subsystem external to the video camera 1850 or may be integrated into the video camera 1850 or the integrated depth sensing subsystem 1855.

Figure 39:
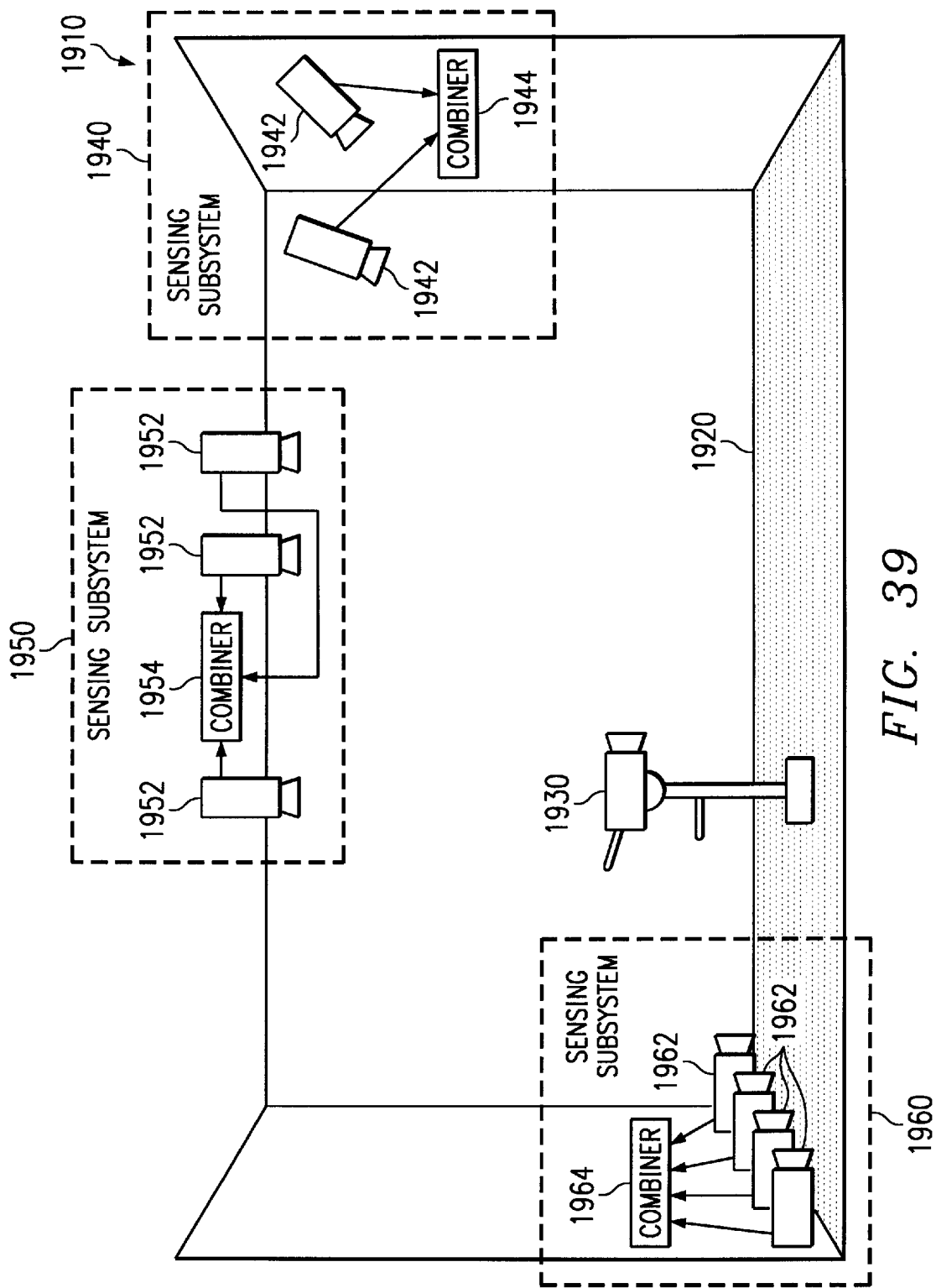
FIG. 39 is an overview of other embodiments of other depth-sensing apparatus.

Referring to FIG. 39, alternative sources of depth sensing information are shown in graphical form. Sound stage 1910 comprises a floor area 1920, a primary camera 1930, and sensing subsystems 1940, 1950, and 1960. In one embodiment, the floor area 1920 contains pressure sensors or other sensing apparatus that detect weight of objects and persons placed on the surface or moving on it. These sensors relay positional information over time to the system for use in determining and tracking relative positions of objects and people. The compositing system uses the positional information to control ordering of layers of compositing and other image processing performed from image data supplied by primary camera 1930 and other sources.

Still referring to FIG. 39, in an alternate embodiment sensing subsystem 1940 is used to determine relative positions of objects within its field of view. A plurality of locations, at which in the preferred embodiment are video or image cameras 1942, within the sound stage 1910 are coupled to a combiner 1944. The combiner, using triangulation and signal processing, computes the positions of objects within the intersection of the fields of view of each of the cameras 1942. It should be understood that the number of locations used by subsystem 1940 is not limited to two as shown in the illustration; any quantity from one to any number of sensing apparatus 1942 may be used to comprise subsystem 1940, with better results obtained as the number of distinct locations is increased linearly. The floor 1920 of the sound stage 1910 may be painted or otherwise covered with a regular or specific irregular pattern visible to the cameras 1942, which need not be visible to the primary camera 1930. The pattern is selected to assist the combiner 1944 in interpreting data relayed from cameras 1942.

Still referring to FIG. 39, in another alternate embodiment overhead sensing subsystem 1950 is used to determine relative positions of objects within the union of the fields of view of its sensing apparatus. Subsystem 1950 consists of a plurality of sensing devices, which in the preferred embodiment are video or image cameras 1952, which are coupled to a combiner 1954. The combiner 1954, responsive to the signals from cameras 1952, produces a composite map assembled from the portions visible to each camera 1952. This composite map is a union of all the fields of view of cameras 1952 and is supplied to the system to allow tracking of objects on the sound stage 1910. Tracking is accomplished directly by applying signal processing and edge detection to the map produced by combiner 1954. It should be understood that the number of locations used by subsystem 1950 is not limited to three as shown in the illustration; any quantity from one to any number of sensing apparatus 1952 may be used to comprise subsystem 1950, with better results obtained as the number of distinct locations is increased linearly.

In another embodiment represented in FIG. 39, subsystem 1960 performs in a manner analogous to that of 1950 but in an orientation aligned with the primary camera 1930. The views from sensing apparatus 1962, which in the preferred embodiment are video or image cameras, are coupled to a combiner 1964. The combiner 1964, responsive to the signals from cameras 1962, produces a composite map assembled from the portions visible to each camera 1962. This composite map is a union of all the fields of view of cameras 1962 and is supplied to the system to allow tracking of objects on the sound stage 1910. Because the view orientation is aligned with that of the primary camera 1930, it is possible to track objects via image processing and edge detection that would be missed by an overhead subsystem 1950 or a triangulation subsystem 1940. It should be understood that the number of locations used by subsystem 1960 is not limited to four as shown in the illustration; any quantity from one to any number of sensing apparatus 1952 may be used to comprise subsystem 1960, with better results obtained as the number of distinct locations is increased linearly.

Still referring to FIG. 39, in practice, subsystems 1920, 1940, 1950, and 1960 may be utilized in combinations or in whole to determine positions of objects and people within the sound stage 1910. The position information is used by the system to determine relative distances from the primary camera 1930 if the depth sensing systems illustrated in FIG. 38 are not available.

Figure 40:
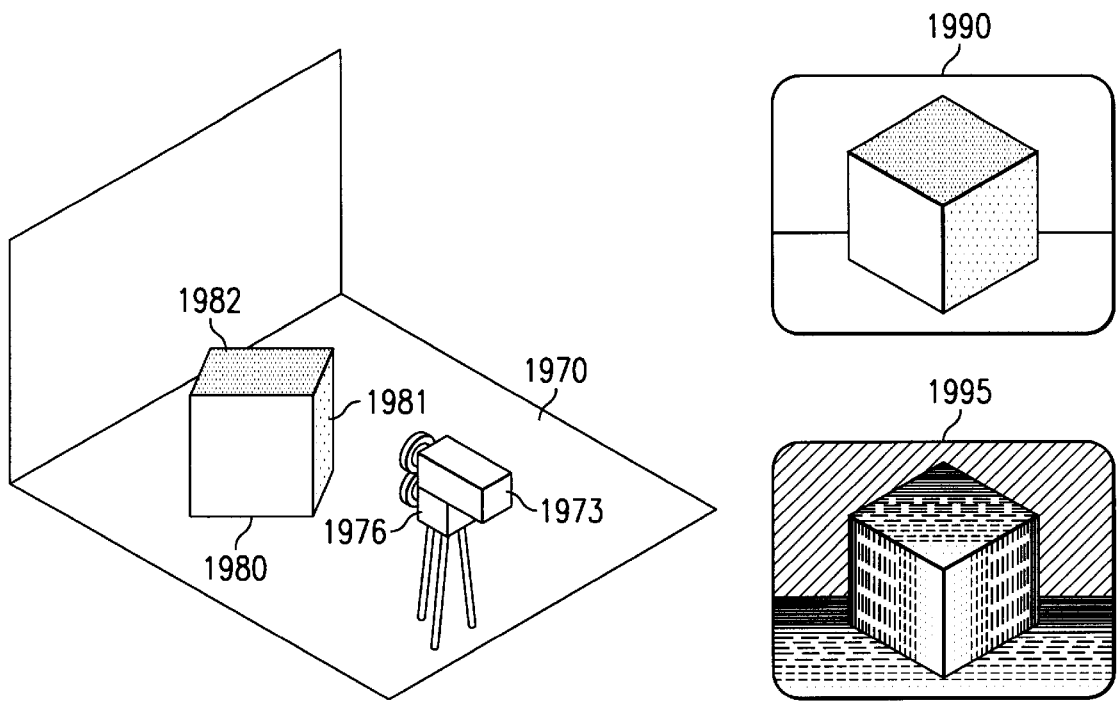
FIG. 40 shows an example of data output from the apparatus of FIG. 38.

Referring to FIG. 40, an illustration of a set 1970 is shown. Within the set 1970 are objects 1980, with varying colored features and sides 1981, 1982. Also within the set 1970 is an integrated camera and depth sensing apparatus 1973, 1976 which provides video image signals and video depth signals to the system. Shown in the figure are view 1990 which represents the video image signal sensed by the camera 1973 and view 1995 which represents the alpha channel data from the video depth signal obtained from depth sensor 1976 displayed as luminance data. View 1995 illustrates that depth information, or the relative distance from the camera/sensor to the object, can be represented on a pixel-by-pixel basis for the image area typically associated with a video camera 1973. In the preferred embodiment, this depth information is conveyed via the alpha channel of a component video signal, but it may also be encoded on a subcarrier within the video image signal or conveyed independently of the video image signal.

Spatial positioning is used by which the fixed and relative positions of multiple index regions within a display field permits freedom of movement of point of observance. For example, where there is only a linear movement of the camera involved, a simple lookup table can be used. Where from point of observance perspective more complex changes are occurring from frame to frame, computed spatial positional identification and indexing can be provided with satisfactory response time to appear real time to the overall system's operation. For example, where a camera is rotating in a circular-type path around a studio, where the announcer is stationary and two fixed indexed regions are maintained as stationary, the present invention permits the system to compute the proper perspective angular view of the video source to permit it to be mapped and overlaid onto the respective index defined regions. Thus, if a first colored green region was in front of a person sitting on a chair, then, as the camera rotated at approximately ±90° from straight face-on, different perspective views of a desk could be superimposed onto and in place of the first defined (green) indexed region (e.g., a green stationary screen or computer generated region). The utilization of a computer generated region requires slightly more computing power and, depending on complexities of other functions desired to be provided by the system, could require selection of a more powerful system capable of handing all of the required functionality. However, technology is currently available commercially with which to build the present invention, by combining existing components in the method and with the additions as taught by the present invention.

In addition to using a table look-up for spatial positioning indexing changes in linear motion from a point of perspective of observance (e.g., a camera), there are numerous other ways to embody solutions in accordance with the present invention. For example, any of a number of types of techniques can be used to triangulate, calculate, and do all the fancy things.

As the camera rotates around the 90° turn either direction, and/or moves in closer or zooms in, the system recomputes the relative positions of the defined indexed regions and recomputes the relative positions of the respective indexed regions versus the point of observance.

The spatial positioning of the present invention permits freedom of movement of point of observance for a video source. By providing, to a computer, ancillary data on the camera position, camera tilt angle, pan angle, and roll angle, the computer determines the size, shape, and position of the images from the additional video sources to be merged into the first video source.

The present invention additionally enables multiple video sources to be dynamically merged into a video production by the use of multiple colors on the set. Each separate video source replaces a different color in the video production. This enables the present invention to transform an empty studio with colored background and foreground into a virtual studio with merged video images to replace the colors in the final video output.

When only a linear movement of the camera is involved, a simple look-up table can be used. Where, from point of observance, more complex changes are occurring from frame to frame, computed spatial positional identification and indexing can be provided with satisfactory response time to appear real time to the overall system's operation.

For example, where a camera is rotating in a circular-type path around a studio, where the announcer is stationary and two fixed indexed regions are maintained as stationary, the present invention permits the system to compute the proper perspective angular view of the video source to permit it to be mapped and overlaid onto the respective index defined regions. Thus, if a first colored green region was in front of a person sitting on a chair, then, as the camera rotated at approximately ±90° from straight face-on, different perspective views of a desk could be superimposed onto and in place of the first defined (green) indexed region (e.g., a green stationary screen or computer generated region).

The use of a computer generated region requires slightly more computing power and, depending on complexities of other functions desired to be provided by the system, may require selection of a more powerful system capable of handing all of the required functionality. The technology is currently available, however, to build the present invention.

In addition to using a table look-up for spatial positioning indexing changes in linear motion from a point of perspective of observance (e.g., a camera), there are numerous other ways to embody solutions in accordance with the present invention.

As the camera rotates around the 90° turn either direction, and/or moves in closer or zooms in, the system recomputes the relative positions of the defined indexed regions and recomputes the relative positions of the respective indexed regions versus the point of observance.

Figure 41:
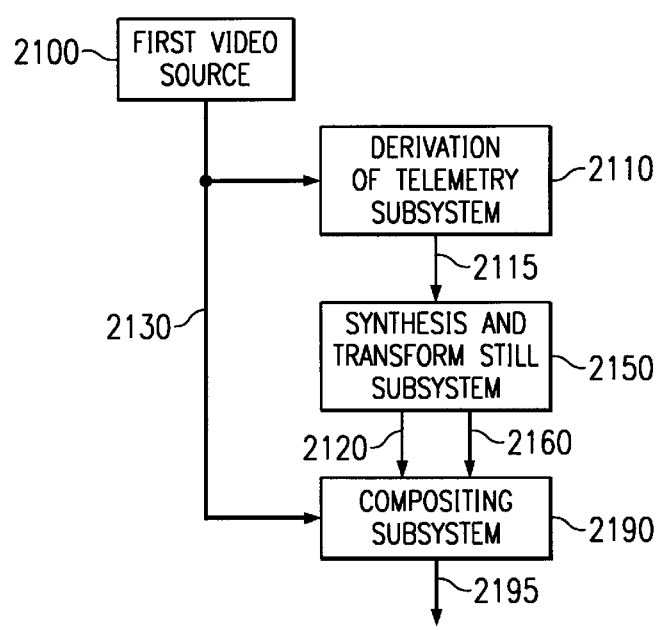
FIG. 41 shows a block diagram of a prior art video system.

FIG. 41 illustrates a first video source 2100 that is coupled to a derivation of telemetry subsystem 2110 via a bus 2130. The derivation of telemetry 2110 is coupled to the synthesis and transform still subsystem 2150 via telemetry bus 2115. The synthesis system 2150 is coupled to the compositing subsystem 2190 via the key control signal 2120 and the transformed still image bus 2160.

Also coupled to the compositing subsystem 2190 is the first video source 2100 via the bus 2130. The output of the compositing subsystem 2190 is the video output 2195. Subsystems 2110 and 2150 in this prior art illustration are software processes that are performed by supercomputer(s). The primary function of subsystem 2110 is to perform image processing on data supplied by the first video source 2100, and the primary function performed by the subsystem 2150 is to synthesize a still image based on telemetry data derived from the first video source.

The actual technique used by subsystem 2150 may include different rendering techniques, including raytracing, polygon rendering, and different lighting models, such as Phong, Gourand, or radiosity techniques. All of these techniques are documented in Foley, Van Damm's Computer Graphics and Principles.

Figure 42:
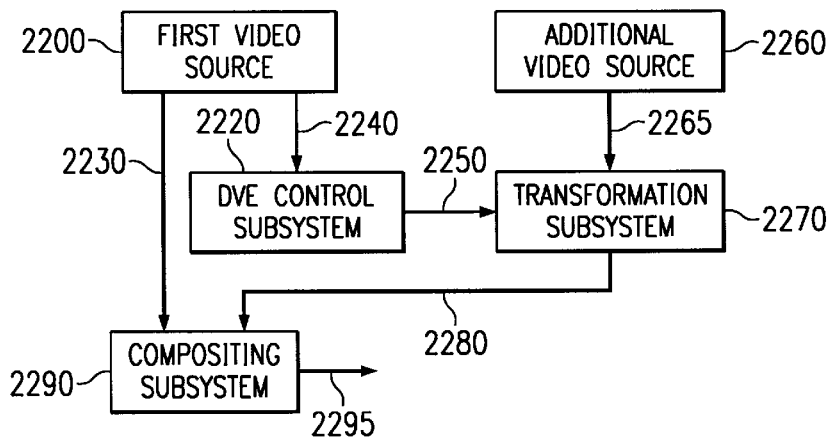
FIG. 42 shows a block diagram of a video composition system of the present invention.

FIG. 42 illustrates an embodiment of the present invention. In FIG. 42, the first video source 2200 couples to a Digital Video Effects (DVE) control subsystem 2220 via the ancillary data bus 2240. The DVE control subsystem 2220 performs computation on this data and produces control signals 2250. The DVE 2220 is the apparatus that controls/determines the positioning and/or scaling of the second video source to fit it into the first video source. The control signals 2250 from the DVE 2220 are coupled to the transformation subsystem 2270. Also coupled to the transformation subsystem 2270 is the additional video source 2260 via the bus 2265. The transformation subsystem can be a DVE unit, a frame buffer or other implementations or combinations. The output of the transformation subsystem 2270 is conveyed on bus 2280 to the compositing subsystem 2290. Also conveyed to the compositing subsystem 2290 is the first video source 2200 via the bus 2230. The compositing subsystem 2290 produces a video output 2295. The implementation of the compositing subsystem 2290 is typically a keyer or a production switcher, it can also be implemented with a Video Explorer and any associated hardware, such as a host CPU system, perhaps an Ultimatte Explorer.

Still referring to FIG. 42, the ancillary data 2240 supplied from the first video source 2200 contains information about the camera position and orientation and motion that is updated in real time, and used by the DVE control subsystem 2220 to generate the control signals that manipulate the transformation subsystem 2270, also in real time. The compositing subsystem determines which areas of the image to select from the first video source 2200 via 2230, and the additional video source via the transformation subsystem 2270 and bus 2280. One embodiment of the compositing subsystem 2290 would incorporate a Video Explorer, commercially available from Intelligent Resources, and an Ultimatte Explorer, a product under development by Intelligent Resources.

Still referring to FIG. 42, an alternative compositing subsystem 2290 could be comprised of a production switcher or keyer apparatus in conjunction with a stand-alone key generation unit. This configuration will be detailed in another drawing.

Figure 43:
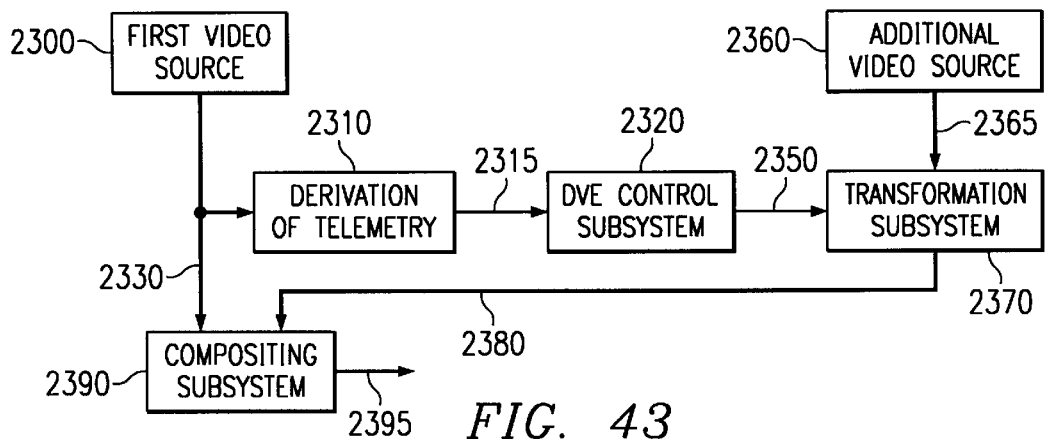
FIG. 43 shows a block diagram of an alternate embodiment of the video composition system of the present invention.

FIG. 43 illustrates an alternate embodiment where the first video source 2300 is coupled via bus 2330 to a derivation of telemetry subsystem 2310. The derivation of telemetry subsystem 2310 is coupled to the DVE control system 2320 via the telemetry bus 2315. The DVE control subsystem 2320 produces control signals 2350 that are used to control the transformation subsystem 2370. The transformation subsystem 2370 accepts an additional video source 2360 via bus 2365, performs processing and transformation on those signals, and produces output 2380 that is coupled to the compositing subsystem 2390. Also coupled to the compositing subsystem 2390 is the first video source 2300 via bus 2330. The output of the compositing subsystem 2390 is the video output 2395.

The embodiment represented in FIG. 43 does not require ancillary data from the first video source, but derives it using the computationally expensive process of performing image processing of the first video source 2300 within the derivation of telemetry subsystem 2310. This particular embodiment has the advantage over the prior art of FIG. 41 in that the implementation is substantially simpler without requiring the synthesis of key-in transform still image subsystem 2150 as shown in FIG. 41.

Figure 44:
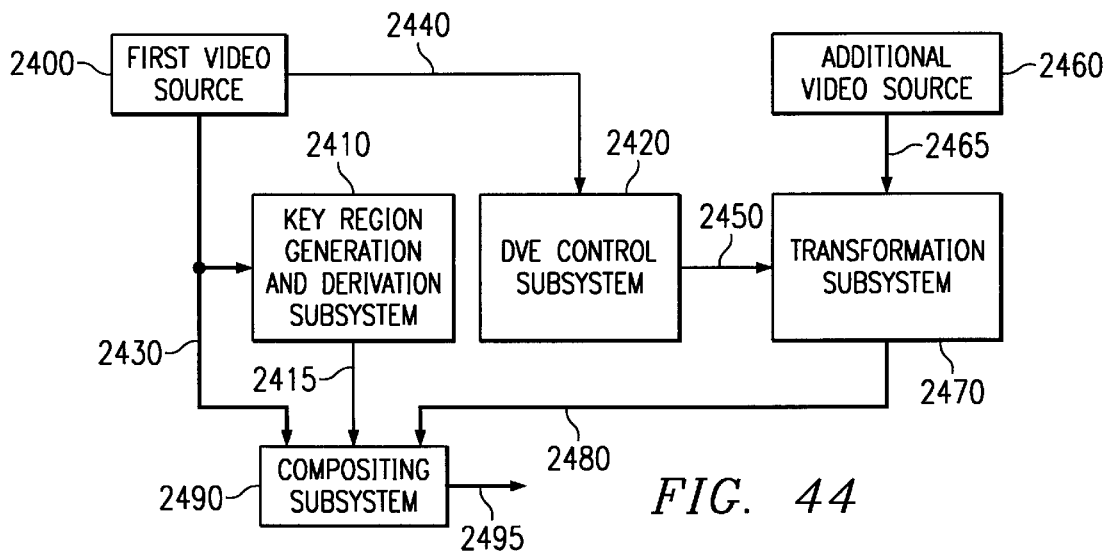
FIG. 44 shows a block diagram of an alternate embodiment of the video composition system of the present invention.

FIG. 44 shows yet another alternate embodiment of the present invention. In this embodiment, a first video source 2400 is coupled via ancillary data bus 2440 to the DVE control subsystem 2420. The DVE control subsystem 2420 produces control signals 2450 that are coupled to the transformation subsystem 2470. Also coupled to the transformation subsystem 2470 is the additional video source 2460 via bus 2465. The first video source 2400 is coupled via bus 2430 to the key region generation and derivation subsystem 2410 and the compositing subsystem 2490. The key region generation and derivation subsystem 2410 is coupled via key signal 2415 to the compositing subsystem 2490. The output of the compositing subsystem 2490 is the video output 2495.

The embodiment illustrated in FIG. 44 demonstrates that the generation or derivation of the key region can be accomplished outside of the compositing subsystem 2490 by a separate subsystem 2410. Examples of an implementation of this particular embodiment would use a stand-alone key derivation unit, such as an Ultimatte 3 or an Ultimatte 4, both devices commercially available from Ultimatte Corporation, Chatswick, Calif., and lesser quality equivalent units available from other vendors. Also, in this particular embodiment, the compositing subsystem 2490 can be a very simple production switcher or keyer or mixer as the key signal 2420 is provided as an input.

Figure 45:
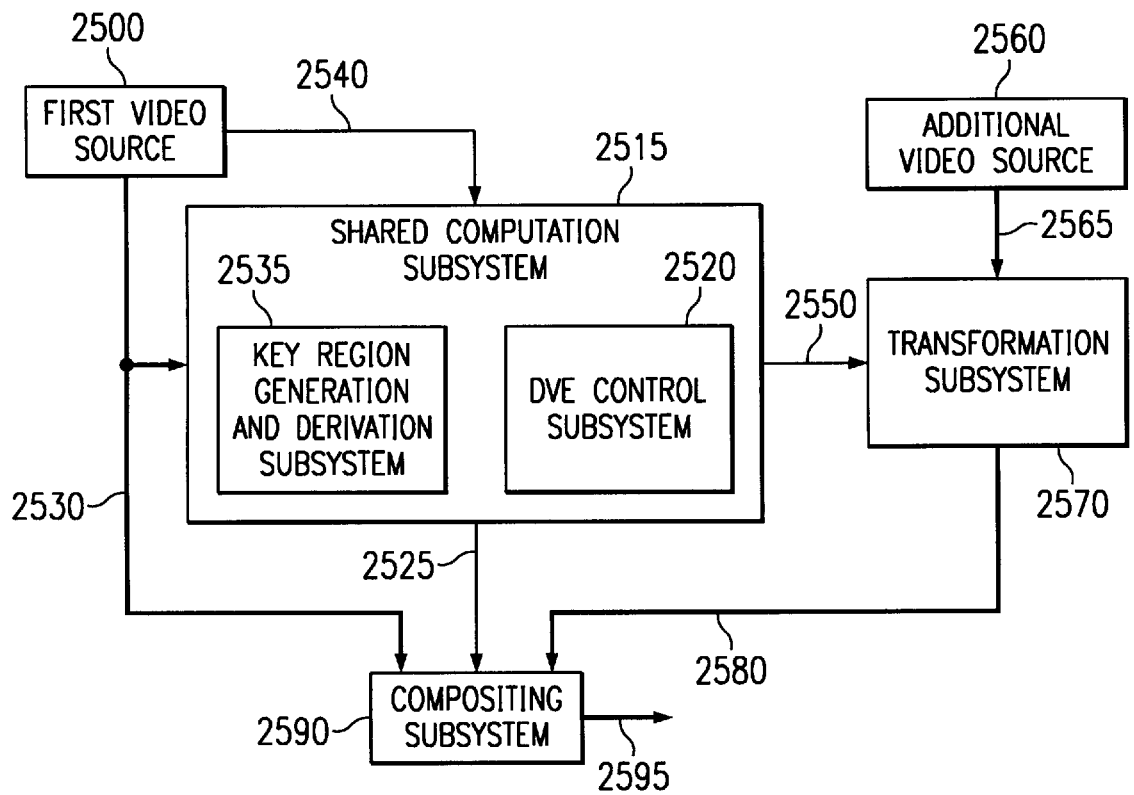
FIG. 45 shows a block diagram of an alternate embodiment of the video composition system of the present invention.

FIG. 45 illustrates yet another alternate embodiment. In this embodiment, first video source 2500 is coupled to a compositing subsystem 2590 via the bus 2530 and to a shared computation subsystem 2515 via the ancillary data bus 2540. The shared computation subsystem 2515 comprises a key region synthesis subsystem 2535 and a DVE control subsystem 2520. The subsystems 2535 and 2520 shared many data structures and computational algorithms and are thus shown as part of the same shared subsystem 2515. The key region synthesis subsystem 2535 processes ancillary data 2540 and produces an output key control signal 2525 that is an input to the compositing subsystem 2590.

Still referring to FIG. 45, the DVE control subsystem 2520 processes ancillary data 2540, producing control signals 2550, that are output to the transformation subsystem 2570. An additional video source 2560 is conveyed via bus 2565 to the transformation subsystem 2570. The output of the transformation subsystem 2570 is coupled via bus 2580 to the compositing subsystem 2590. The transformation subsystem performs processing on the additional video source 2560 responsive to control signals 2550. The compositing subsystem 2590 combines the first video source 2500 and the transformed additional video source buses 2530 and 2580 respectively, responsive to the control signal 2525, producing a video output 2595.

The primary difference between the embodiment shown in FIG. 45 and the embodiment of FIG. 44, is that the key region need not be derived directly from the video data from 2530 from the first video source 2500. The key region can be synthesized responsive to the ancillary data 2540.

Figure 46:
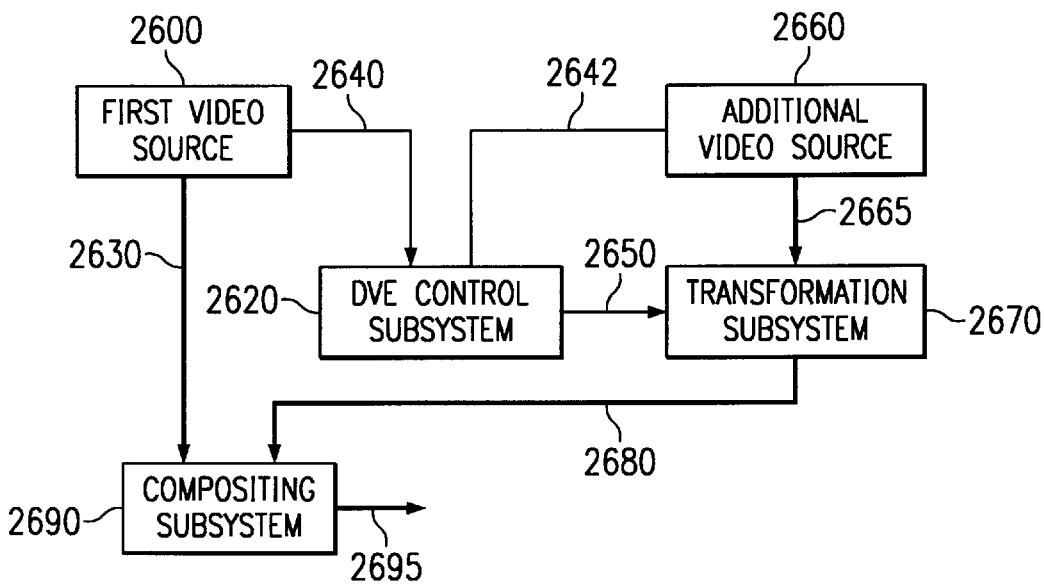
FIG. 46 shows a block diagram of an alternate embodiment of the video composition system of the present invention.

FIG. 46 illustrates another alternate embodiment of the present invention. In this embodiment, a first video source 2600 is coupled via ancillary data bus 2640 to the DVE control subsystem 2620. Also coupled to the DVE control subsystem 2620 is ancillary data 2642 from the additional video source 2660. The DVE control system 2620 produces control signals 2650, that are coupled to the transformation subsystem 2670. Also coupled to the transformation subsystem 2670 is the additional video source 2660 via the video bus 2665. The output of the transformation subsystem 2670 is coupled via video bus 2680 to the compositing subsystem 2690. Also coupled to the compositing subsystem 2690 is the first video source 2600 via the video bus 2630. The output of the compositing subsystem 2690 is the video output 2695.

In the embodiment shown in FIG. 46, the DVE control subsystem 2620 is shown to be responsive to ancillary data 2640 and ancillary data 2642 from the first video source 2600 and the additional video source 2660, respectively. In similar embodiments, the assumption is made that the ancillary data for the additional video source 2660 can be assumed to remain static and fixed. The embodiment shown in FIG. 46 is one that allows the ancillary data associated with the additional video source 2660 conveyed via bus 2642 to vary over time and have the DVE control subsystem 2620 produce control signals 2650 responsive to that varying over time.

FIG. 47 shows another embodiment of the present invention. In this embodiment, a first video source 2700 is coupled via ancillary data bus 2740 to the DVE control subsystem 2720 and to the compositing subsystem A 2790 via bus 2730. The DVE control subsystem 2720 is coupled via the control bus 2750 to the transformation subsystem A 2770, the transformation subsystem B 2772, and the transformation subsystem N 2774. Additional video source A 2760 is coupled to the transformation subsystem A 2770 via the video bus 2765. Additional video source B 2762 is coupled to the transformation subsystem 2772 via the video bus 2767. The additional video source N 2764 is coupled to the transformation subsystem N 2774 via video bus 2769. The output of the transformation subsystem A 2770 is coupled via the video bus 2780 to the compositing subsystem A 2790.

Still referring to FIG. 47, the compositing subsystem A 2790 produces an output that is coupled to the compositing subsystem B 2792 via the video bus 2702. Also coupled to the compositing subsystem B 2792 is the transformation subsystem B 2772 via the video bus 2782. The output of the compositing subsystem B 2792 is coupled to the compositing subsystem N 2794 via the video bus 2704. The transformation subsystem N 2774 is coupled to the compositing subsystem N 2794 via the video bus 2784. The compositing subsystem N 2794 produces a video output 2795.

The embodiment shown in FIG. 47 demonstrates the present invention operating with multiple additional video sources 2760, 2762, and 2764. The additional video sources 2760, 2762, and 2764 are transformed via transformation subsystems 2770, 2772, and 2774 and are used in a compositing operation consisting of multiple stages in compositing subsystems 2790, 2792, and 2794. The compositing subsystems 2790, 2792, and 2794 operate in a sequential manner to produce a video output 2795.

The embodiment illustrated in FIG. 47 is not limited to the three additional video sources shown. The video sources may range from one to any number, the embodiment of one video source being previously shown in FIG. 42 and the embodiment shown in FIG. 47 illustrating a plurality of video sources.

An example of the operation of the present invention is illustrated in FIG. 48. This figure shows a block 2800 having two sides 2802 and 2803 facing a camera 2805. Each side is colored a different color to inform the DVE's that different videos/graphics are to appear on each side. In this embodiment, side 2802 is blue and side 2803 is green. Alternate embodiments, however, use other colors or patterns to distinguish between the two sides. The camera 2805 has the ability to move between positions A and B.

FIG. 49 shows the view the camera 2805 would have at position A. FIG. 50 shows the view the camera 2805 would have at position B.

Referring again to FIGS. 48 through 50, while the camera 2805 is in position A, side 2802 of the block appears the same size as side 2803. As the camera 2805 moves from position A to position B, side 2803 appears to decrease in size while side 2802 appears to increase in size. When the camera 2805 is in position B, $DVE_1$ is programmed to expand the video/graphic that is used as the additional source placed on side 2802. The $DVE_2$ is programmed to shrink the video/graphic that is used as the additional source placed on side 2803. The DVE's are only programmed to resize in the horizontal direction.

Figure 51:
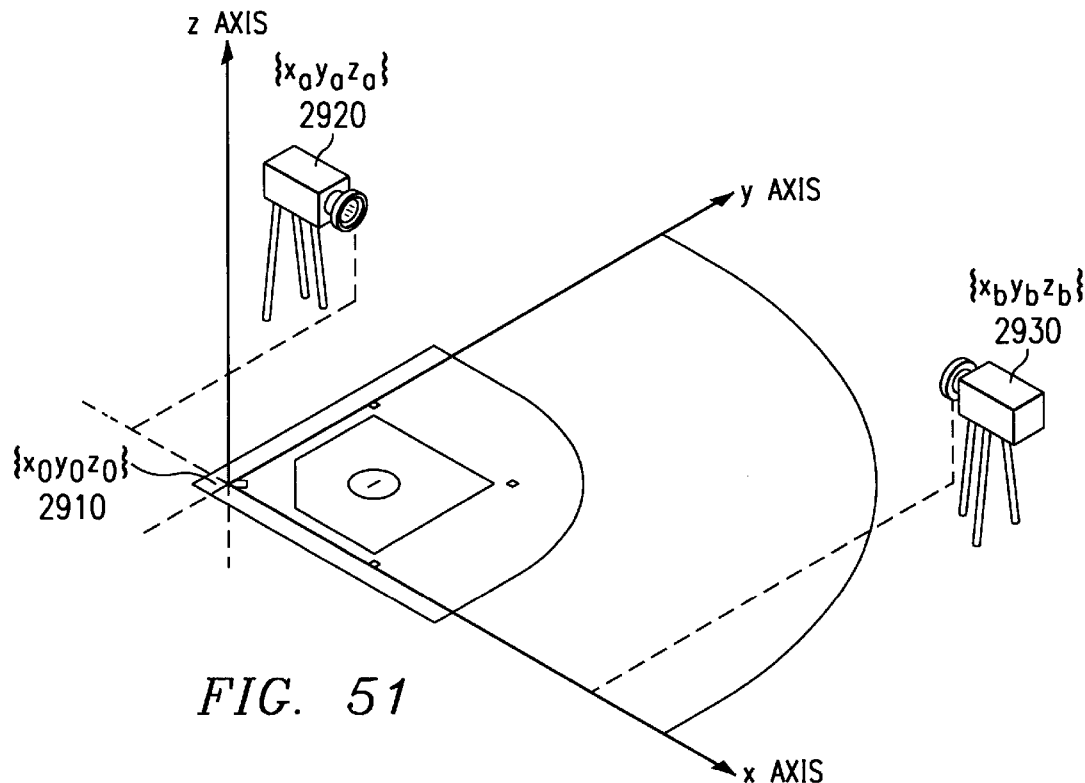
FIG. 51 shows a diagram of an implementation of the present invention in a baseball park.

An example of the present invention as used in a baseball stadium is illustrated in FIG. 51. In this example, an origin in the Cartesian coordinate system is established at the tip of home plate. This reference point 2910 is labeled $\{x_0, y_0, z_0\}$.

Two cameras are in the example of FIG. 51, camera A 2920 and camera B 2930. Both cameras have coordinates established with reference to the reference point. Camera A is located at $\{x_A, y_A, z_A\}$ and camera B is at $\{x_B, y_B, z_B\}$.

Figure 52:
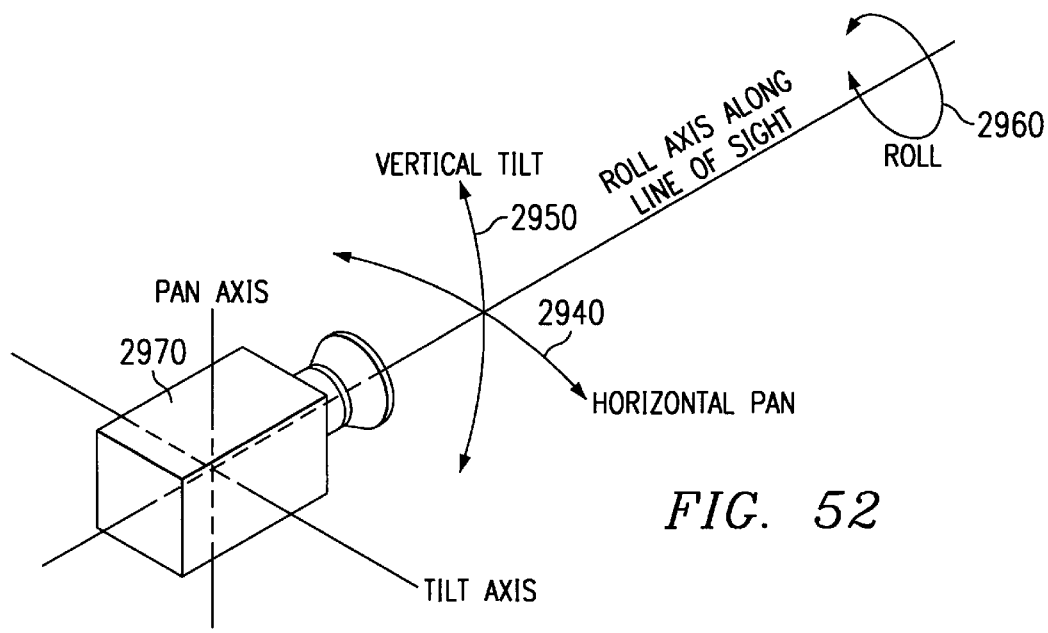
FIG. 52 shows a virtual studio camera of the present invention.

FIG. 52 shows a typical camera 2970 of the example embodied in FIG. 51. Each camera has other reference data associated with it that is communicated to the controller of the present invention. This data includes the horizontal pan 2940, vertical tilt 2950, and roll 2960 of the camera 2970. These parameters are referenced as $\{p_A, t_A, r_A\}$ and $\{p_B, t_B, r_B\}$ for each camera respectively. Other camera parameters can include the percentage opening of the camera iris (0–100%), the zoom condition of the camera, and the focus of the camera.

To illustrate the present invention in operation, another example will be examined. If a billboard at the ball game was to be replaced by a local advertisement, the local advertisement is input to a Video Explorer frame buffer. This is how a computer element is changed into a video signal.

Next, the video of the local advertisement is input to the digital video effects processor. The DVE distorts the video of the local advertisement to match the perspective and positioning of the original billboard to be replaced. To maintain the registration of the local advertisement as the camera moves, feedback from the memory head mount, in the form of ancillary data, controls the DVE to maintain synchronization and alignment between the original and replacement advertisements.

Interference from objects passing in front of the billboard is eliminated by running the output of the DVE through an Ultimatte processing card. This card generates a real time dynamic matte that, when applied to the local advertisement, properly composites the collection of signals into a result that appears to home viewers as if the local advertisement is there permanently.

The position and orientation of the virtual billboard may be communicated as ancillary data in many forms such as: world coordinates relative to the origin, view coordinates relative to a corner of the screen, pre-transformed to divide the computing workload, any other intermediate stage in the transformation from world coordinates to view coordinates (world/view coordinates are consistent with those in Foley, Van Damm).

Since the world position and orientation of the virtual billboard need not change over time, this information may be hard coded into the system, manually loaded into the system, conveyed once prior to system operation via any communications means, rather than being included as part of the ancillary data and wasting bandwidth.

In one embodiment, the means for associating is comprised of having an allocation of each colored region to a respective pre-assigned additional source of video. Alternatively, an operator can manually select, either in real-time or in advance, which colors are to be associated with which additional source of video. Alternatively, a computer can be programmed by a user, or preprogrammed, to associate each of an additional source of video to a predefined or user selected color, or make the assignment according to selection criteria, either defined by the user or pre-defined by the system.

The control means performs the mapping of the additional source of video to its respective one of the multiple colored regions responsive to the means for associating and to the spatial relationship. The control means can be comprised of a conventional digital video effects processor, such as is commercially available from ADO, Abekas, Aladdin, Miranda, Grass Valley Group, and others.

The ability to take inputs from one or more external sources on each input to apply positioning in a 2-dimensional coordinate system, scaling of the video, magnification or reduction, these are all linear effects, higher order effects, such as warping, where the video is distorted as if it was on a rubber sheet and stretched or contorted, rotations around axes, either in 2-dimensions or 3-dimensions, producing an output video signal comprised of the one or more processed video signals that have had these operations applied to them, the output signal would then be used as the output of the digital video effects unit.

Alternatively, while a digital video effects processor need not be purchased, the functionality should be present to affect the control means mapping of the additional source of video to its multiple colored regions.

Scaling and positioning of the additional source of video signals, such that they are sized and oriented correctly to fit into the multiple colored regions of the first source of video signal. An optional but desirable feature is the ability to include rotation amongst the transforms such as scaling and positioning, accomplished by the control means for mapping. This rotation to rotate the image that is in the additional source of video signals onto one of the multiple colored regions in the first source of video signals.

The control means for mapping is responsive to the means for associating and to the spatial relationship between the objects. The reason that it has to be both, the means for associating describes which of the colored regions a particular additional source of video signals is supposed to be mapped into.

The spatial relationship of the object determines what parameters or control signals are to be applied to the digital video effects unit or an equivalent to map the video in such as way that it aligns with or exactly overlays the colored regions that are present in the 2-dimension video projection of the original 3-dimensional scene. The spatial relationship controls the scaling and possible rotation of the additional source of video signals in order to fit into one of the multiple colored regions in the first source of video signals, however, the means for associating identifies which of the transformed addition source of video signals is supposed to be active for any given point on the screen.

The means for associating the additional source of video signals can identify a region for association by either color recognition of a region within the image, or of pattern recognition of a region within the image, to identify the region for purposes of permitting the mapping of the additional source of video to a specific identified region.

The additional source of video can be comprised of the same options as just described for the first source of video, and others.

A pre-rendered computer graphic, something that takes a large amount of computation power to produce, can be an illustration captured as a still frame, or a texture map created by either an operator or synthetically derived by some algorithm on a processor. A texture map is a pattern, generally a repeating pattern, that can be applied to a surface, such that it can be tiled seamlessly from end to end. It is a rubber sheet on which images are printed that can then be stretched around whatever shape or surface you want to map it onto. The image that is on the rubber sheet, before it gets distorted, is known as a texture map.

Means for combining the first source and additional sources of video signals to combine a composite output video signal, common examples include video keyers, devices that are designed to take multiple input signals and, responsive to the control signal, show one selected one of the multiple input signals, producing an output signal. Another example is a switcher which does essentially the same operation, but generally the difference between a switcher and a keyer is a keyer has the ability to blend between multiple sources with different blending ratios, whereas a switcher generally is either showing one source or another source, but never a combination of more than one source.

A keyer is used to operate off of a key signal and produce a combined output image. It is generally incapable of producing that key output signal, other than echoing on its output whatever was on its input. What is typically used to generate such a key input signal to a keyer, would be something like the range threshold circuitry contained within the Video Explorer product.

Alternatively, a window comparator could be applied to a video signal, generating a key on a particular range of luminance values, or above or below a certain luminance value. If you had hue information or color intensity information, you could similarly key on a range or a specific maximum or minimum value of hue or intensity, or any other video parameter that you can get an output signal for, such as red, green, blue signal, YUV signals, color difference signals, or combinations of same.

Examples of commercially available devices that produce key signals include products by Ultimatte Corp., ULTIMATTE 3, ULTIMATTE 4, ULTIMATTE 5, various versions of similar products, the Video Explorer product by Intelligent Resources that is capable of producing a key output signal, and various character generators that synthesize the key output signal.

Figure 53:
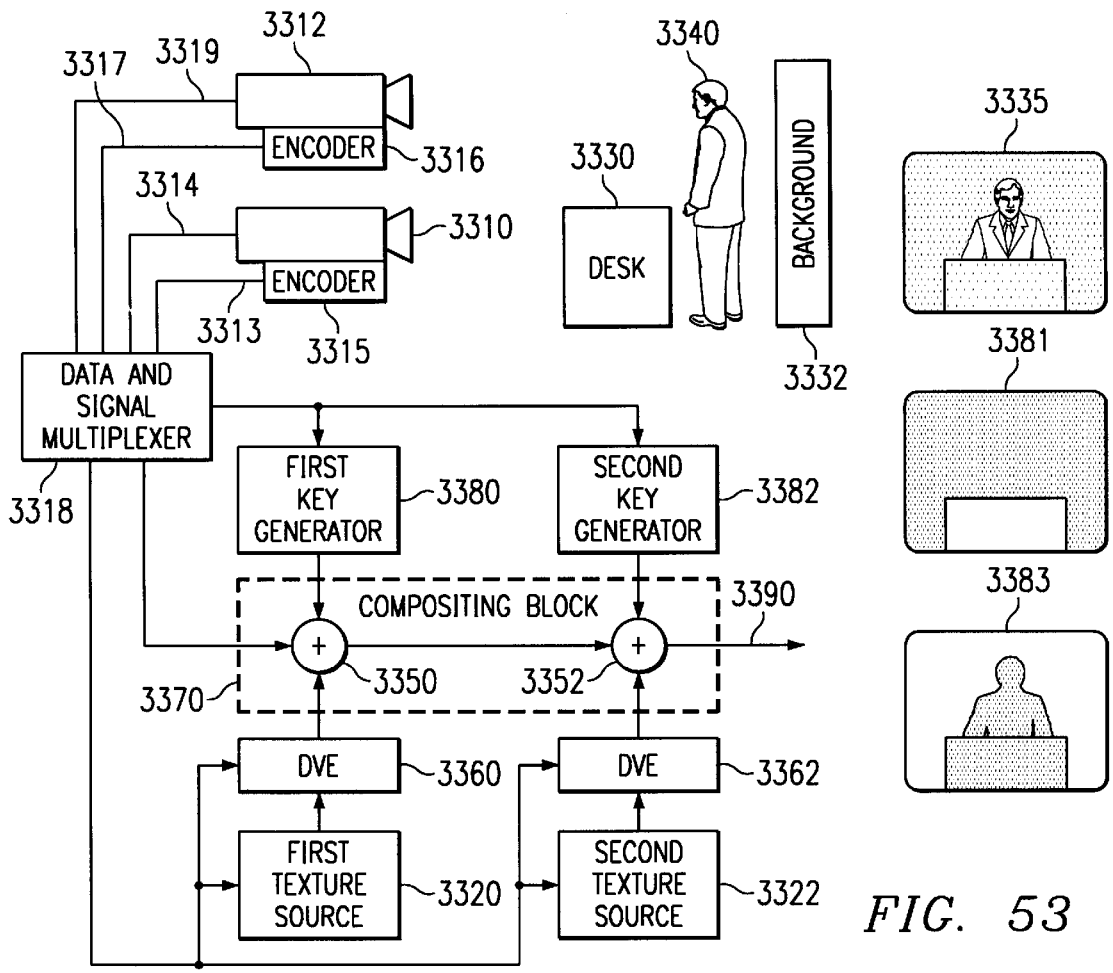
FIG. 53 shows an example of a use of the present invention.

An example of implementation of the system is shown in FIG. 53. In this example, there are one or more video cameras 3310, 3312, each providing video content information. This video information is provided to the system on 3314, also providing environment information from an encoder device used in the camera 3315 supplied to the system on 3313.

The example in FIG. 53 also has first source providing a first texture map, generally a foreground texture 3320, and a second source providing a second texture map 3322. These are texture maps that will be applied in the final image to objects that are visible by the camera 3310, a representation of the scene viewed by camera 3310 is shown in 3335.

In FIG. 53 are a foreground object of a first color 3330, a background object of a second color 3332, and other objects also visible in the frame 3340. The objects 3340 are objects that are not of the first or the second colors 3330, 3332. There is a first key generator 3380 that produces a first color key signal coupled to a compositing block 3370. There is a second key generator 3382 that produces a second color key signal coupled to the compositing block 3370. Examples of the output signals from 3380, 3382 are represented respectively in 3381, 3383. There are means 3360 for mapping the first texture onto the foreground object, and another means 3362 for mapping a second texture onto a background or second object. These devices as shown on the drawing being a Digital Video Effects (DVE) units.

Still referring to FIG. 53, there is a means for compositing or blending or by keying the original video signal on 3314 with the output of the DVE 3360 and DVE 3362 under control of the masks generated by the units 3380, 3382 generating the key signal done in the example implementation in two stages as one compositing unit 3350 and another one 3352 within the compositing block 3370 producing an output 3390. The mapping accomplished by the digital video effects units 3360, 3362 is generally comprised of scaling, positioning, possibly rotation and warping.

Continuing to refer to FIG. 53, the sources for the foreground or first texture source 3320 and the background or second texture source 3322 may be under the control or operate responsive to environmental information from 3315 conveyed on 3313. Therefore, the foreground first texture and background second texture may change over time based on the camera position and orientation as encoded by 3315. The means 3360, 3362 may be under the control or operate responsive to environmental information from 3315 conveyed on 3313. Therefore, the mapping (comprising position, warp, transform, rotation, and other attributes) of the foreground first texture and background second texture may change over time based on the camera position and orientation.

In the illustrated example 53, the system can support a secondary camera providing video content and environmental information. The secondary camera 3312, with its independent encoding unit 3316, supplying video information on 3319 and environmental information on 3317. These two inputs can provide data to an identical system as previously described, or be used as inputs to the original system, using a device such as a data and signal multiplexor 3318, which selects under control of an operator or under automatic control which of the two cameras 3312, 3310, to use and respectively, which of the two encoder units 3316, 3315 to use.

Still referring to FIG. 53, the system may supply pre-recorded or synthesized environmental information in a "shot box" mode to mapping means 3360, 3362, first texture source 3320 and second texture source 3322 from data and signal multiplexer 3318. Data and signal multiplexer 3318 may vary the pre-recorded or synthesized environmental information responsive to or independently of the environmental information 3313, 3317 provided by encoder devices 3315, 3316, respectively, or may supply unvarying environmental information to mapping means 3360, 3362, first texture source 3320 and second texture source 3322.

It should be understood that the number of cameras and encoder devices in FIG. 53 is not limited to the two shown; any quantity from one to any number may be used as inputs to data and signal multiplexer 3318.

A specific embodiment of the system in FIG. 53 can be realized using commercially available off-the-shelf components wherein key generators 3380, 3382, and the compositing block 3370 are combined in a single subsystem embodied utilizing an Ultimatte Explorer product, comprising multiple circuit boards commercially available from Intelligent Resources. Additionally, the first texture source 3320 and second texture source 3322 may be supplied by the Video Explorer product, commercially available from Intelligent Resources, and processed by DVE 3360, 3362 units commercially available from vendors such as Miranda, Aladdin, and Grass Valley Group. The DVE 3360, 3362 units may be made responsive to control software on the computer system hosting the Video Explorer and Ultimatte Explorer products, which is in turn responsive to telemetry and environmental information conveyed from the camera encoders 3315, 3316. An example of the camera encoder 3315, 3316 is a Ultimatte Memory Head system, commercially available from Ultimatte Corporation.

Regarding the additional source of video signals and the first source of video signal, imagery refers to an overall video display, such as would occur on the screen of a television. A still frame represents a stationary, static, non-changing image, or a portion of an image. Graphic refers to a computer generated or scanned image provided, and can be either stationary or time varying as a sequence of still frame images.

The spatial relationship can be determined in numerous manners, in addition to that described above. For example, it can be determined responsive to positional information provided from the video camera or source providing the video signals, or alternatively, can be provided by an alpha channel, which provides control signal information to define, inter alia, the positional information for defined regions.

Positional information from the camera includes the current pan location relative to some local home position on the camera tripod, the relative tilt of the camera relative to some home position, the relative roll of the camera relative to some position, the current zoom setting on the lens, indicating field of view, and physical position relative to an origin in a studio, or some point external to the camera, allowing translational motion in axes x, y, and x.

A third source depth channel would provide information indicating the distance between the camera and various object in the scene that's being visualized by the camera. This might be gleaned from sonar sensing apparatus, from laser range finder apparatus, or some other system that is determining the distance between the camera and the objects in synchronization with the video image that's being scanned out by the camera. This depth information can be used in an environment where you have only as single color that you're keying off of, but you may have multiple objects, all of the same color in the original video image. These multiple colored objects would normally be indistinguishable from each other because they would all appear as a continuous region. With the additional depth channel 3rd source, the system would be able to distinguish between multiple regions that are differing distances from the camera, even if they were all the same color.

This is in regard to the concept of multiple reference origins. Within our coordinate space we would expect to establish some reference origin for a studio which might be common to multiple camera setups. The origin may be any conveniently chosen point and orientation. The position of the cameras relative to this origin and the position of other objects in the scene that the cameras are seeing relative to that same origin, in turn will determine the relative spatial position between the camera and the objects. It is also convenient to establish a secondary reference origin at the location of the camera in its position in 3D space, (x,y,z), that is used as a basis for determining such camera parameters such as pitch, up and down, also known as tilt, yaw (from side to side) also known as pan, and roll, the motion of the camera through an axis that projects through the lens. These directions are more convenient to specify with respect to a local origin at the camera itself, rather than an origin relative to all of the cameras in the studio. This is merely for convenience, this is not a requirement. The reference home positions for pan, tilt, and roll are as follows: The reference position for pan is generally chosen to be some convenient direction, say north, or along the x axis as defined in the primary reference frame. The reference position for tilt is commonly described as horizontal, parallel to the floor in the studio, and the reference position of the roll is generally indicated as right side up, meaning not banked to either side. There appears to be no convention for reference home position for zoom. It may be convenient to pick either end of travel on a zoom lens, either fully zoomed in or zoomed out, as a reference position for the zoom axis. The units used for pan and tilt and roll relative to their home positions can be chosen in any convenient unit, for example degrees. Zoom may be expressed as a focal length, usually specified in millimeters or as a percentage of full travel of the zoom lens and dimensions in x, y, and z from the original reference frame for the studio are generally in the choice of either English units (feet and inches) or metric units (SI units).

Regarding the choice of units for the zoom positional information, or environmental information, there is standard unit which is commonly in use, which is known as the focal length. It is commonly measured in millimeters. Examples would be a lens that is a 28 millimeter focal length, being a comparatively wide field of view. 100–200 millimeter being more of a tightly focused view. A extreme telephoto view might be on the order of 500 or 600 millimeter lens. An extremely wide angle or fish-eye lens would be on the order of 18 millimeter.

A texture map can be something that is algorithmically rendered. It can be produced by a program that simulates textures or appearances of different surfaces. It can also be hand drawn by an operator or artist. It can be provided by somebody who sells pre-rendered texture maps. These texture maps have to generally be responsive to the position of the camera, such as supporting a scale operation. If the camera is a significant distance away from an object, the texture map needs to be scaled smaller so that the detail present in it is less noticeable. Similarly, if the camera is very close to an object, or zoomed in on a particular object so that it fills more of the camera's field of view, the texture map may have to be expanded with certain details enlarged in order to appear correctly. An example might be a wood grain surface on a file cabinet. If you were close to the file cabinet, individual grains would be noticeable, as you move further away, they would blend into more of a continuous brown tone.

The additional source of video signals can be provided from an external source, or can be provided from a source internal to the system. Examples of an external source would be external still store, a digital disk recorder, video tape, live camera, any of the typical sources we've described before. A source internal to the system is generally an image that would be synthesized in some way. This could include a graphic that is rendered responsive to description of geometry. It might be a compositing of multiple stills that are stored inside of a processor unit, and integrated along their edges to produce an internal image that didn't exist in it's entirely outside. It could be a simple color. It could be a solid field of a particular color that was deemed necessary as an additional source of video signal.

The spatial relationship is determined responsive to positional information, by using 3-dimensional geometry as outlined in perspective transformations, and explained in Foley, Van Damm's Computer Graphics and Applications. One would use foreknowledge of the relative positions of the static objects in the scene and the information known about the camera position that is relayed from the encoder unit on the video camera, and transform the known position of the objects into how they would appear when seen by the video camera. This is a process that is almost identical to that of conventional computer graphics perspective rendering. The mathematical transformations used are identical. The only difference is that the output would be rather than an object to be rendered, control parameters used to control a digital video effects unit or equivalent to transform the additional video source.

A calibration pattern might consist of different colored or slightly different colored regions within a region of the same hue, such as alternating lighter and darker squares or triangles or some other mesh or pattern that is easily distinguished. If the dimensions and layout of this pattern is known in advance, such as a square checkerboard pattern, image analysis could be performed on the input video signal. If the image appears to be a checkerboard composed of rhomboids or trapezoids, one could use the relative distortion of the original square shape to that of the trapezoid to determine what spatial orientation that particular part of the image has with respect to the camera. This is an inverse transform similar to those employed in texture mapping, also described in Foley, Van Damm.

Similarly, how the spatial relationship is determined responsive to the relative position of edges. In this case, rather than using or requiring a calibration pattern to be imposed on our solid color region, we can look at their edges. If the geometry of the edges is simple enough and known in advance, or if the boundary between multiple different colored regions are simple and known in advance, we can use a very similar system as described before looking at the edges, knowing for instance, that it started as rectangle and ended up as a particular distorted trapezoid and determine what projections, rotations or translations, were necessary to take the original geometry and distort it as we can see it in the video signal. Determining the spatial relationship and the mapping is actually one and the same. If you are looking at a surface, and you determine by looking at its edges or calibration pattern or through whatever means that it's rotated 50° away from you, then you also know that you have to take the additional source of video and rotate it 50° in order to make it match.

Figure 54:
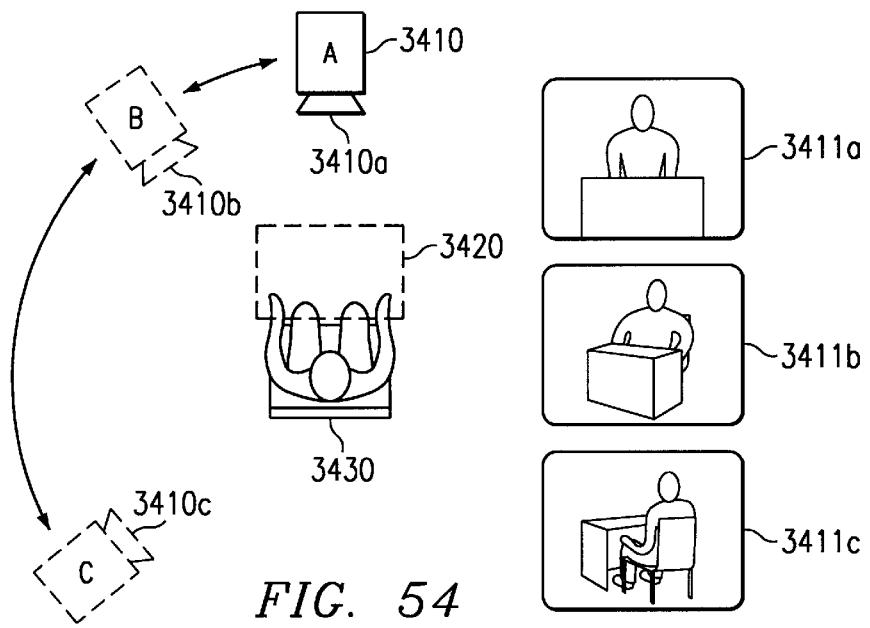
FIG. 54 shows another example of a use of the present invention.

In FIG. 54, a person seated 3430 being viewed by a camera 3410 in position 3410a. The view that the system generates is shown in 3411a, the composited display, wherein the image of a virtual desk 3420, a desk not present in the original scene captured by camera 3410 has been inserted and appears in front of the person seated in 3411*a*. As the camera 3410 translates and circles around the person seated to position 3410*b*, the positional information from the camera is used to transform the outline for the desk as shown in 3411*b*. The virtual desk 3420 is still shown as appearing in front of the seated person 3430. As the camera continues its motion around to 3410*c*, the system accomplishes a change in the relative ordering of the components that are being assembled together to produce the composite image 3411*c*, so that the virtual desk 3420 appears in the background with the back of the seated person 3430 in front of it. This layering is done by using environmental information to identify where the camera is with respect to the person, and using geometry identify whether the virtual desk 3420 should be composited or inserted in front of the image of the seated person 3430 or behind. This ties into where the additional source of video signals is provided from a source internal to the system. In this example, the source internal to the system would be a computer or other processor generating the synthetic image of the desk 3420 or retrieving pre-rendered images from various viewpoints from some storage device and using them to produce the composite image.

The source of images for the virtual desk may store a multiplicity of images, one each for every possible orientation of the virtual desk 3420 and distance of the virtual desk from the camera 3410. Alternatively, the source of images may store a subset of the multiplicity of images, relying on the transformation, scaling, and image processing of the transformation subsystems shown, for example, 2270 in FIG. 42. The processing may be embodied as shown in FIG. 47 where the additional video source A 2760 represents a portion of the desk, for example the desktop; the additional video source B 2762 represents another portion of the desk, for example the desk back; and the additional video source N 2764 represents yet another portion of the desk, for example the desk side. The sources 2760, 2762, 2764 are transformed by subsystems 2770, 2772, 2774 respectively responsive to DVE control subsystem 2720, which is responsive to environmental information and telemetry from camera 3410 in FIG. 54. The compositing stages shown in FIG. 47 as subsystems 2790, 2792, 2794 perform the compositing of the desk top, desk back, and desk side, respectively, resulting in the final composite image 3411*b* as shown in FIG. 54. By bringing additional processing, transformation, and compositing subsystems to bear, the multiplicity of images required is greatly reduced to a manageable number. The images for the virtual desk may alternatively be supplied from a secondary camera tracking and slaved to the movements of the camera 3410 in real time, around a real desk or alternatively a scale physical model of a desk in another location. An example of such a slave camera system is the Ultimatte Memory Head, commercially available from Ultimatte Corporation.

The example of FIG. 54 does not require that the additional source of video is from a source internal to the system, it could be a series of still frame images provided external to the system which are selected based on the perspective or position of the camera, and the computed relative position of the synthetically generated desk or region. Therefore, FIG. 54 would relate to where the source of control signals which defines the mapping relationship for the additional source of video is comprised of a computer calculation based on camera position relative to an initial position and an initial desired position for a first region (e.g., the virtual desk 3420), where as the camera moves, the source of control signals is partially derived from camera provided signals of the relative position of the camera, which permits the computation of a perspective change for the calculated position of the region, where the new calculated position of the region is used to define the mapping relationship for the additional source of video, and the mapping relationship would include not only position, and scaling, but would also include the perspective view selected.

The spatial position index is used by which the fixed and relative positions of multiple index regions within a display field permits freedom of movement of point of observance (i.e., the camera position). Where there is a linear movement of the camera involved, a simple look-up table can be used. Where more complex changes from point of observance perspective are occurring from frame to frame, computed positional identification and indexing can be provided with satisfactory response time to appear real time to the overall system's operation. For example, in the example where a camera is rotating in a circular-type path around the studio, where the announcer is staying stationary and the two fixed indexed regions are maintained as stationary within the displayed frame, the present invention permits the system to compute the proper perspective angular view of the video source to be overlaid to the respective index defined regions, such that if a first colored green region was in front of a person sitting on a chair, then as the camera rotated at approximately plus and minus 90 degrees from straight face-on, different perspective views of a desk could be superimposed onto and in place of the first defined indexed region, illustrated as a green stationary screen or computer generated region. The utilization of a computer generated region requires slightly more computing power, and depending on other complexities of other functions desired to be provided by the system, could require upgrade to a more powerful system capable of handing all of the functionality required. However, currently available technology is available with which to build the present invention from by combining these existing elements in the method and with the additions as taught by the present application for patent.

In addition to using a table look-up for linear motion of a point of perspective of observance (e.g., a camera), there are numerous other ways to embody solutions to the present invention. For example:

As the camera rotates around the 90 degree turn either direction, and/or moves in closer or zooms in, the system recomputes the relative positions of the defined indexed regions and recomputes the relative position with regard to the respective index region versus point of observance.

The example of FIG. 54 can be extended to allow the mapping of a virtual background behind the person 3430 instead of or in addition to the mapping of a virtual desk 3420. As with the images for the virtual desk, the images for the virtual background may be stored as a multiplicity of images, one each for every possible orientation of the camera 3410. Alternatively, the source of images may store a subset of this multiplicity of images, relying on the transformation, scaling, and image processing of the transformation subsystems shown, for example, 2270 in FIG. 42. The images for the virtual background may alternatively be supplied from a secondary camera tracking and slaved to the movements of the camera 3410 in real time, moving within a real studio or alternatively a scale physical model of a studio in another location. The images for the virtual background may be still frame images provided external to the system which are selected based on the perspective or position of the camera 3410, and the computed relative position of the synthetically generated background.

Therefore, FIG. 54 would relate to where the source of control signals which defines the mapping relationship for the additional source of video is comprised of a computer calculation based on camera position relative to an initial position and a desired orientation for a background region, where as the camera moves, the source of control signals is partially derived from camera provided signals of the relative position of the camera, which permits the computation of a perspective change for the calculated position of the background region, where the new calculated position of the region is used to define the mapping relationship for the additional source of video, and the mapping relationship would include not only position, and scaling, but would also include the perspective view selected.

The Virtual Studio of the present invention is a collection of technologies and methods used to perform special operations on video.

Virtual Studio is an integration of existing and new technologies that provides unprecedented control over real-time video compositing operations. Traditional video compositing operations typically involve a primary video image, part of which is electronically replaced with a secondary video image in a video switcher. A fundamental limitation of this traditional replacement technique is that it does not account for spatial relationships between the two video images. Existing implementations take one of two approaches to this problem: ignore it or contrive a work around. Virtual Studio presents a third alternative: resolve the problem.

The simplest way to deal with differences in spatial relationships between video images is to ignore them. Examples of this common approach include the keying of an over-the-shoulder graphic in typical news production. Movement of the camera framing the talent must be carefully controlled and coordinated with the keying operation; any miscue by the production staff or camera operator results in a disconcerting visual where the stationary talent may appear in artificial motion while the keyed graphic remains stationary in frame. "Talent" is a standard term used in the film and television production industries to describe the actor(s), actress(es), and any other performer—whether professional or amateur—that are supposed to appear on camera.

Artificial movement is so problematic that in some cases-such as weather reporting-the camera framing the talent must be locked down. This work around fixes the spatial relationship between the primary and secondary video images at the cost of introducing new problems: inability to translate, (i.e., move) zoom, pan, tilt, or focus the camera to track the talent.

Virtual Studio solves the problem of artificial movement by using the spatial relationship between the primary (typically a camera) and secondary video images to transform the secondary image to match the spatial characteristics of the first before compositing the images together. Any number of additional images and transformations may be accommodated with no loss of generality.

Virtual Studio lends itself naturally to a number of specific applications. Examples include DYNAMIC BLUE SCREEN™, DYNAMIC OVER-THE-SHOULDER™, SET/LOCATION REPLACEMENT™, and ADVERTISEMENT INSERTION™. In all four examples, telemetry from a memory-head camera is used to coordinate a matte or key operation between multiple video sources using a DVE (Digital Video Effect Unit). A "memory-head camera" is a camera on a special mount that can report (sends signals) its position to an external device. Position information may include the camera's spatial location, pan, tilt, and roll angles, zoom, focus, field of view, and other types, and may be in absolute or relative measures.

DYNAMIC BLUE SCREEN is an application similar to traditional blue screen keying, where a blue (any solid hue, typically with high color saturation; blue and green are common) region present in the primary video background is replaced by a secondary video source. DYNAMIC BLUE SCREEN takes this one step further by utilizing view telemetry from the camera that is providing the video. This allows the primary camera freedom to pan or tilt as necessary to track the talent. DYNAMIC BLUE SCREEN derives the key signal from the blue region in the primary video source. The secondary video is pushed (translated—e.g., moved horizontally or vertically) as necessary to keep it aligned with the blue in the final composite, and in general only 2D DVE effects are required-although higher-quality effects may necessitate a $2^1/2$D DVE. For the purposes of this document, the distinctions between 2D, $2^1/2$D, and 3D DVES are defined as follows: A 2D DVE is incapable of performing a true perspective warp of a source video image. If one took a checkerboard source image and wanted it to appear to recede into the horizon, the distance between the rows closest to the viewer would be the same as the distance between the rows farthest from the viewer. A $2^1/2$D unit would be able to perform a true perspective mapping, and can create the appearance of any 3D rotation or positioning that doesn't require any part of the remapped image to pass in front of any part of itself. A 3D DVE has no such limitation; a remapped image may curl in on itself any number of times.

DYNAMIC OVER-THE-SHOULDER is an application similar to DYNAMIC BLUE SCREEN, but does not require an on-camera blue region. The necessary key signal is synthesized internally by VIRTUAL STUDIO from telemetry received from the video source. DYNAMIC OVER-THE-SHOULDER is best suited for key regions that have simple geometric borders such as a simple rectangle boundary; complex borders or those borders dependent on live action are best served by DYNAMIC BLUE SCREEN. The speed at which one can synthesize a key region depends both on the complexity of the region boundaries, and the computing resources available. More complex boundaries are practical with faster computers and/or better algorithms.

SET/LOCATION REPLACEMENT is a technique that expands on traditional memory-head blue screen keying. Traditional techniques require both foreground and background video to be captured using the same camera moves, leading to inevitable difficulties in precisely coordinating two different shoots, even with the assistance of a memory-head camera. SET/LOCATION REPLACEMENT creates a composite of primary video captured on a blue screen set over secondary video supplied separately. The primary camera is free to track (e.g., pan, tilt, zoom, focus, and/or move) talent or other foreground action. The background video—which need not be precisely coordinated with a memory-head—is transformed in 3D and keyed in behind the foreground. The background transformation generally includes movements in 3D but can be accomplished with a $2^1/2$D DVE. The background video can be comprised of one or more sources independently transformed. With sufficient computing resources available, synthesized sets or set components may be inserted in place of the background or superimposed in the foreground.

AD INSERTION is an application where a video still or motion video (such as an advertisement) is inserted into a primary video source, such that the advertisement appears to be part of the original video. A previous attempt at inserting a video still advertisement into live action, required the use of a super computer (by a company called Princeton Electronic Billboard, primarily using image processing and image recognition techniques). AD INSERTION uses view telemetry from the camera providing the primary video to transform the advertisement in 3D, minimally requiring a 2¹/2D DVE or equivalent. AD INSERTION is similar to SET/LOCATION REPLACEMENT except that a blue screen in the primary video is not required; the necessary key signal can be generated synthetically for simple advertisement borders. Image processing and image recognition techniques can also be used with the telemetry approach for enhanced functions.

DYNAMIC BLUE SCREEN is a broadcast application of VIRTUAL STUDIO technology for the purposes of removing existing constraints placed on traditional Ultimatte news shots. It has beneficial applications in television studios and production facilities. Currently, these types of applications are only partially fulfilled, and are based on expensive SGI hardware, with a system cost approaching three million dollars. Very few television stations can afford a three million dollar system to enhance their weather presentation.

A DYNAMIC BLUE SCREEN comprises a DVE, an Ultimatte keyer, a VIDEO EXPLORER, a CPU, and optionally a Digital Magic DDR. Externally, the camera and camera mount would have a memory-head head or similar device cabled to the CPU. This system removes the constraints placed on the camera for existing Ultimatte news applications. This in effect allows the camera to follow the talent around the news set while maintaining an inserted graphic or video (a weather map for example) in a specific 3D spatial relationship to the news set. In other words, it allows the camera to perform pans, zooms, etc., while following the weather reporter around the set and the inserted background always appears correct.

The VIRTUAL STUDIO can be implemented in many different ways, with many subsets forming whole subsystem applications.

A first subsystem (subset) tracks a camera's movements in real time. Although VIRTUAL STUDIO can use image processing or some other computationally expensive approach, the easiest way to identify what a camera is doing-where and how it moves-is to use a memory-head camera and extract position information from it. Memory-head cameras include encoders that can relay absolute or relative positioning of various axes, such as pan, tilt, zoom, and focus. A communications subsystem accepts this information as fast as it comes from the camera.

A second subsystem uses the real time telemetry information from a memory-head camera to generate a computer-graphic target to superimpose on top of the primary video. This target can be as simple as a small rectangle that is translated and/or scaled to track the primary video in some way. This task involves calibrating to and coordinating with the memory-head camera, computing relative motions, and so forth.

The third illustrated subsystem implements DYNAMIC BLUE SCREEN. A control subsystem controls a DVE sufficiently to perform 2D moves. The telemetry information coming from the memory-head camera is then transformed into a format the DVE understands, and process synchronization is performed. This subsystem provides the ability to provide a VIRTUAL STUDIO DYNAMIC BLUE SCREEN with an arbitrary video source motionlessly keyed into a blue screen present in the primary video source, while the primary video source camera is free to move to track foreground action.

Commercially available technology exists capable of supplying the compositing portion of the solution, such as from Ultimatte.

Many sources of commercially available DVE technology also exists. Miranda provides technology supplying the DVE portion of the solution. Pinnacle also provides a DVE engine such as can be integrated into a VideoBahn or MediaBahn type of system.

The following example illustrates how a VIRTUAL STUDIO system can be used during election coverage. The graphics could consist of the House of Commons with identifiable Members of Parliament lined up on each side of the house, for example, using fixed camera shots and 1 to 2 depth values for Z-keying. In this context, the term "Z-keying" refers to the performing a matte operation between multiple layers (sources) of video; the order in which the matte(s) are performed determines which objects/layers can obscure other objects/layers. Each layer is assigned a "Z" value, and the relative numeric ordering of these "Z" values determines the order in which layers are matted together.

The existing type system, attempting to provide partial VIDEO STUDIO functionality, works on pattern recognition instead of DVE positioning. They are based on SGI platforms with multiple REALITY ENGINES. The cost of the base platform system ranges from $2–3 million. Examples of subsystems for this platform include: VAP Video Art Production, Hamburg, Germany; Arconex, Szczecin, Poland, (Owned by VAP) (Lighting and camera tracking software); and DVS GmbH, Hannover, Germany, (Working with VAP) (video mixer for keying).

DVS GmbH, Digital Video Systems, Hannover Germany produces VMIX. This is a VME-compatible plug-in board for SGI Onyx computers. It attempts to key based on foreknowledge of objects in scene.

ARCONEX Research & Development in Szczecin, Poland produces the ELSET/WALK. This is software for SGI Onyx computers. It performs 3D rendering for computer graphics including reflecting surfaces, environment mapping, and depth-of-field effects.

Video Art Production, GmbH in Hamburg, Germany produces ELSET. This is the solution for electronic sets using SGI Onyx computers. It uses technology from many vendors including the above.

The technology and methods that may be used to implement one embodiment of VIRTUAL STUDIO are described. First described are the functional blocks that comprise a VIRTUAL STUDIO system, then the requirements that the VIRTUAL STUDIO software must meet including some lower-level details. The hardware requirements are then described, including system level interconnections. Key technologies used within VIRTUAL STUDIO are outlined next, and the section ends with speculation about future technologies and methods that may be incorporated into a VIRTUAL STUDIO system.

There are four major functional blocks that make up a VIRTUAL STUDIO system. These blocks accomplish the following tasks: derivation of telemetry, computation, transformation, and keying.

Derivation of telemetry is the process of determining the spatial orientation associated with a single source of video. This orientation may be derived by instrumenting a camera mount to relay positional information in parallel with a video signal; utilizing a pre-recorded track of positional information; by image analysis of the video source; or by other means. This orientation is specified in respect to some arbitrary home or origin vector (i.e., position and direction), and may include camera-specific information (such as zoom, focus, depth of field, iris, and/or field of view), scene-specific information (such as overall brightness, contrast, color balance) and multiple axes of translation and rotation information (including X, Y, and Z position or displacement, pan, tilt, and roll angles, etc.).

One implementation of the functional block which derives telemetry uses a memory-head camera, such as the Ultimatte 6-axis unit. This information is transferred from the memory-head unit into the host computer (e.g., Apple Computer. Inc,'s Macintosh).

Spatial orientation information is relayed to the computation functional block. The computation block operates on multiple streams of telemetry associated with the video sources; in the single case the spatial orientation of the additional video source is assumed to remain static in a defined state. The computation block produces control signals and data.

An example of an implementation of the computation functional block is a process (application, program, module, driver) running on a Macintosh host computer.

Control signals and data are relayed from the computation functional block to the transformation functional block by a communications manager. The transformation block performs a spatial transformation in three dimensions on the additional video source, similar in performance to a conventional 3D Digital Video Effects unit (DVE). The transformation block thus produces a version of the second video source, correctly translated, rotated, filtered, processed, clipped, and/or scaled to match the orientation of the first video source.

An example of an implementation of the transformation block is a DVE, such as a Miranda unit, Aladdin by Pinnacle, etc.

The keying functional block accepts the transformed version of the additional video source and the unmodified first video source, and performs a compositing operation where selected portions of the first video image are replaced with portions of the modified additional image. This compositing operation may be controlled by content present in either of the two video inputs to the keyer block; data relayed by the transformation block from the computation block; or it may be controlled by information independent of the video and/or telemetry inputs. Most commonly it is controlled by a key derived from the first video source, such as a conventional blue-screen key signal.

One example of the keying functional block could be performed with the built-in Video Explorer rectangle controls, a built-in chroma-key capability, or a high-quality Ultimatte keyer.

There are some calibration and alignment procedures that an operator needs to perform. The interface should be engineered to be as simple as possible, and eliminate interaction with the computer as much as possible.

For example, the Ultimatte memory-head camera has its own required set-up procedure to calibrate and home itself. A setup procedure for a subsystem which includes the memory head should include by reference and require that the Ultimatte procedure is performed first.

For field debugging purposes, a test application program can provide an animation of a simple representation of a video camera on a computer screen, tracking whatever movements the real camera makes. It could provide immediate feedback that the memory-head camera was installed and calibrated correctly, and with sufficient software engineering can even be capable of troubleshooting common operator mistakes in Ultimatte's procedure.

Once the system verifies the memory-head camera mount is calibrated and there is a good communications link to the CPU, it needs to calibrate VIRTUAL STUDIO to the actual studio environment. One way is for the operator to take very careful, explicit measurements of the set. This can be simplified greatly by providing an interactive setup procedure.

In one example, an interactive procedure works as follows: the camera output is overlaid with a rectangular outline. The operator positions the camera until the blue screen region fits precisely in the outline and clicks some button. The first outline is replaced with a second, and the process is repeated until the computer has accumulated enough data points to uniquely determine the relationship between the values coming from the memory-head camera and the position of the blue screen within the set.

If only pan and tilt were possible, the minimum number of samples would be two, assuming perfect accuracy on the part of the operator. However, because the relationship between zoom setting and field of view is rarely linear, the minimum number of samples is likely to be four or greater for accurate curve fitting, and the inaccuracy of the operator may require still more.

This calibration method has the advantage of being tolerant of sloppy positioning. If the computer detects the position values it receives are inconsistent (but within some range considered "close") the computer continues to prompt for additional positioning information, and can offer helpful hints to the operator or have provision to zoom the display near the rectangle's corners for fine adjustments. Above some number of data points, clearly the system is overdetermined, and any convenient averaging (e.g., least squares) technique can be used to determine the actual relationship information within VIRTUAL STUDIO.

The hardware requirements of the system interface/ interconnect is highly dependent on which memory-head camera is used. For example, the Ultimatte unit communicates over an RS422 serial cable. The Macintosh computer CPU typically has at least one RS422 serial port. Depending on the studio environment, it may be necessary to supply or specify tough, production quality cables of significant length to link the memory-head camera mount with the CPU, and/or to impose length restrictions due to transmission constraints.

Ancillary information an comprise any one or all of the following: identification of camera view, position of camera relative to some fixed known reference point, orientation of the camera relative to some fixed known orientation, operational parameters of camera relative to some fixed known setting or absolute terms of that parameter.

Figure 55A:
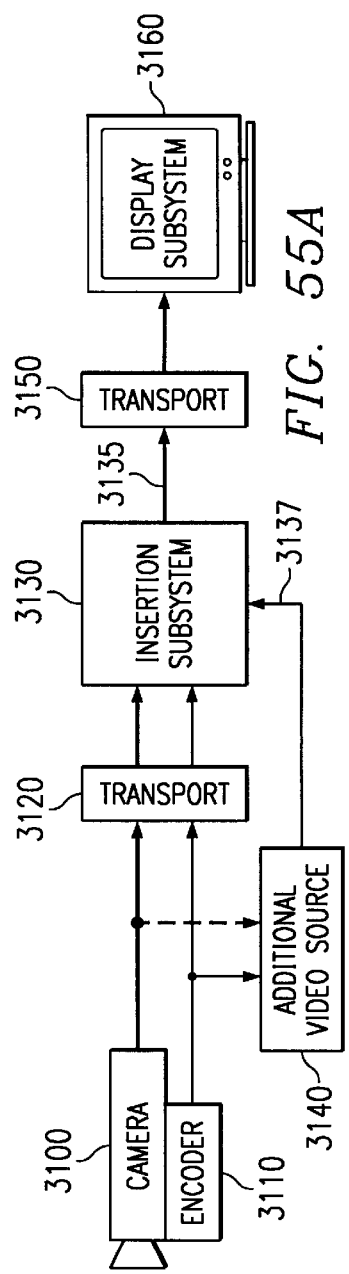
FIGS. 55A and B show a video system of the present invention.

FIG. 55A illustrates another embodiment of the present invention. This system is comprised of a video source 3100 providing video signals, coupled to an encoder unit 3110 that provides the ancillary data, both to a transport subsystem 3120. The transport subsystem 3120 couples the first video source and the encoder unit to the insertion system 3130. An additional video source 3140 can provide an additional video signal 3137 to the insertion system 3130. The additional video signal 3137 can be provided either from a separate additional source of video 3140 or can be provided directly from either the video signal or ancillary information from the camera 3100 or encoder 3110, respectively.

Still referring to FIG. 55A, the camera 3100's video signal is augmented with the additional video signal 3137 and the resultant output 3135 from the insertion system 3130 is coupled via an optional additional transport subsystem 3150 to a display subsystem 3160 for display presentation thereof.

Figure 55B:
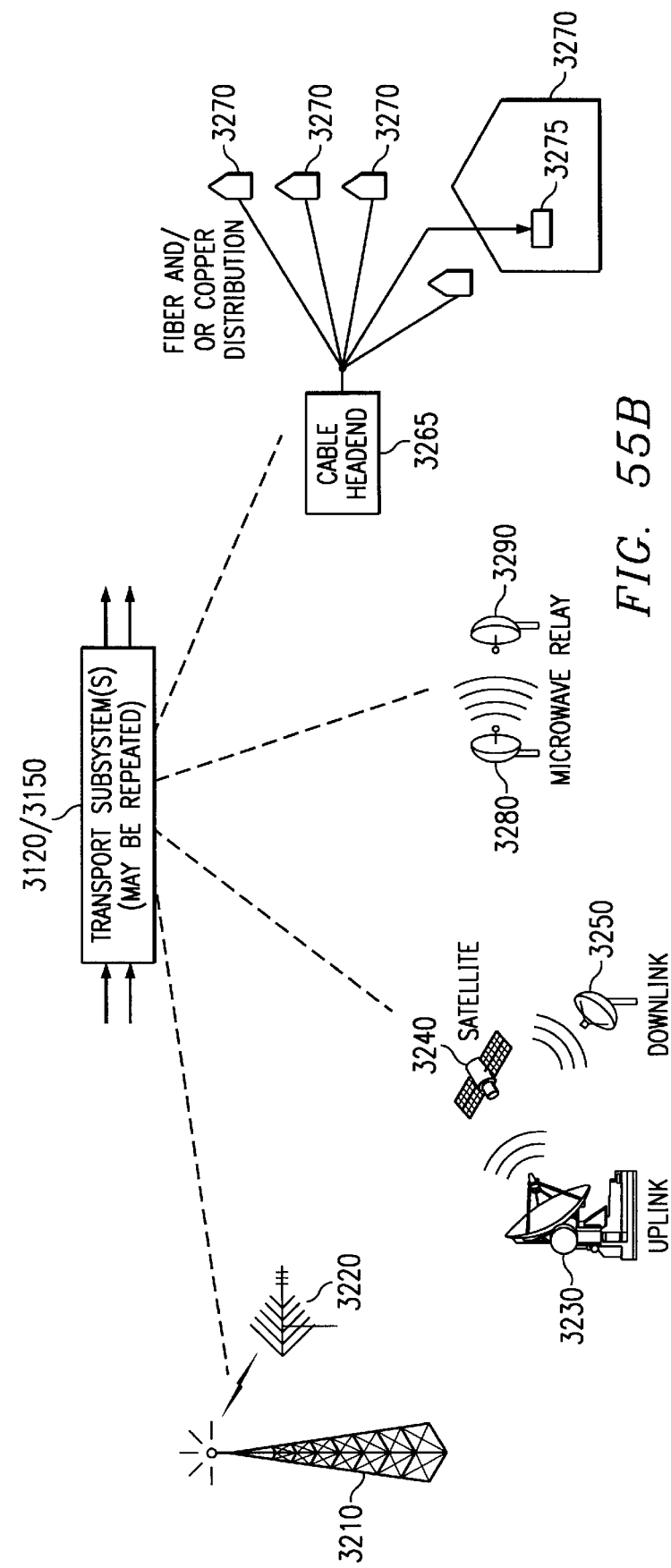

Referring to FIG. 55B, an alternate representation of the system of FIG. 55A is provided, wherein the transport subsystem 3120 and 3150 are illustrated showing the various possible selections of actual transport apparatus which can be mixed and matched, utilized either alone or in combination for each of the subsystems 3120 and/or 3150. As illustrated, one option is to utilize radio wave transmission from a transmitter 3210 to a reception antenna 3220.

A second illustrated transport apparatus, as illustrated in FIG. 55B, utilizes a satellite transmitter 3230 to broadcast via radio waves to a satellite 3240 which retransmits the received signal to a receiving dish 3250. A third illustrated apparatus is the use of a cable head-end system for receiving the signals, which couples to a cable, either fiber optic or copper wires, for example, 3265, which then connect to cable customers 3270 which have receiving equipment 3275 to permit decoding of the signals from the cable 3265.

Also illustrated in FIG. 55B is transport apparatus comprising a microwave transmitter 3280 which sends microwave signals to be received by a microwave receiver dish 3290. In each case, the receiver portion of the apparatus can either be the ultimate end user or connect to another transport apparatus.

Referring back to FIG. 55A, the insertion system 3130 can also occur at one location in the overall system chain of interconnection, or alternatively, can be present at multiple locations within the chain of communication. Thus, as one example, a national network broadcaster can send a video signal and ancillary information for distribution to multiple local affiliate stations which can each provide their own insertion subsystem 3130 for inserting a separate additional source of video 3137 such that the display on display devices 3160 has a different additional source of video insertion at the same location, but having different content for each of the local station transmissions.

Alternatively, or additionally, the recipient of the signal distributed by the local station can have an insertion subsystem 3130 as in FIG. 55A which permits the insertion of its own additional source of video at the same relative location in the display. The additional source of video for each separate insertion can either be provided separately at that location, or be encoded and transmitted as a part of the video signal or ancillary information from the originating source, or from the transport apparatus location or from the insertion subsystem location.

The insertion subsystem 3130 of FIG. 55A can be integrated into the originating source of video signal and/or the originating source of ancillary information (which can be the same device or separate devices), or can be a stand-alone subsystem located at the point where the originating source of video is located. The insertion subsystem 3130 can also be located at a processing studio in close proximity on location to the original source of video, or be remotely located at a distance from the originating source of video, where the video signal (and optionally, the ancillary information) are somehow distributed (such as by broadcast, cable distribution of a recorded video tape, etc.) to the remote location for processing (such as further transmission by a transport apparatus, or for decoding and display by the end user).

Referring to FIG. 56, an alternate embodiment of the system of FIG. 55 is illustrated. As illustrated in FIG. 56, the origination source of video signal 3100 and ancillary data 3110 outputs the video signal and ancillary data to a transport apparatus 3120 which couples the video signal and ancillary data to the insertion system 3130. The insertion system 3130 adds an additional source of video 3137 (such as an advertisement Z) to the video signal.

Additionally, the insertion system 3130 of FIG. 56 continues to propagate the ancillary data as well as the video signal containing the advertisement Z to the additional transport apparatus 3150. The transport apparatus 3150 further couples the video signal with the advertisement Z to the end display device 3160 for display thereon.

Still referring to FIG. 56, the ancillary data from the final transport apparatus 3150 can either be discarded, or fed to the display device 3160 that can ignore that data, since there is no circuitry within that display apparatus to utilize the ancillary information. The insertion system 3130, as illustrated in FIG. 56, may be repeated either in parallel or in series configurations, so that multiple insertion systems 3130 can be provided to allow either cascading of multiple additional sources of video onto a composited video signal plus additional sources of video in a series configuration, or allow independent and mutually exclusive insertion of separate additional sources of video onto distributed video signals coupled in a parallel arrangement to separate display devices.

As illustrated in FIG. 57, a series interconnection cascading of insertion systems 3130 is illustrated. The origination source 3100, 3110 couple the respective video signal and ancillary data via transport apparatus 3120 to a first insertion system 3130a which provides for the insertion of an additional source of video 3137a (such as a first advertisement A), and provides an output comprising a video signal +A (VS+A) and ancillary data for coupling via a second transport apparatus 3150 to a second insertion system 3130b which combines a second additional source of video 3137b (representing advertisement B) onto the video signal plus additional source A to provide an output of the video signal with advertisement A and advertisement B both present on the display at different locations, and also outputs ancillary data, for coupling via transport apparatus 3155 to a third insertion subsystem 3130c which combines a third additional source of video 3137c (representing an advertisement C), which provides a video signal plus advertisement A, advertisement B, and advertisement C signal VS+ABC, and (optionally,) provides ancillary data output for coupling via transport mechanism 3157. The transport mechanism 3157 outputs the video signal plus advertisements A, B, and C for coupling to the display apparatus 3160 to provide a display presentation comprising the video signal and the advertisements A, B, and C all display composited simultaneously. As discussed above with reference to FIG. 56, the ancillary data from the final stage of transport apparatus 3157 is optional, and ancillary data transmission can either be terminated at the final transmission apparatus 3157 or can optionally be coupled to the display device 3160 where it is not utilized and is ignored.

The system as illustrated in FIG. 57 shows three insertion systems 3130a, 3130b, 3130c. It is to be understood that any number of insertion systems 3130 can be cascaded in this manner, from one to as many as is needed for the application, without limitation based on the insertion system operation.

In addition, the transport apparatus 3120, 3150, 3155, and 3157 are illustrated in the embodiment of FIG. 57, but are optional in that the interconnection can be hard-wired where distance between system components is not an issue, such as where they are all at the same physical location. Alternatively, one or more of the transport apparatus can be present, where needed, for bridging gaps of distance in communication of the signals. Additionally, it will be understood, that additional transport apparatus can be cascaded beyond those shown so that transport apparatus can be back-to-back where, for example, the transport apparatus 3120 can actually represent a combination of multiple transport apparatus subsystems, such as a cable head to cable to customer as in 3260, 3265, and 3270 of FIG. 55B, or a satellite link (3230, 3240, 3250) coupled to a cable head to cable customer 3260, 3265, 3270, or any other combination of satellite, radio wave antenna, cable head cable and cable receiver, and/or microwave transmitter and receiver.

Figure 58:
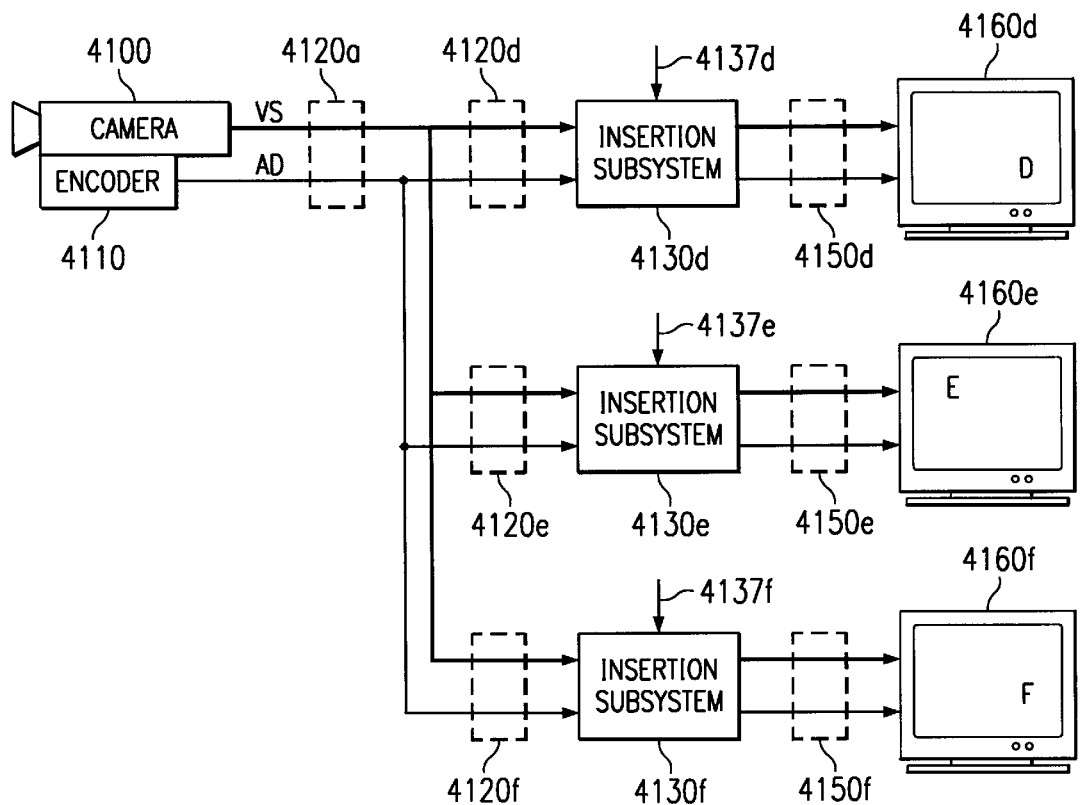
FIG. 58 shows a block diagram of another alternate embodiment of the present invention.

Referring now to FIG. 58, an origination source 4100, 4110 provide respective video signal and ancillary data signal outputs which are coupled in parallel to each of insertion systems 4130d, 4130e, 4130f representing separate insertion systems. These systems can be at physically distant locations, or at the same physical location. Furthermore, transport apparatus 4120 can be optionally provided immediately after the origination sources 4100, 4110 (as shown at 4120a in dashed) and/or can be provided just prior to each of the insertion systems 4130d, 4130e, and 4130f (as illustrated at 4120d, 4120e, and 4120f, respectively). The insertion systems 4130d, 4130e, 4130f each combine a respective independent additional source of video (4137d, 4137e, 4137f, respectively) with the video signal input to provide a respective video signal output. Thus, the insertion system 4130d provides a output of video signal plus the video source D (representing for example, an advertisement D) while insertion system 4130e combines its additional source of video 4137e (e.g., an advertisement E) to provide a video signal plus advertisement E, and similarly, insertion system 4130f combines its additional source of video 4137f to provide an output of video signal plus the advertisement F. Additionally, each of the insertion system provides an output of the ancillary data as illustrated, but in an optional embodiment would not provide ancillary data output where it was configured for a non-serial cascaded arrangement. The output of each of the insertion systems 4130d, 4130e, 4130f are coupled to optional transport apparatus 4150d, 4150e, 4150f, respectively, and therefrom couple the video signal plus respective advertisement to the respective connected display device. Thus, the video signal plus advertisement D is coupled to display system 4160d to provide a display of the video signal plus the advertisement D. The output from the insertion source 4130e is coupled ultimately to display device 4160e for display of the video signal plus advertisement E, and the output of insertion system 4130F is coupled ultimately to display device 4160f for display of the video signal plus advertisement F. This, of course, understood that the advertisement F could alternatively be an alternate video display, such as to provide a picture within picture, or other optional display. Additionally, the insertions subsystems 4130d, 4130e, 4130f can provide for either display of the additional respective video source at the same relative location in the display provided on the respective display apparatus, or can provide for the display of the additional source of video at different relative locations on the respective video display for each insertion subsystem. Each insertion system is programmable independently of the other, and the relative location of the mapping of the additional source of video onto the video signal is controlled responsive to the programming.

It is to be understood that while the additional sources of video are shown in FIG. 58 as separate and independent, each with their own unique identification, the additional sources of video can be from a common source of video, wherein one or more of the additional sources of video 4137d, 4137e, 4137f represent the same additional source of video.

Referring to FIG. 59, an alternate embodiment of the present invention is illustrated, showing a combination of both serial cascaded and parallel coupled insertion systems. For purposes of ease of description, the transport apparatus subsystems are not illustrated in FIG. 59. However, it is to be understood that the transport apparatus can be provided between any and/or all of the individual components illustrated in FIG. 59. Alternatively, they need not appear anywhere, or can appear only in certain selected locations. Referring to FIG. 59, the origination source 4100, 4110 provide respective outputs of the video signal VS and ancillary data AD for coupling to insertion systems 4130g, 4130h, 4130j in parallel. Additional sources of video 4137g, 4137h, 4137j coupled to the respective insertion systems 4130g, 4130h, 4130j where they are combined to provide a composited output of the video signal plus the respective additional video source g, h, j, respectively. As illustrated, the insertion system 4130g outputs the video signal plus additional source of video G for coupling to its respective display device 4160g for display of the advertisement G (the additional source of video 4137g) as part of the display presentation of the video signal at a location responsive to the programming of the insertion system 4130g, and responsive to the ancillary data.

Still referring to FIG. 59, similarly, the insertion source 4130h combines its additional source of video 4137h to provide an output of the video signal composited with the additional source of video H and also outputs the ancillary data to an insertion system 4130i which combines its additional source of video 4137i to provide a composited output of video signal +H+I which are coupled to display apparatus 4160h for display presentation of the video signal plus composited additional video sources H and I where the relative locations of H and I are mapped onto the video signal responsive to ancillary data and the programming of the respective insertion systems 4130h and 4130i. In a similar manner, insertion systems 4130j, 4130k combine their respective additional sources of video 4137j, 4137k to provide respective outputs of video signal +J and video signal +J+K, and ancillary data for ultimate coupling to the display apparatus 4160k for display presentation of the composited video signal plus additional sources of video J and K at relative locations responsive to the insertion sources programming and the ancillary data. Additionally, the output from insertion system 4130j, consisting of the video source plus additional source of video J, and the ancillary data AD, are coupled to the insertion subsystem 4130l where the additional source of video 4137l is combined to provide the video signal output +J+L composited and ancillary data for coupling to insertion system 4130m which combines its additional source of video 4137m to provide an output of the video signal +J+L+M coupled to its respective display apparatus 4160m, for display presentation of the video signal image composited with the additional sources of video J, L, and M at relative locations as programmed responsive to insertion systems 4130j, 4130l, 4130m, respectively, and to the ancillary data.

Figure 60:
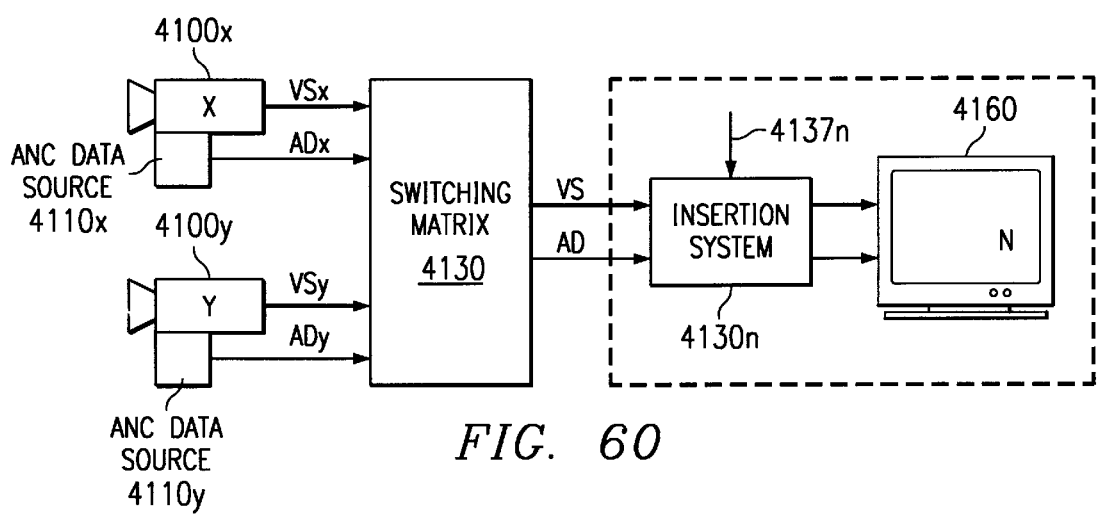
FIG. 60 shows a block diagram of another alternate embodiment of the present invention.

Referring to FIG. 60, an alternate embodiment of the present invention is illustrated, wherein there are multiple origination sources of video, such as separate video cameras, where a plurality of cameras and data providers are utilized to provide origination sources of video signals and ancillary data. As illustrated, camera X provides origination source 4100x of video signal X, and an ancillary data source 4110x to provide ancillary data ADx coupled to a switcher, or switching matrix 4310. Additionally, a second video camera Y, provides an additional original source of a video 4100y of a video signal Y and provides an ancillary data source 4110y. This ancillary data source 4110y produces ancillary data signal ADy, for coupling to the switching matrix 4310. It is to be understood that other types of origination sources can be utilized in addition to video cameras, such as video tape recorders, still image systems, slow motion playback systems, computer systems generating graphics, or other optional systems. The switching matrix 4310, responsive to a control system or to an operator, selectively switches between the origination sources, providing outputs of either video signal x and ancillary data x, or video signal y and ancillary data y, for coupling to an insertion system 4130n. The insertion system 4130n can be a single insertion subsystem, or alternatively, can be comprised of multiple insertion subsystems of the configurations as illustrated in FIGS. 56–59. As illustrated in FIG. 60, the additional source of video 4137n is coupled to the insertion system 4130n, where it is combined and mapped onto the respective video signal, responsive to its programming and to the respective ancillary data, to provide a composited video output which coupled to the display device 4160. The actual display will vary responsive to the switching matrix, such that either the video signal VSX+N or the video signal VSY+N are displayed, responsive to the switching matrix. The position of the additional source of video 4137, mapped onto the video signal image, can either be the same relative location for both video signal X and video signal Y, or can be mapped to a different relative physical position within the display responsive to the ancillary data and the programming of the insertion system 4130n. However, unless camera X and Y are located at the same relative point of origin, the additional source of video will typically be displayed at different locations for each of the video signal sources X and Y. This embodiment is not limited to two cameras, and it is to be understood that any number, one to as many as needed may be utilized.

Furthermore, it is to be understood that any number, zero to as many as needed, of transport apparatus can be inserted within the chain between any of the components in the system. However, the most likely transport apparatus between the origination sources X and Y and the switching matrix would be cables, due to the desire to have studio type control of the origination sources prior to downstream transmission.

An example A of the invention would be a data communications system utilizing a shared channel for communication of data signals, and comprising: one or more input source means, each providing output of data signals; one or more output means, each for receiving output data signals; control means for data path assignment for controlling the relative physical path of data signal communication onto the shared channel; insertion means for data path assignment multiplexing of the data signals from a selected one of the input source means, for selective insertion of the respective data signals onto the shared channel responsive to the control means; and extractor means for obtaining the data signals from the shared channel to provide data signals to a selected one of the output means, responsive to the control means, wherein the data signals are comprised of data representing time varying signals and of data representing relative synchronization of the time-varying signals to a reference signal.

The invention as in example A, wherein the control means is further comprised of means for delaying placement on the shared channel of the data signal for receipt by the output means relative to the data signal placement of respective corresponding ones of the data signals for the input means.

The invention as in example A wherein said extractor means demultiplexes data signals from the shared channel.

The invention as in example A, wherein the control means is further comprised of means for time-slot assignment for controlling the data signal placement onto the shared channel, and wherein the reference signal is independent of the control means.

The invention as in example A, wherein said extractor means is further comprised of means for time-demultiplexing the data signals from the shared channel.

The invention as in example A, further comprising a means for providing a master clock having a period defining a communication cycle.

The invention as in example A wherein the time-slots are structured as cyclically recurring portions recurring once during each of the communication cycles, the system further comprising a stream processor means for inputting, storing, and re-outputting data signals onto the shared channel during different and unique time slots of the communications cycle, for providing signal processing of the data signals to provide a processed output signal. Further, wherein the controller means is coupled to the source means, output means, and stream processor means, and provides means for coordinating the control of assignment of the communication on the shared channel to effectuate data stream transfer between at least two of said source means, said data stream processor means, and said output means.

The invention as in example A, wherein the input data signals are packetized to reduced width data packets and transferred to the shared channel, wherein the system is further comprised of a conflict resolution means for providing control of data packet width assignment to the shared channel, for adaptively controlling the data width and number of total sub-channels of any data width, responsive to the control means.

The invention as in example A, wherein the input data signals are packetized to reduced width data packets and transferred to the shared channel, wherein the system is further comprised of a timing and conflict resolution means for providing control of data packet width assignment and time-slice assignment to the shared channel, for adaptively controlling the data width, time slot assignment, and number of total sub-channels of any data width, responsive to the control means.

The invention as in example A, further comprising means for adjusting the relative timing of a selected one of the time varying signals to be synchronized to the reference signal. Further, wherein the selected one of the time varying signal is synchronized and coincident with the reference signal. Further, wherein the selected one of the time-varying signals is synchronized and offset to be non-coincident with the reference signal.

The invention as in example A, wherein the reference signal is a predefined fixed reference signal. Further, wherein the selected one of the time varying signal is synchronized and coincident with the reference signal. Further, wherein the selected one of the time-varying signals is synchronized and offset to be non-coincident with the reference signal.

The invention as in example A, wherein the reference signal is a separate one of the time-varying signals. Further, wherein the selected one of the time varying signals is synchronized and coincident with the reference signal. Further, wherein the selected one of the time-varying signals is synchronized and offset to be non-coincident with the reference signal.

The invention as in example A, wherein the relative synchronization of the time varying signals to the reference signal is communicated separate from but in parallel with the data representing the time-varying signals.

The invention as in example A, wherein the relative synchronization of the time varying signals to the reference signal is encoded within the data representing the time-varying signal.

An example B of the invention would be a data communications system utilizing a shared channel for communication of data signals, comprising: one or more input source means, each providing output of data signals; one or more output means, each for receiving output data signals; control means for time slot assignment for controlling the data signal placement onto the shared channel; insertion means for multiplexing of the data signals from a selected one of the input source means, for selective insertion of the respective data signals onto the shared channel responsive to the control means; and extractor means for obtaining the data signals from the shared channel to provide data signals to a selected one of the output means, responsive to the control means, wherein the data signals are comprised of data representing time varying signals and of data representing relative synchronization of the time-varying signals to a reference signal independent of the control means.

The invention as in example B, wherein the control means is further comprised of means for delaying placement on the shared channel of the data signal for receipt by the output means relative to the data signal placement of respective corresponding ones of the data signals for the input means.

The invention as in example B, wherein said extraction means is comprised of means for time demultiplexing data signals from the shared channel.

The invention as in example B, further comprising means for providing a master clock having a period defining a communication cycle, wherein the time-slot of the communication of data signals is structured as cyclically recurring portions recurring once per communication cycle. Further comprising a stream processor means for inputting, storing, and re-outputting data signals onto the shared channel during different and unique portions of the communications cycle, for providing signal processing of the input data signals to provide a processed output signal.

The invention as in example B, wherein the system is further comprised of: timing and conflict resolution means for providing control of time-slot assignment to the shared channel, for adaptively controlling the time slot assignment occurring during any one time-slot, responsive to the control means.

The invention as in example B, further comprising means for adjusting the relative timing of a selected one of the time varying signals to be synchronized to the reference signal. Further, the system as in claim 28, wherein the selected one of the time varying signals is synchronized and coincident with the reference signal. Further, the system as in claim 28, wherein the selected one of the time-varying signals is synchronized and offset to be non-coincident with the reference signal.

The invention as in example B, wherein the reference signal is a predefined fixed reference signal. Further, wherein the selected one of the time varying signals is synchronized and coincident with the reference signal. Further, wherein the selected one of the time-varying signals is synchronized and offset to be non-coincident with the reference signal.

The invention as in example B, wherein the reference signal is a separate one of the time-varying signals. Further, wherein the selected one of the time varying signals is synchronized and coincident with the reference signal. Further, wherein the selected one of the time-varying signals is synchronized and offset to be non-coincident with the reference signal.

The invention as in example B, wherein the relative synchronization of the time varying signals to the reference signal is communicated separate from but in parallel with the data representing the time-varying signals.

The invention as in example B, wherein the relative synchronization of the time varying signals to the reference is encoded within the data representing the time-varying signal.

An example C of the invention would be a signal processing system for managing multiple data stream communications, said system comprising: a shared access communications channel providing multiple individual sub-channels of data signals, wherein communications on the shared channel occurs during each of a plurality of individual access time slots provided on a cyclically recurring basis, once during each clock cycle, each individual sub-channel providing communication during its respective individual access time slot; a time slot assignment controller for allocating input and output access time slots for the shared channel; and a plurality of subsystems utilizing data streams for communication, each subsystem comprising shared channel interface means responsive to the time slot assignment controller, for selectively coupling to the shared channel for effecting communication of its respective data stream during a respective allocated access time slot, wherein the data streams represent time varying signals, and relative synchronization of the time-varying signals to a reference signal independent of the time slot.

The invention as in example C, further comprising means for adjusting the relative timing of a selected one of the time varying signals to be synchronized to the reference signal. Further, wherein the selected one of the time varying signals is synchronized and coincident with the reference signal. Further, wherein the selected one of the time-varying signals is synchronized and offset to be non-coincident with the reference signal.

The invention as in example C, wherein the reference signal is a predefined fixed reference signal. Further, wherein the selected one of the time varying signals is synchronized and coincident with the reference signal. Further, wherein the selected one of the time-varying signals is synchronized and offset to be non-coincident with the reference signal.

The invention as in example C, wherein the reference signal is a separate one of the time-varying signals. Further, wherein the selected one of the time varying signals is synchronized and coincident with the reference signal. Further, wherein the selected one of the time-varying signals is synchronized and offset to be non-coincident with the reference signal.

The invention as in example C, wherein the control means is further comprised of means for data path assignment for controlling the relative physical path of the data stream communication onto the shared access communications channel.

The invention as in example C, further comprising a stream processor means for inputting, storing, and reoutputting data streams onto the shared channel during different and unique portions of the communications cycle, for providing signal processing of the input data streams to provide a processed output data stream.

The invention as in example C, wherein the data stream comprises data representing the time-varying signals, wherein the relative synchronization of the time varying signals to the reference is communicated separate from but in parallel with the data representing the time-varying signals.

The invention as in example C, wherein the data stream comprises data representing the time-varying signals, wherein the relative synchronization of the time varying signals to the reference is encoded within the data representing the time-varying signal.

The invention as in example C, wherein the subsystems are further comprised of one or more stream processor means coupled to the shared channel; the system further comprising an input source means for providing signal data streams for coupling onto the shared channel; output means for receiving signal data streams from the shared channel; and a controller means coupled to the source means, output means, stream processor means, and the time slot controller, for coordinating the assignment of shared channel time slots to effectuate data stream transfer between said source means, said data stream processor means, and said output means.

An example D of the invention would be a communications system for coupling a variable number of data streams, each having a defined bandwidth, between modules, each module having a defined physical location associated therewith and interfaced to a unique set of segments of a communications bus, the bus segments having predefined bandwidth limitations, the system comprised of: a segment allocation means, for allocating segments of the communication bus to a respective channel; and a channel allocation means, for selectively allocating selected segments to one or more channels responsive to (1) the number of data streams requiring approximately concurrent communication, (2) the bandwidth of each said stream in said number of data streams, (3) the physical locations of the modules between which communication is to occur, and (4) the predefined bandwidth limitations, wherein the segment allocation means is responsive to the channel allocation means.

The invention as in example D, further comprising time slot allocation means, for allocating each individual channel to one or more respective time slots, of a plurality of time slots within a periodic bus cycle during which respective time slot, the respective individual channel is available for communication on the communications bus, wherein the segment allocation means allocates segments for each respective time slot, wherein the channel allocation means additionally selectively allocates the time slots to the one or more channels, and wherein the time slot allocation means is responsive to the channel allocation means.

The invention as in example D, wherein each of the modules is comprised of bus switch means for selectively coupling at least two segments of the unique set of the bus segments to each other.

An example E of the invention would be a routing interface system for communicating multiple independent data streams within time division multiplexed time slots as coordinated by a time-slot controller, forming a main stream of data channel communications flow, the system comprising: two or more shared communications channels wherein at least two of said communications channels have counter rotating directions for the main streams of data communicated thereon; an interface means for selectively inserting onto, extracting from, and deleting one or more streams of data from the main stream; and a routing means for determining interface assignment as to which of the time slots on which of said communications channels a particular respective one of the multiple independent data streams is to be part of, responsive to the time slot controller.

The invention as in example E, wherein the routing means is responsive to the time slot controller.

The invention as in example E, wherein there are a plurality of interface means, wherein the communications channels coupled in a point to point cascade connection, wherein the routing means is further comprised of means configuring topology for each of the point to point connections independently of each other.

The invention as in example E, wherein the data streams represent time varying signals, and relative synchronization of the time-varying signals to a reference signal independent of the time slot. Further comprising a means for adjusting the relative timing of a selected one of the time varying signals to be synchronized to the reference signal. Further, wherein the selected one of the time varying signals is synchronized and coincident with the reference signal. Further, wherein the selected one of the time-varying signals is synchronized and offset to be non-coincident with the reference signal. Further, wherein the reference signal is a predefined fixed reference signal. Further, wherein the reference signal is a separate one of the time-varying signals. Further comprised of modules coupled to respective ones of the interface means, the modules comprising: an input source means for providing signal data streams for coupling onto the shared communications channel; an output means for receiving signal data streams from the shared channel; and wherein the routing means is further comprised of controller means coupled to the source means, output means, stream processor means, and the time slot controller, for coordinating the assignment of shared channel time slots to effectuate data stream transfer between said source means, said data stream processor means, and the output means. Further, wherein each of the data streams has a defined bandwidth between respective ones of the modules, each module having a defined physical location associated therewith and interfaced to a respective one of the shared communications channel having a physical bus having predefined bandwidth limitations, the system comprised of: a time slot allocation means, for allocating an individual channel to one or more respective time slots, of a plurality of time slots within a periodic bus cycle during which respective time slot, the respective individual channel is available for communication on the communications bus; a segment allocation means, for allocating segments of the bus to a respective channel for a respective time slot; and a channel allocation means, for selectively allocating selected time slots and selected segments to a respective one or more channels responsive to (1) number of data streams requiring approximately concurrent communication, (2) bandwidth of each said stream in said number of data streams, (3) physical locations of the modules between which communication is to occur, and (4) the predefined bandwidth limitations; wherein the time slot allocation means and the segment allocation means are responsive to the channel allocation means.

The invention as in example E, wherein the time slot controller is further comprised of control means for data path assignment for controlling the relative physical path of the data stream communication onto the respective shared communications channel. Further, wherein the data stream comprises data representing the time-varying signals, wherein the relative synchronization of the time varying signals to the reference is communicated separate from but in parallel with the data representing the time-varying signals. Further, wherein the data stream comprises data representing the time-varying signals, wherein the relative synchronization of the time varying signals to the reference is encoded within the data representing the time-varying signal.

The invention as in example E, further comprising: a stream processor means for selectively inputting, storing, and re-outputting data signals onto the shared communications channel during its unique portions of the interface assignments of the communications cycle, for providing signal processing of the input data signals to provide a processed output signal.

An example F of the invention would be a method for routing multiple independent data streams within time division multiplexed time slots, the time slots being coordinated by a time-slot controller, the time slots forming a main stream of data, the method comprising the steps of: transferring data over a plurality of shared communications channels, at least two of the plurality of communications channels communicating in opposite directions; the time slot controller allocating the time slots between the plurality of communications channels; and selectively inserting onto, extracting from, and deleting, at different times, one or more time slots of data from the main stream of data.

An example G of the invention would be an interface system for routing multiple independent data streams within time division multiplexed time slots, the time slots being coordinated by a time-slot controller, the time slots forming a main stream of data, the system comprising: a plurality of shared communications channels wherein at least two of the communications channels communicate in opposing directions; an interface, coupled to the plurality of shared communications channels, for selectively inserting onto, extracting from, and deleting, at different times, one or more time slots of data from the main stream of data; a router, coupled to the interface, for assigning in response to the time slot controller, a particular one of the multiple independent data streams to a first time slot; and a data path controller, coupled to the interface, for allocating the multiple independent data streams, each in a time slot, onto one of the respective shared communications channel.

An example H of the invention would be an interface system for routing multiple independent data streams within time division multiplexed time slots, the time slots being coordinated by a time-slot controller, the time slots forming a main stream of data, the system comprising: a plurality of shared communications channels wherein at least two of the communications channels communicate in opposing directions; at least one interface, each coupled to the plurality of shared communications channels, for selectively inserting onto, extracting from, and deleting, at different times, one or more time slots of data from the main stream of data; a router, coupled to the interface, for assigning in response to the time slot controller, a particular one of the multiple independent data streams to a first time slot of the time division multiplexed time slots; a data path controller, coupled to the interface, for allocating the multiple independent data streams, each in a time slot, onto one of the respective shared communications channels; and a plurality of interface modules, at least one interface module being coupled to at least one of the interfaces, each module having an input source subsystem, coupled to at least one of the plurality of shared communications channels to provide data streams for coupling onto the shared communications channels and an output subsystem, coupled to at least one of the plurality of shared communications channels to receive signal data streams from the shared channels.

An example J of the invention would be a system for providing a source of panoramic display, comprising a source of video signals representing a multiple direction perspective view from a defined point source comprising multiple subset views; a means for defining a view direction within the coordinate system of the perspective view; a means for selecting one or more of the subset views responsive to the view direction; and a means for providing a display responsive to the selected views.

The invention as in example J, wherein the display is comprised of portions of at least one selected subset view.

The invention as in example J, wherein the display is comprised of portions of at least two selected subset views.

The invention as in example J, wherein the selected areas of the multiple subset views are comprised of still frame images.

The invention as in example J, wherein the selected areas of the multiple subset views are each comprised of a stream of continuous video images.

The invention as in example J, wherein the selected areas of the multiple subset views are each comprised of a repeating loop of multiple video images.

The invention as in example J, wherein the selected areas of the multiple subset views are comprised of synthesized graphics.

The invention as in example J, wherein the source of video is a single wide angle camera.

The invention as in example J, wherein the source of video is an array of cameras.

The invention as in example J, wherein the source of video is comprised of multiple independent sources of video. Further, wherein the source of video is recorded directly to a multi-stream video server.

The invention as in example J, wherein the source of video is a single camera, that is rotating and capturing multiple views. Further, wherein the source of video is recorded directly to a multi-stream video server.

The invention as in example J, wherein the source of video is provided in real time.

The invention as in example J, wherein the source of video is live.

The invention as in example J, wherein the source of video is from a storage medium or system.

The invention as in example J, wherein the perspective view is a 360° view.

An example K of the invention would be a video signal compositing system, comprising: a first source of video signals comprising an image, wherein the image is comprised of multiple colored regions, having a spatial relationship to one another; an additional source of video signals; a means for associating the additional source of video signals with a specific respective one of the multiple colored regions; a control means for mapping the additional source of video to its respective one of the multiple colored regions, responsive to the means for associating and to the spatial relationship; and a means for combining the first source and additional source of video signals to provide a composite output video signal, responsive to the control means.

The invention as in example K, wherein the additional source of video signals is comprised of a plurality of additional sources of video signals; wherein the means for associating provides means for associating each one of the plurality of additional sources of video signals with a respective exclusive one of the multiple colored regions; wherein the control means provides means for mapping each of the additional sources of video signals to its respective one of the multiple colored regions responsive to the means for associating; and wherein the means for combining provides means for combining the first source of video signals and the additional sources of video signals to provide the composite output video signal responsive to the control means.

The invention as in example K, wherein there are at least two colored regions.

The invention as in example K, wherein the additional source of video signals is video imagery.

The invention as in example K, wherein the additional source of video signals is a texture map.

The invention as in example K, wherein the additional source of video signals is a still frame image.

The invention as in example K, wherein the additional source of video signals is a graphic.

The invention as in example K, wherein the additional source of video signals is provided from an external source.

The invention as in example K, wherein the additional source of video signals is provided from a source internal to the system.

The invention as in example K, wherein the spatial relationship is determined responsive to positional information from a video camera.

The invention as in example K, wherein the spatial relationship is determined responsive to signals from an alpha channel.

The invention as in example K, wherein the spatial relationship is determined responsive to a calibration pattern within each one of the colored regions.

The invention as in example K, wherein the spatial relationship is determined responsive to the relative position of edges of each of the colored regions.

The invention as in example K, further comprising: a third source of video providing a perceived depth level; and wherein the control means is responsive to the third source of video in providing for the mapping. Further, wherein the third source of video signals is an alpha channel. Further, wherein the third source of video signals is a non-camera generated source. Further, wherein the third source of video signals is an artificially generated depth.

The invention as in example K, wherein the first source of video signals is provided from a video camera. Further, wherein the video camera position is rotatable around a first pivot axis, and movable along a second axis independent of the first pivot axis. Further, wherein the video camera provides an output comprised of video data and environmental information representative of the position of the video camera.

An example L of the invention would be a video signal compositing system, comprising; a system for providing a source of panoramic display, comprising a source of video signals representing a multiple direction perspective view from a defined point source comprising multiple subset views; a means for defining a view direction within the coordinate system of the perspective view; a means for selecting one or more of the subset views responsive to the view direction; a means for providing a display responsive to the selected views; a means for providing a source of compositing control signals; an additional source of video signals; and a means for combining the selected areas of the multiple subset views with the additional source of video signals responsive to the compositing control signals.

The invention as in example L, wherein the display is comprised of portions of at least one selected subset view.

The invention as in example L, wherein the display is comprised of portions of at least two selected subset views.

The invention as in example L, wherein the selected areas of the multiple subset views are comprised of still frame images.

The invention as in example L, wherein the selected areas of the multiple subset views are each comprised of a stream of continuous video images.

The invention as in example L, wherein the selected areas of the multiple subset views are each comprised of a repeating loop of multiple video images.

The invention as in example L, wherein the selected areas of the multiple subset views are comprised of synthesized graphics.

The invention as in example L, wherein the source of video is a single wide angle camera.

The invention as in example L, wherein the source of video is an array of cameras.

The invention as in example L, wherein the source of video is comprised of multiple independent sources of video. Further, wherein the source of video is recorded directly to a multi-stream video server.

The invention as in example L, wherein the source of video is a single camera, that is rotating and capturing multiple views.

The invention as in example L, wherein the source of video is provided in real time.

The invention as in example L, wherein the source of video is live.

The invention as in example L, wherein the source of video is from a storage medium or system.

The invention as in example L, wherein the perspective view is a 360° view.

The invention as in example L, wherein the source of video is recorded directly to a multi-stream video server.

The invention as in example L, wherein the additional source of video signals are supplied from an external source.

The invention as in example L, wherein the additional source of video signals are generated internally.

The invention as in example L, wherein the additional source of video signals are a video stream.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A video signal compositing system, comprising:
   a first source of video signals comprising an image; an additional source of video signals;
   a source of control signals defining a spatial mapping relationship for the additional source of video signals to be mapped into the first source of video signals;

transformation means for mapping the additional source of video signals responsive to the control signals and producing remapped additional source of video signals; and means for combining the remapped additional source of video signals onto the first source of video signals responsive to the control signals.

2. The system as in claim 1, wherein the control signals are computer generated to define a region within the image for mapping onto by the additional source of video signals.

3. The system as in claim 1, wherein the first source of video signals is a video camera which provides a video signal representing an image and ancillary data; and wherein the control signals are derived responsive to the ancillary data.

4. The system as in claim 3, wherein the ancillary data is representative of camera position.

5. The system as in claim 4, wherein the additional source of video signals is selected from among a plurality of additional video sources each associated with a different relative camera position, responsive to the ancillary data.

6. The system as in claim 4, wherein the additional source of video signals is processing differently for different relative camera positions responsive to the ancillary data.

7. The system as in claim 1, wherein the source of control signals are derived from the first source of video signals.

8. The system as in claim 7 wherein the source of control signals are matte signals.

9. The system as in claim 8, wherein the first source of video signals is comprised of at least one colored region and wherein the matte signals are derived from detection of the said colored region.

10. The system as in claim 9, wherein there are at least two colored regions, wherein there are multiple ones of the matte signals, each associated with a respective one of the colored regions.

11. The system as in claim 8, wherein the matte signals are derived from detecting the edges of the colored region.

12. The system as in claim 8, wherein the matte signals are provided by a source independent of the first source of video signals.

13. The system as in claim 8, wherein the matte signals are provided by a source external to the first source of video signals.

14. The system as in claim 8, wherein the first source of video signals is further comprised of ancillary data, and wherein the matte signals are derived responsive to the ancillary data.

15. The system as in claim 14, wherein the matte signals are provided by the ancillary data.

16. The system as in claim 14, wherein the matte signals are synthesized responsive to the ancillary data.

17. The system as in claim 3, wherein the ancillary data defines a virtual region, and wherein the source of control signals maps the additional source of video signals onto the virtual region.

18. A video signal compositing system comprising:

means for providing a first source of video signals comprising an image;

means for providing an additional source of video signals;

means for providing a source of transformation control signals;

means for providing a source of combining control signals;

transformation means, responsive to the transformation control signals, to transform video signals from the additional source of video signals; and means for combining, responsive to the first source of video signals, the transformed additional source of video signals, and the combining control signals, for providing a composited output combining the transformed additional source of video signals with the first source of video signals.

19. The system as is claim 18, wherein the transformation control signals are derived from the first source of video signals.

20. The system as in claim 18, wherein the transformation control signals are derived from ancillary data.

21. The system as in claim 20, wherein the ancillary data is comprised of control signals originating from the first source of video signals.

22. The system as is claim 20, wherein the ancillary data is comprised of externally provided computer data.

23. The system as in claim 22, wherein the externally provided computer data is output from a shot box.

24. The system as in claim 18, wherein the combining control signals are derived from the first source of video signals.

25. The systems as in claim 18, wherein the combining control signals are derived from ancillary data.

26. The system as in claim 18, wherein the first source of video signals is comprised of a video camera output.

27. The system as in claim 18, wherein the first source of video signals is comprised of computer-generated image data.

28. The system as in claim 18, wherein the additional source of video signals is comprised of a video camera output.

29. The system as in claim 18, wherein the additional source of video signals is comprised of a computer-generated image data.

30. The system as in claim 25, wherein the ancillary data is provided as an output from the means for providing the first source of video signals.

31. The system as in claim 18, wherein the transformation means is comprised of a digital video effects processor.

32. The system as in claim 18, wherein the means for combining is comprised of a video keyer.

33. A video signal compositing system, comprising:

a first source of video signals comprising an image, wherein the image is comprised of multiple colored regions, having a spatial relationship to one another;

an additional source of video signals;

means for associating the additional source of video signals with a specific respective one of the multiple colored regions;

control means for mapping the additional source of video to its respective one of the multiple colored regions, responsive to the means for associating and to the spatial relationship; and means for combining the first source and additional source of video signals to provide a composite output video signal, responsive to the control means.

34. The system as in claim 33, wherein the additional source of video signals is comprised of a plurality of additional sources of video signals;

wherein the means for associating provides means for associating each one of the plurality of additional sources of video signals with a respective exclusive one of the multiple colored regions;

wherein the control means provides means for mapping each of the additional sources of video signals to its respective one of the multiple colored regions responsive to the means for associating; and wherein the means for combining provides means for combining the first source of video signals and the additional sources of video signals to provide the composite output video signal responsive to the control means.

35. The system as in claim 33, wherein there are at least two colored regions.

36. The system as in claim 33, wherein the additional source of video signals is video imagery.

37. The system as in claim 33, wherein the additional source of video signals is a texture map.

38. The system as in claim 33, wherein the additional source of video signals is a still frame image.

39. The system as in claim 33, wherein the additional source of video signals is a graphic.

40. The system as in claim 33, wherein the additional source of video signals is provided from an external source.

41. The system as in claim 33, wherein the additional source of video signals is provided from a source internal to the system.

42. The system as in claim 33, wherein the spatial relationship is determined responsive to positional information from a video camera.

43. The system as in claim 33, wherein the spatial relationship is determined responsive to signals from an alpha channel.

44. The system as in claim 33, wherein the spatial relationship is determined responsive to a calibration pattern within each one of the colored regions.

45. The system as in claim 33, wherein the spatial relationship is determined responsive to the relative position of edges of each of the colored regions.

46. The system as in claim 33, further comprising:

a third source of video signals providing a perceived depth level; and wherein the control means is responsive to the third source of video signals in providing for the mapping.

47. The system as in claim 46 wherein the third source of video signals is an alpha channel.

48. The system as in claim 46, wherein the third source of video signals is a non-camera generated source.

49. The system as in claim 46, wherein the third source of video signals is an artificially generated depth.

50. The system as in claim 33, wherein the first source of video signals is provided from a video camera.

51. The system as in claim 50, wherein the video camera is rotatable around a first pivot axis, and movable along a second axis independent of the first pivot axis.

52. The system as in claim 50, wherein the video camera provides an output comprised of video data and environmental information representative of the position of the video camera.

* * * * *